United States Patent
McMillin

(10) Patent No.: US 7,027,773 B1
(45) Date of Patent: Apr. 11, 2006

(54) ON/OFF KEYING NODE-TO-NODE MESSAGING TRANSCEIVER NETWORK WITH DYNAMIC ROUTING AND CONFIGURING

(75) Inventor: Brian K. McMillin, Dallas, TX (US)

(73) Assignee: AFX Technology Group International, Inc., Dallas, TX (US)

( * ) Notice: Subject to any disclaimer, the term of this patent is extended or adjusted under 35 U.S.C. 154(b) by 0 days.

(21) Appl. No.: 09/578,237

(22) Filed: May 24, 2000

Related U.S. Application Data
(60) Provisional application No. 60/136,539, filed on May 28, 1999.

(51) Int. Cl.
*H04B 5/00* (2006.01)

(52) U.S. Cl. ............... 455/41.2; 455/445; 455/518; 370/390; 375/200.57

(58) Field of Classification Search ........... 455/41.2, 455/445, 518, 432.1, 432.2, 433, 40, 41.1, 455/47.2, 503, 500, 517; 370/390, 315, 349, 370/397; 375/200.57; 395/200.51, 200.73
See application file for complete search history.

(56) References Cited

U.S. PATENT DOCUMENTS

| | | | |
|---|---|---|---|
| 3,705,523 A | 12/1972 | Alouisa | 179/18 EA |
| 4,284,848 A | 8/1981 | Frost | |
| 4,494,119 A | 1/1985 | Wimbush | 343/457 |
| 4,651,156 A | 3/1987 | Martinez | 342/457 |
| 4,799,062 A | 1/1989 | Sanderford, Jr. et al. | 342/450 |
| 4,818,998 A | 4/1989 | Apsell et al. | 342/44 |
| 5,021,794 A | 6/1991 | Lawrence | 342/457 |
| 5,086,389 A | 2/1992 | Hassett et al. | 364/401 |
| 5,202,829 A | 4/1993 | Geier | 364/449 |
| 5,223,844 A | 6/1993 | Mansell et al. | 342/357 |
| 5,289,183 A | 2/1994 | Hassett et al. | 340/905 |
| 5,351,187 A | 9/1994 | Hassett | 364/401 |
| 5,365,451 A | 11/1994 | Wang et al. | 364/449 |
| 5,373,503 A | 12/1994 | Chen | |
| 5,448,569 A | 9/1995 | Huang et al. | 370/95.1 |
| 5,473,602 A | 12/1995 | McKenna et al. | |
| 5,485,163 A | 1/1996 | Singer et al. | 342/457 |
| 5,485,520 A | 1/1996 | Chaum et al. | 380/24 |
| 5,488,360 A | 1/1996 | Ray | 340/933 |
| 5,490,079 A | 2/1996 | Sharpe et al. | 364/467 |
| 5,493,692 A | 2/1996 | Goldstein et al. | |
| 5,525,992 A | 6/1996 | Froschermeier | 342/42 |
| 5,550,551 A | 8/1996 | Alesio | 342/457 |

(Continued)

FOREIGN PATENT DOCUMENTS

| | | |
|---|---|---|
| EP | 0687075 A2 | 12/1995 |
| EP | 0913965 A1 | 5/1999 |
| WO | WO 98/42096 | 9/1998 |

OTHER PUBLICATIONS

Jubin, J., et al., "The DARPA Packet Radio Network Protocols," Proceedings of the IEEE, Jan. 1987, pp. 21–32, vol. 75, No. 1.

Basagni, S., et al., "Geographic Messaging in Wireless Ad Hoc Networks," IEEE, May 16, 1999, pp. 1957–1961.

ASH Transceiver Designer's Guide, published by RFM, Mar. 10, 1999, pp. 1–53.

*Primary Examiner*—Tilahun Gesesse
(74) *Attorney, Agent, or Firm*—Senniger Powers

(57) ABSTRACT

The invention is a system operating on a reference frequency. The system comprises a plurality of at least three nodes. Each node hands off a message received from another node to a subsequent node. Each of the nodes comprises a transceiver receiving a message on the reference frequency from another node and transmitting the received message on the reference frequency to a subsequent node, and a controller controlling operation of the transceiver to receive the.. message transmitted by another node and to transmit the received message to a subsequent node.

33 Claims, 25 Drawing Sheets

U.S. PATENT DOCUMENTS

| | | | |
|---|---|---|---|
| 5,572,221 A | 11/1996 | Marlevi et al. | 342/452 |
| 5,631,642 A | 5/1997 | Brockelsby et al. | 340/993 |
| 5,640,384 A | 6/1997 | Du | 370/221 |
| 5,640,390 A | 6/1997 | Sakamoto et al. | 370/346 |
| 5,675,344 A | 10/1997 | Tong et al. | 342/457 |
| 5,682,139 A | 10/1997 | Pradeep et al. | 340/539 |
| 5,686,902 A | 11/1997 | Reis et al. | 340/825.54 |
| 5,706,014 A | 1/1998 | Abbasi | 342/357 |
| 5,731,757 A | 3/1998 | Layson, Jr. | 340/573 |
| 5,731,785 A | 3/1998 | Lemelson et al. | 342/357 |
| 5,734,963 A | 3/1998 | Fitzgerald et al. | 455/31.2 |
| 5,742,233 A | 4/1998 | Hoffman et al. | 340/573 |
| 5,748,147 A | 5/1998 | Bickley et al. | 342/457 |
| 5,758,285 A | 5/1998 | Chavez, Jr. et al. | |
| 5,767,804 A | 6/1998 | Murphy | 342/357 |
| 5,787,117 A | 7/1998 | Ash | 375/223 |
| 5,787,174 A | 7/1998 | Tuttle | 380/23 |
| 5,787,344 A | 7/1998 | Scheinert | 455/422 |
| 5,805,082 A | 9/1998 | Hassett | 340/928 |
| 5,818,619 A | 10/1998 | Medved et al. | 359/172 |
| 5,822,309 A * | 10/1998 | Ayanoglu et al. | 370/315 |
| 5,835,061 A | 11/1998 | Stewart | 342/457 |
| 5,835,857 A | 11/1998 | Otten | 455/410 |
| 5,838,237 A | 11/1998 | Revell et al. | 340/573 |
| 5,841,352 A | 11/1998 | Prakash | 340/573 |
| 5,844,522 A | 12/1998 | Sheffer et al. | 342/457 |
| 5,852,401 A | 12/1998 | Kita | 340/539 |
| 5,875,179 A | 2/1999 | Tikalsky | 370/315 |
| 5,875,186 A | 2/1999 | Belanger et al. | 370/331 |
| 5,974,236 A * | 10/1999 | Sherman | 709/221 |
| 5,987,011 A * | 11/1999 | Toh | 370/331 |
| 6,028,857 A | 2/2000 | Poor | 370/351 |
| 6,046,978 A | 4/2000 | Melnik | 370/221 |
| 6,104,712 A | 8/2000 | Robert et al. | 370/389 |
| 6,338,087 B1 * | 1/2002 | Okanoue | 709/222 |
| 6,414,955 B1 * | 7/2002 | Clare et al. | 370/390 |

\* cited by examiner

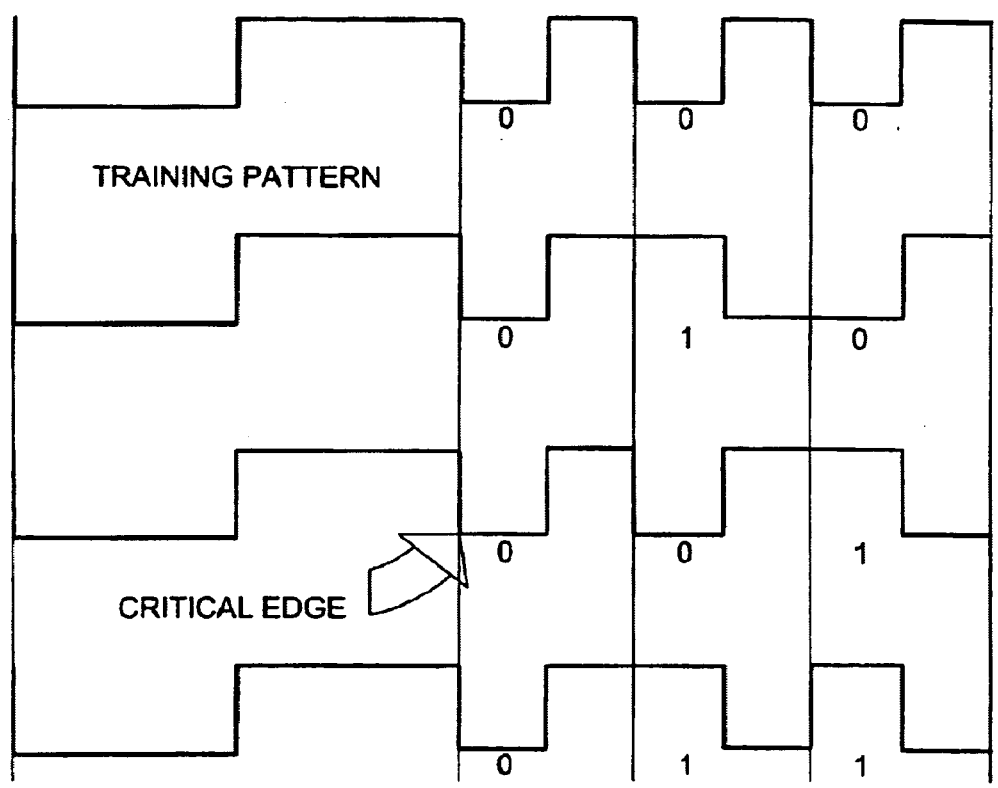

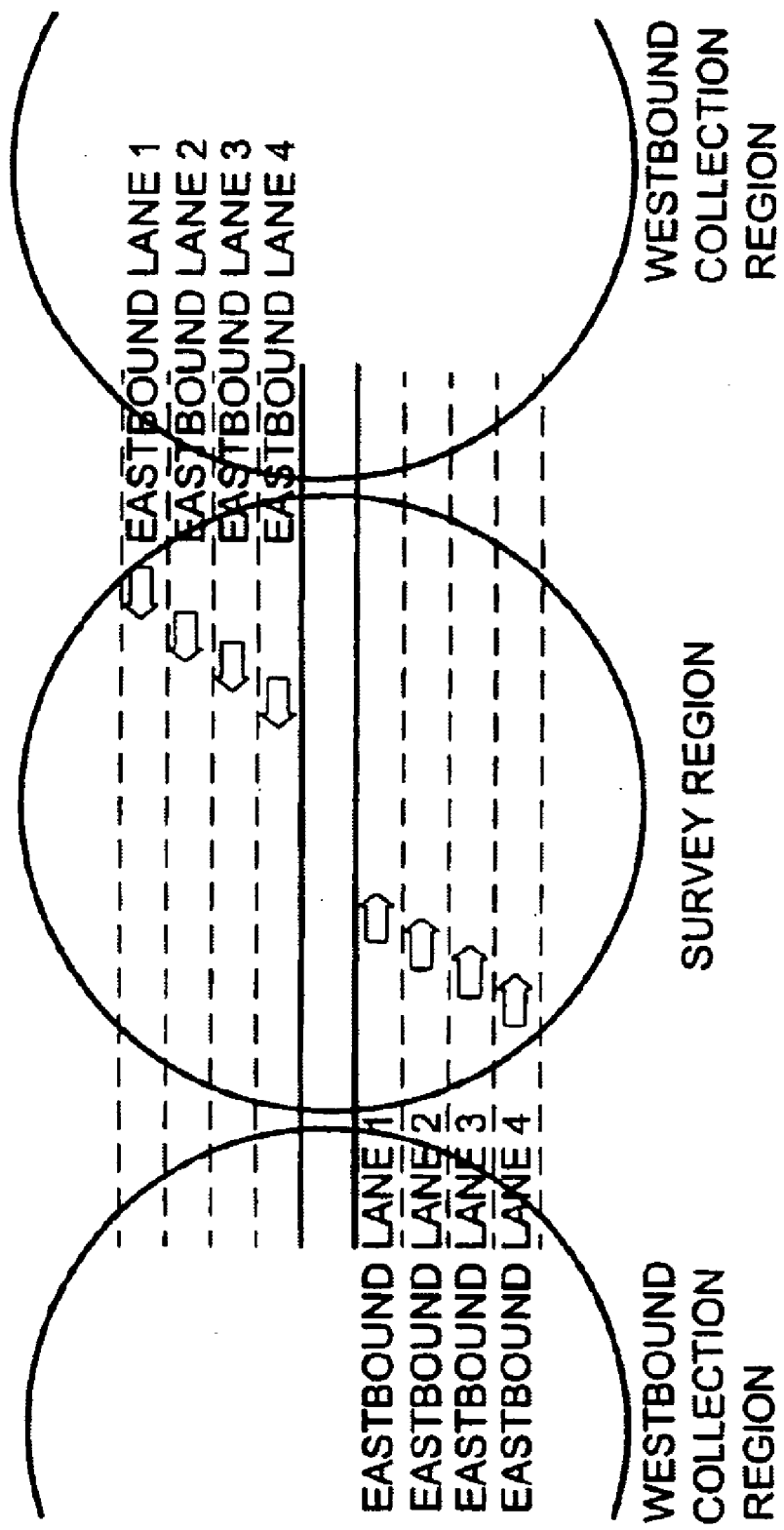

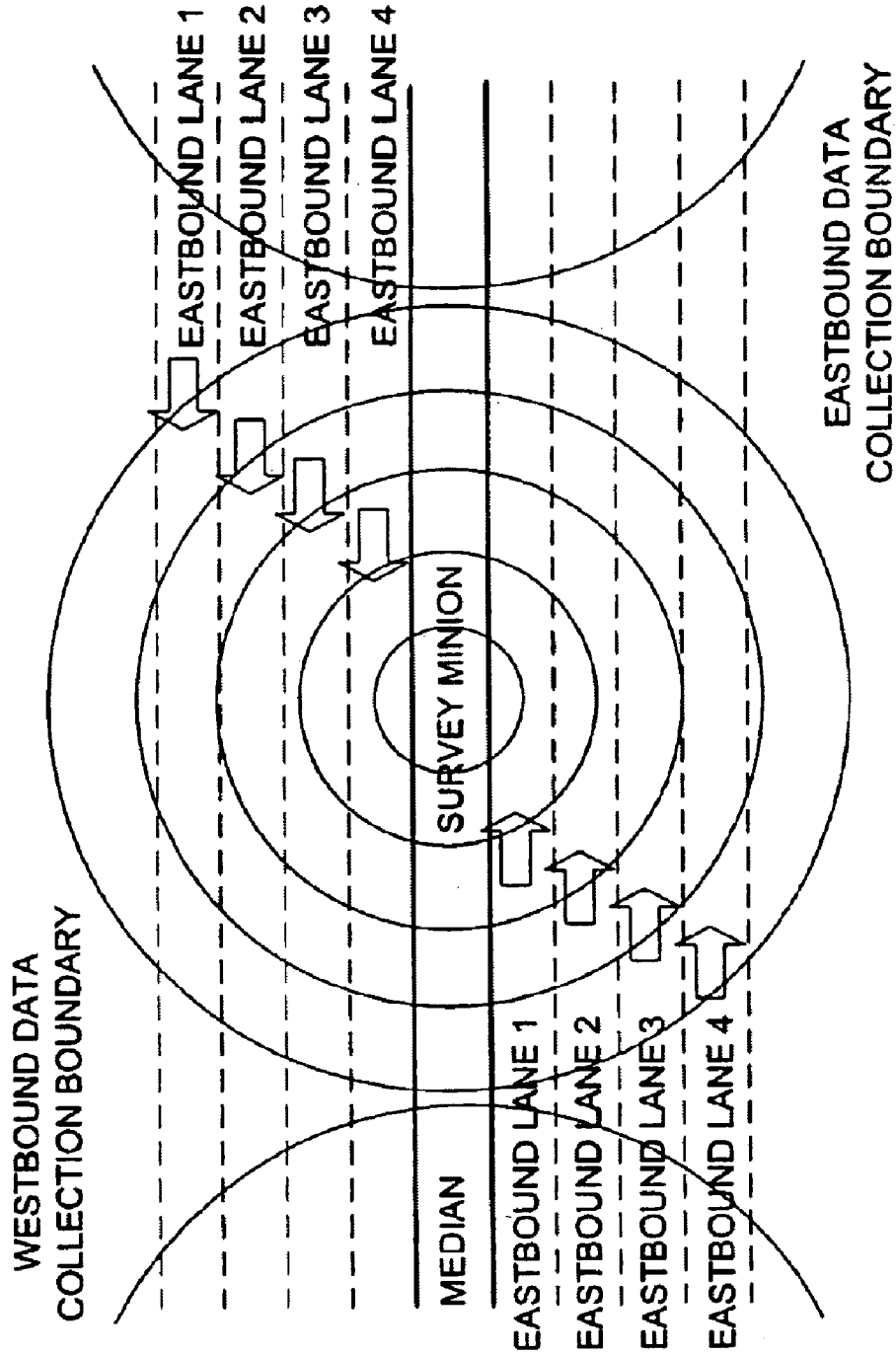

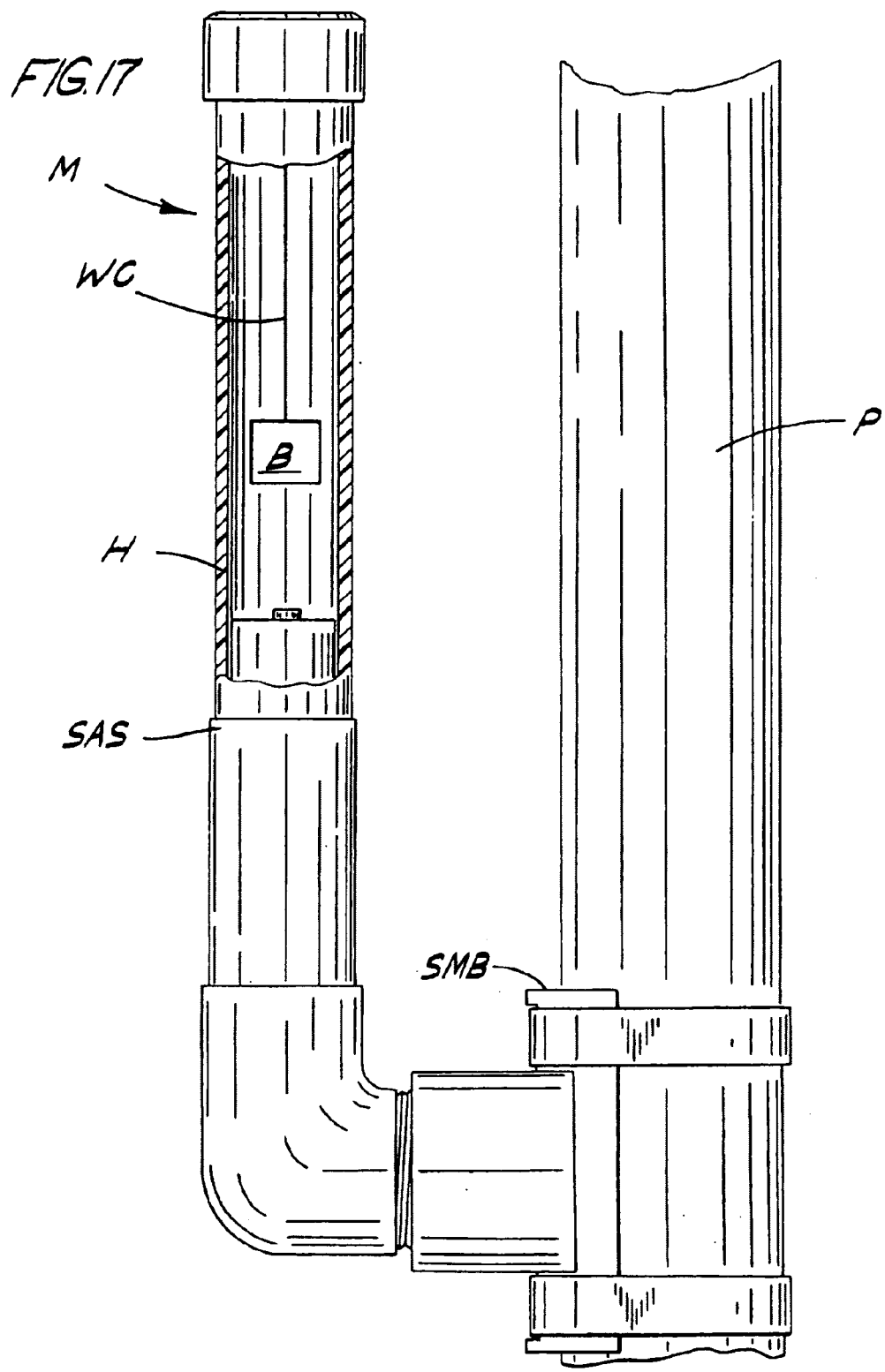

ON/OFF KEYING NODE-TO-NODE MESSAGING TRANSCEIVER NETWORK WITH DYNAMIC ROUTING AND CONFIGURING

This application claims benefit of U.S. Provisional 60/136,539 filed May 28, 1999.

BACKGROUND OF THE INVENTION

1. Field of the Invention

The invention generally relates to multilevel networks and, in particular, to a wireless network of intelligent transceiver nodes which employ local processing and node-to-node data messaging to hand off messages from an origination point to a destination point.

2. Description of the Prior Art

Wireless networks such as the cellular phone system are well known in the prior art. Such networks are complex and are based on the apparent need for real time connectivity. Consumer applications of networks such as cellular phones have promoted a perception that robust real-time connections are a requirement of wireless communications. Real-time connections are very expensive in terms of equipment and air-time. Many wireless data applications have been designed around real-time communications because it has been available, but many more potential applications have been unable to be cost justified using this technology.

For many applications the requirement for a real-time connection is an artificial constraint, and has limited the development of short-range messaging between devices. There is a need for an inexpensive, flexible, expandable network to replace traditional network concepts which require the installation of an expensive fixed infrastructure prior to the operation of the network. Cellular phones, for example, require that every subscriber phone communicates only with the cellular base station. Even though there may be thousands of actual phones in the area, they are not capable of direct communication with each other.

SUMMARY OF THE INVENTION

It is an object of this invention to provide a low cost, multi-node system which hands off messages from node-to-node; a system of nodes which hands off messages and provides implicit and/or explicit acknowledgment of the hand off; a flexible, adaptable multi-node system which is applicable in a plurality of environments and for a plurality of uses; a multi-node system having stationary nodes and mobile nodes (known as "Minion™ devices") the position of which can be determined by the stationary nodes; a multi-node system which permits nodes to communicate with a wide area network or a global positioning system via a selected number of nodes; a multi-node system which operates multiple applications at each node; and a multi-node system which interfaces with a plurality of "gateways", e.g., wide area network (WAN) connections to other communications networks, whether wired or not, such as telephone or CATV or wireless, or satellite or terrestrial.

Additional objects includes providing a system and method which:

encodes Manchester data using a micro-controller and firmware;

compensates for processor clock variations using periodic updates of entries in a table-driven Manchester coding algorithm and adaptively compensating for differences in processor clock speed between a sender and a receiver using table updates computed on a message-by-message basis;

wirelessly synchronizes clocks using edge detection in Manchester encoded data messages;

reduces wireless traffic by randomly increasing delays between individual message transmissions as the network traffic load increases, by automatically reducing the output power of the transmission to a level just sufficient to ensure a high probability of reception by the receiver, by eliminating extraneous traffic by deriving routing information by snooping on network data messages to reduce the number or routing table update messages, by implementing a method of limiting the number of hops a message will take over the network that is specified by the message originator, and/or by implementing a flexible method of causing the message to time-out if it is not delivered by a time set by the originator;

shares network resources among low-cost intelligent data radios wherein the resources may include time synchronization, virtual geolocation services, sensor or actuator interfaces, shared memory and wide-area network access; and uses wireless data messages to modify and upgrade firmware in intelligent wireless data radios.

In one form, the invention is a system operating on a reference frequency. The system comprises a plurality of at least three nodes. Each node hands off a message received from another node to a subsequent node. Each of the nodes comprises a transceiver receiving a message on the reference frequency from another node and transmitting the received message on the reference frequency to a subsequent node, and a controller controlling operation of the transceiver to receive the message transmitted by another node and to transmit the received message to a subsequent node.

In another form, the invention is a system operating on a reference frequency comprising a plurality of nodes, each node comprising a transceiver and a corresponding controller for controlling the operation of the transceiver. Each controller operates its corresponding transceiver as one or more of the following types of nodes. An originating type of node provides a message in a mode in which the transceiver transmits on the reference frequency a message to another node of the system. An intermediate type of node hands off a message in a mode in which the transceiver receives on the reference frequency the message transmitted by another node and transmits on the reference frequency the received message to a subsequent node other than the node from which the message was received. A destination type of node receives the message in a mode in which the transceiver receives on the reference frequency the message transmitted by another node.

In another form, the invention is a message having a protocol which permits the message to be successively transmitted by a wireless network of transceiver nodes employing node-to-node messaging. A message including data is sent from a first node originating via one or more intermediate nodes to a last node designated by the first node as the destination of the message. The message comprises: data bits corresponding to the data; originating bits identifying the first node from which the message originates; destination bits identifying the last node to which the message is destined; transmitting bits identifying the current node transmitting the message; and receiving bits identifying the next node intended to receive the message currently being transmitted.

In yet another form, the invention is a system operating on a reference frequency comprising an originating node, a plurality of intermediate nodes and a destination node. The originating node provides data to the intermediate node. The originating node comprises a first transceiver transmitting on the reference frequency a message including the data and receiving on the reference frequency an implicit and/or explicit acknowledgment that the message has been received by one of the intermediate nodes, and a first controller controlling operation of the first transceiver to transmit the message to the intermediate node and to receive the implicit and/or explicit acknowledgment that the message has been received by one of the intermediate nodes. Each of the intermediate nodes hands off the message from one node of the system to another node of the system. Each of the intermediate nodes comprises a second transceiver receiving the message transmitted on the reference frequency by the one node and transmitting on the reference frequency an implicit and/or explicit acknowledgment to the one node that the message has been received by the intermediate node. The second transceiver also transmits on the reference frequency the received message and receives on the reference frequency an implicit and/or explicit acknowledgment that the message has been received by the another node. A second controller controls operation of the second transceiver to receive the message transmitted by the one node and to transmit an implicit and/or explicit acknowledgment that the message has been received by the intermediate node and to thereafter transmit the received message and receive the implicit and/or explicit acknowledgment that the message has been received by the another node. A destination node receives the message from one of the intermediate nodes. The destination node comprises: a third transceiver receiving on the reference frequency the message transmitted by the one intermediate node and transmitting on the reference frequency an implicit and/or explicit acknowledgment to the one intermediate node that the message has been received by the destination node, and a third controller controlling the operation of the third transceiver to receive the message transmitted by the one intermediate node and to transmit an implicit and/or explicit acknowledgment that the message has been received by the destination node.

BRIEF DESCRIPTION OF THE DRAWINGS

FIG. 9E is a timing diagram of four data waveforms according to the invention.

FIGS. 10A and 10B are diagrams of a survey region of a vehicle travel lane determination system according to the invention.

FIGS. 11A and 11B are diagrams of survey region of Minion™ devices of a vehicle travel lane determination system according to the invention.

FIG. 17 is a perspective view with parts broken away illustrating a roadside survey Minion™ device or a geoMinion™ device anchored to a post such as a sign post.

The Appendix provides a Minion™ firmware operational overview of one preferred embodiment of the invention.

DETAILED DESCRIPTION OF PREFERRED EMBODIMENTS

Figure 1:
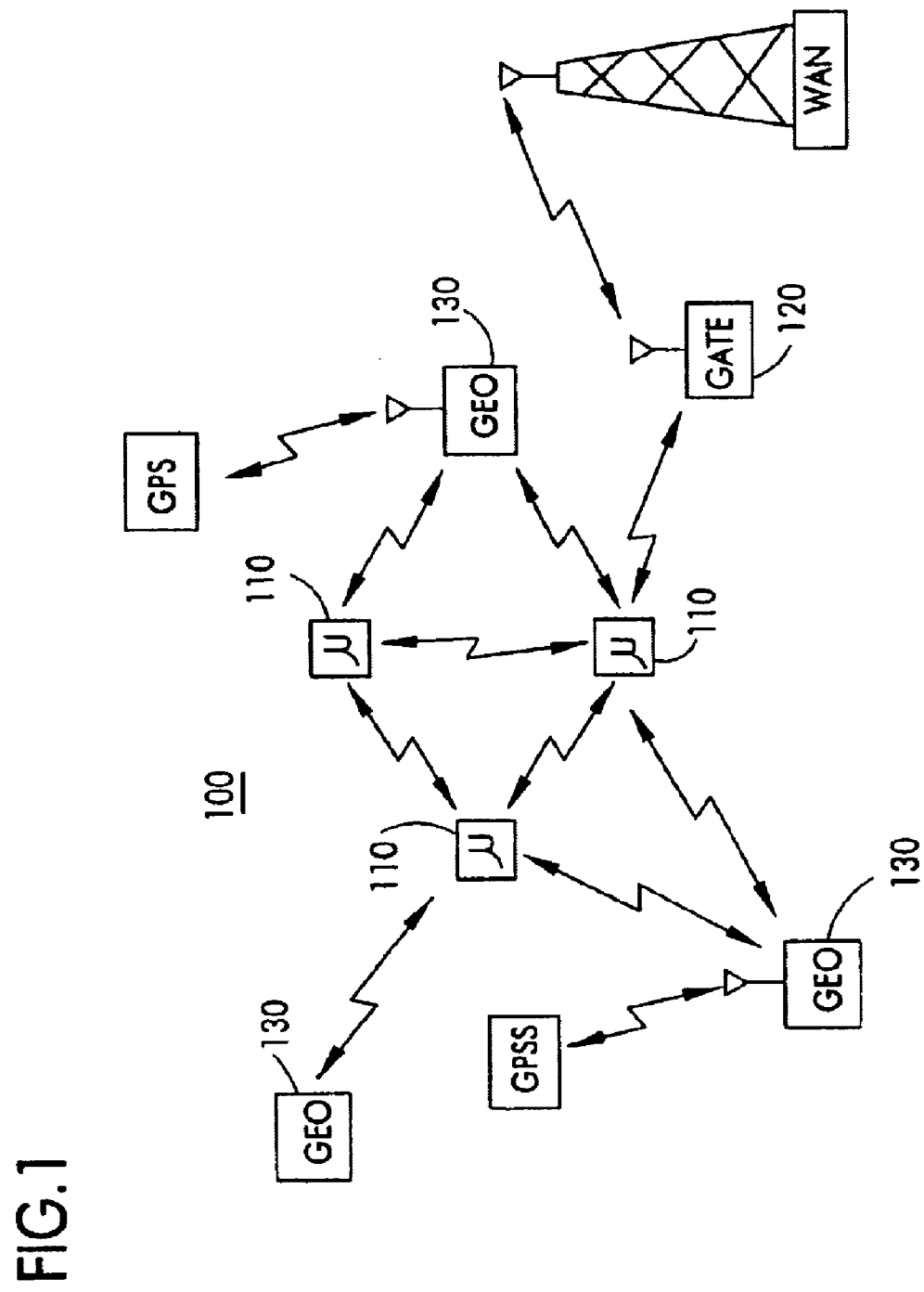
FIG. 1 is a diagram illustrating the communications path of a MinionNet™ network according to the invention.
Figure 2:
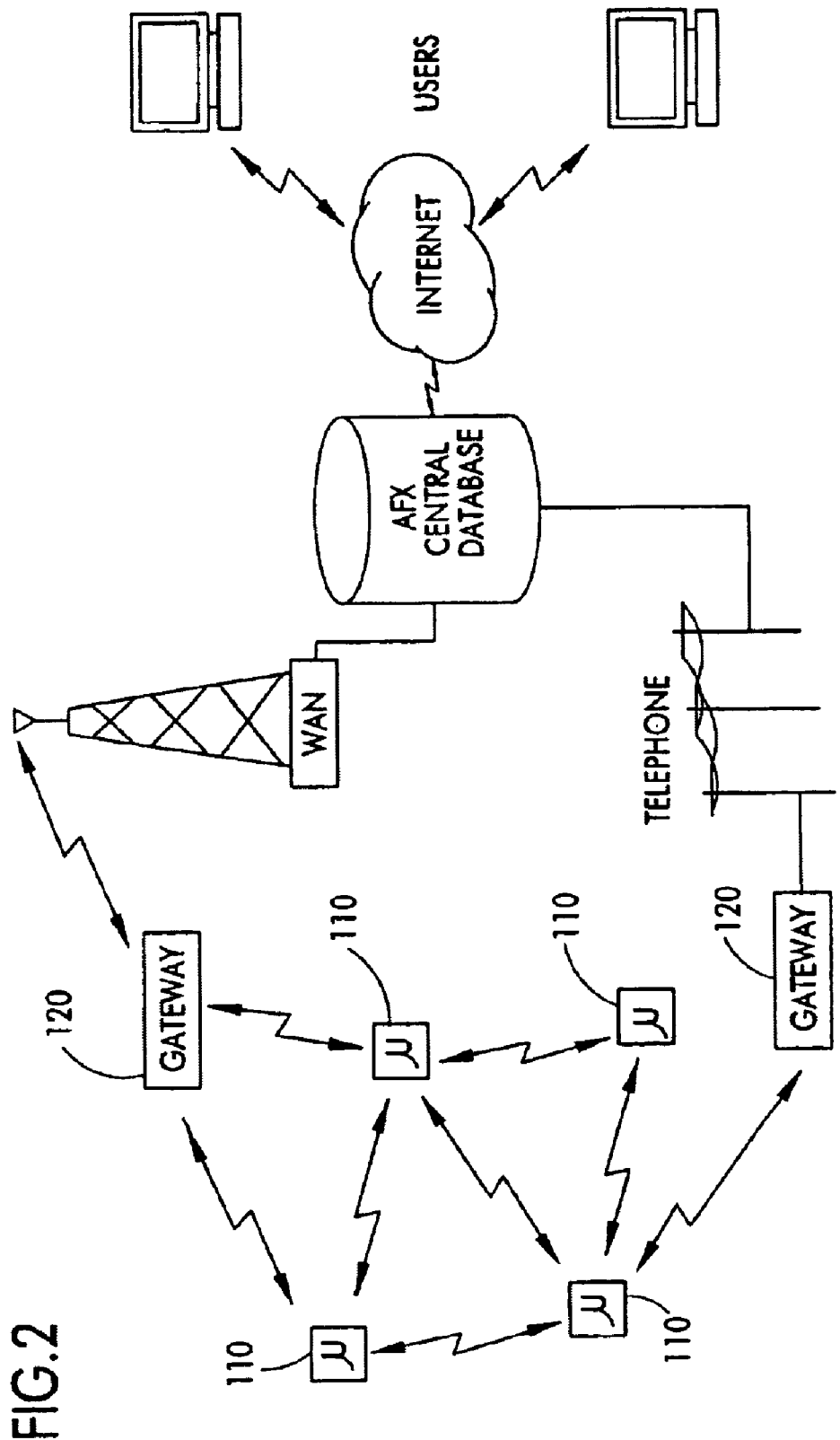
FIG. 2 is a diagram illustrating the data flow of a MinionNet™ network according to the invention.

The MinionNet™ Network 100 as illustrated in FIGS. 1 and 2 is a wireless data network characterized by short-range device-to-device messaging. (Minion™, MinionNet™, µMinion™, muMinion™, microMinion™, gatewayMinion™, geoMinion™ and cap™ are trademarks of the assignee. As used hereinafter, Minion device means Minion™, MinionNet™, µMinion™, muMinion™, microMinion™, gatewayMinion™, and/or geoMinion™, unless otherwise specified. The trademark designation "™" will not be used hereafter for convenience.) Messages are automatically routed through multiple device-to-device 'hops' to provide robust area coverage, redundancy, noise immunity and dynamic routing and reconfiguration. These device-to-device messages do not have a time-critical requirement such as would be found in a real-time voice connection such as a cellular telephone net.

The devices used by the MinionNet network 100 are generally referred to as Minion devices and are actually extremely inexpensive two-way data radios, such as a transceiver as will be described below. In particular, the Minion devices may be a µMinion (microMinion) device 110, a gatewayMinion device 120 or a geoMinion device 130, each of which is a trademark of the assignee and will be described below. One key feature of these Minion devices is that they are able to exchange short data messages with each other as indicated by the arrows in FIG. 1. Each Minion device becomes a part of a community and can share the burden of conveying messages throughout an area. Any Minion device can directly communicate with any other Minion device within range. This facilitates message hand off and acknowledgment as will be described below.

DISCUSSION ILLUSTRATIONS

Cocktail Party Illustration

The network 100 according to the invention communicates in a manner that can be illustrated by a discussion at a cocktail party. Individuals form small groups and communicate among themselves. These groups are not static. From time to time new members join in or old members wander off to join another group. Some of the people just listen in without saying anything important. The members of the group are aware of the other members and may solicit information from anyone nearby. Occasionally a person (Jack) will decide that he needs to locate another individual (Jane). If he looks around and discovers they are in the same group there is no problem. Otherwise, he is likely to ask the people nearby "Have you seen Jane lately?" He will probably receive a variety of responses. Most people will ignore him, either because they didn't hear him or because they have no relevant information. One might say "I saw Jane an hour ago." Another might say "Jane was over near the punch bowl a few minutes ago." This gives Jack the hint that he needs to move through the crowd. He may need to ask again, but eventually he will locate Jane.

A similar situation arises it there is a phone call for Jane at the group. A messenger may take the call, then ask the people nearby for Jane. Eventually the message will be conveyed and Jane will be able to take the call. Sometimes the search process will take too long and the caller will hang up. This is not a problem since Jane will eventually get the message and be able to return the call. If Jane had left the group there is a high probability that the helpful messenger will be able to discover this and convey the additional information to the caller.

In keeping with the loosely structured nature of the group there is no central governing authority, no broadcast announcements or global paging system. Individuals move around freely, arrive and depart independently, and converse with one another as they see fit. As will be pointed out below, Minion devices function in a similar manner.

Moderated Conference Illustration

More particularly, the network 100 according to the invention communicates in a manner that is in contrast to the controlled environment of a moderated conference. Here there is a rigidly structured environment in which only one person at a time speaks. There is only one public address system and it is controlled by a moderator. The moderator will make a series of general announcements which establish the topics that will be allowed in this conference. This general information is assumed to be required by all of the participants. During the question and answer period participants make requests to be recognized. They will ask a question which may need to be repeated by the moderator for the benefit of the other participants. The moderator will answer the question or solicit responses from the participants. Each response will be handled in the same way: participant requests recognition, moderator recognizes him, participant makes a statement, moderator repeats statement, etc. There is no direct discussion between participants. In contrast, the MinionNet network as will be described below in detail does not constitute such a rigidly constructed network.

The Minionnet Network

The MinionNet network operates along the same lines as the group. Each of the individuals communicates only with their neighbors that are in close proximity including those that move in. A large amount of information can be exchanged in a short period of time because the small groups all operate in parallel. Roving messengers can pass important data from one group to another while suppressing less important items. Shared resources such as telephones are efficiently used and inexpensive. There is a high level of cooperation among individuals of the group or, in the case of the nodes MinionNet network. Herein, a node refers to a Minion device and, visa versa, since a Minion device may be a node.

Traditional Networks

Traditional prior art wireless applications such as cellular phones, pagers and wireless local area networks more closely resemble the moderated conference. There is invariably a controlling entity such as a satellite or base station that corresponds to the moderator. All participants are required to communicate only with this moderator and to use resources allocated by this moderator. All information eventually winds up as part of a broadcast which can be received by all participants. This is extremely slow and inefficient. There is essentially no contact between participants—each cooperates and communicates only with the moderator.

Multiple Markets/Numerous Applications

A number of major market areas have been identified, most notably utility monitoring and control, intelligent transportation systems (ITS), mobile finance management, building automation and control, factory automation and control, home automation and control, security and access control, and asset management. There are also a number of military and other governmental applications in addition to the above. Some of these will be described below as illustrative, not limiting.

System Architecture

Many possible applications and implementations of the MinionNet network are contemplated, only some of which are disclosed herein. For example, the MinionNet network may be used as a geolocation network as described below. In this environment, this is accomplished by making a small percentage of the Minion devices in the field act as geoMinion devices 130 illustrated in block diagram form in FIG. 3. These geoMinion devices 130 interface with the global positions systems (GPS) already in place to act as anchor points for locating other Minion devices.

Preferably, all Minion devices share a common structure in the form of a radio transceiver with antenna, microprocessor for controlling the transceiver, memory associated with the microprocessor and a power source. The transceivers transmit and receive on the same frequency which reduces hardware requirements and allows a single filter to be used on the antenna for both transmission and reception. This also avoids the need for tuning or frequency selection equipment.

Figure 3:
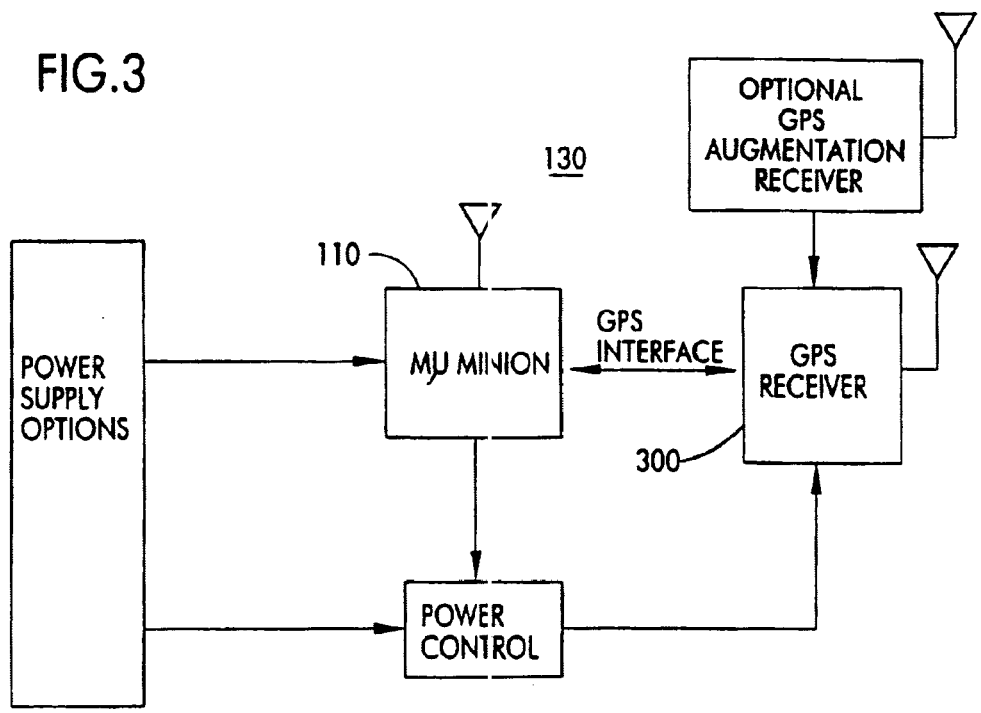
FIG. 3 is a block diagram of a geoMinion™ device according to the invention.

As shown in FIG. 3, a geoMinion device 130 comprises a μMinion device 110 configured to interface with a GPS receiver 300. The GPS receiver 300 would be in contact, either directly or through an optional GPS augmentation receiver 310, to a GPS which would provide a two or three dimensional indication of the location of the GPS receiver 300. By locating another μMinion device 110 between several geoMinion devices 130, the approximate position of the μMinion device 110 can be determined. The power supply options and power control of the geoMinion device 130 will be described below with regard to FIG. 7.

Alternatively, the MinionNet network can be used to associate anchored, physical locations with virtual ones as illustrated in FIGS. 1 and 2. For example, points in the MinionNet network should be connected to a wider area network so that message travel times and network loading are minimized. This is accomplished by making a small percentage of the Minion devices in the field act as gateway Minion devices 120 illustrated in block diagram form in FIG. 4. These gateway Minion devices 120 act as concentrators for messages bound to and emanating from the centralized supervisory components of the nationwide MinionNet network. The actual wide area connectivity of a gateway Minion device may be provided by a terrestrial wide area wireless data network such as the Bell South Wireless Data Mobitex® network, a cellular based network using CDPD, or a satellite-based data network such as Orbcomm.

Figure 4:
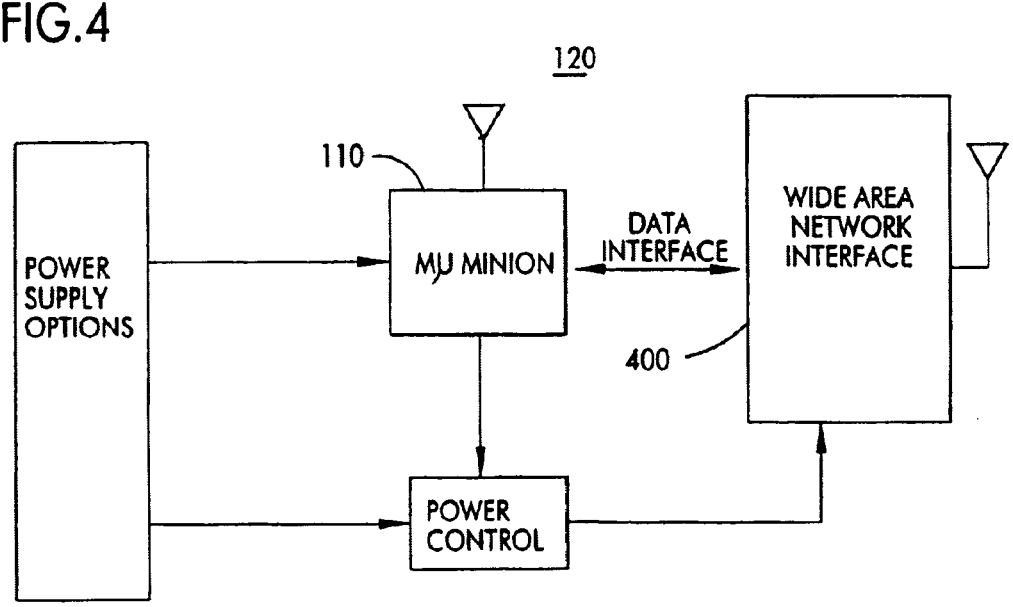
FIG. 4 is a block diagram of a gatewayMinion™ device according to the invention.

As shown in FIG. 4, a gateway Minion device 120 comprises a µMinion device 110 configured to interface with a wide area network (WAN) interface 400. The WAN interface 400 would be in contact, either directly or wireless communication with other stations which would provide data to the µMinion devices or receive data from the µMinion devices. The power supply options and power control of the gateway Minion device 120 will be described below with regard to FIG. 7.

The dynamic configuration and automatic routing aspects of the MinionNet network Protocol cause messages to be routed by the most efficient method from their origin to their ultimate destination. Since many Minion devices will be installed in fixed locations to provide increased coverage, geolocation services, and application-specific functions, it will be possible to provide gateway services via wired and wireless local area networks, and other existing data networks. All Minion devices use the same communications protocol, data format and data rate to reduce software and hardware requirements as well as maintain simplicity within the network itself.

Providing Gateway Services to the individual Minion devices means that all Minion devices effectively become part of the Internet as shown in FIG. 2. Status enquiries and data messages can originate at any Internet workstation in the world and can be directed to any Minion device. The central MinionNet network Servers and application-specific features of individual Minion devices provide any required level of security. Security features would typically include robust public-key cryptography to provide end-to-end protection for specific data while still allowing for full participation in the shared aspects of the MinionNet network.

The virtual geolocation mechanism and routine communication between Minion devices also allows for distribution of accurate time and date information. Minion devices automatically synchronize their internal clocks to within one millisecond. MinionNet network signals can be used to coordinate events throughout the network. Routinely transmitted data messages that provide local-time conversion information allow application-specific devices to keep track of time zones, daylight-time changes, and leap-seconds. Minion devices can provide this important value-added feature to many consumer products.

Figure 5:
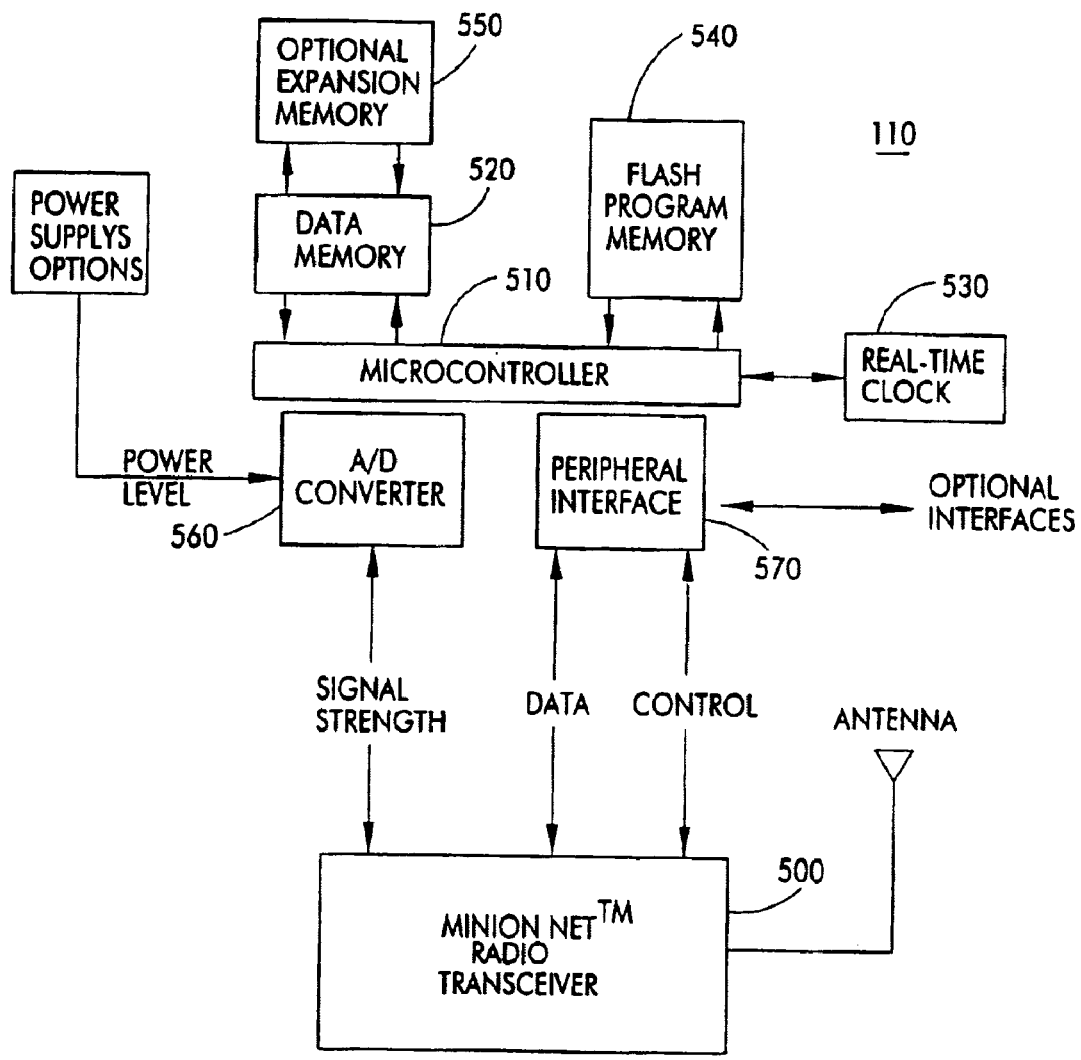
FIG. 5 is a block diagram of a µMinion™ device (also referred to as a "microMinion™ device" and which may be pronounced "mu-Minion™ device") according to the invention.

As shown in FIG. 5, one preferred embodiment of a Minion device comprises a radio transceiver 500, a microcontroller 510 and data memory 520 contained on a double-sided circuit board about the size of a postage stamp. Preferably, the micro-controller is any microprocessor or controller which can be programmed to meet the functional needs of the Minion device. For example, one preferred micro-controller is Model 16F876 manufactured by Microchip Technologies. Some advantages of such controllers include a built in analog to digital converter allowing power supply management, an adequate number of inputs for control signals, a built in clock generator so that a simple crystal need only be added to the controller, a fairly low operating voltage such as 2.6 volts so that it is acceptable for battery power and programmable storage. In particular, the programmable storage would preferably be an on-chip flash memory which is field programmable on the fly so that the operating software of the controller could actually be changed through the MinionNet network system. In this way, Minion devices could be reprogrammed through the MinionNet network without the need for physically connecting to or handling the particular Minion device being reprogrammed.

Preferably, the transceiver 500 comprises an amplifier sequenced hybrid (ASH) transceiver such as disclosed in U.S. Pat. No. 5,787,117, the entire disclosure of which is incorporated herein by reference. Although the radio transceiver would preferably operate in the unlicenced ISM band (e.g., presently 902–928 MHZ, as is approved by the FCC in the United States and by the corresponding regulatory agencies in a number of other countries particularly in North and South America) with an effective output power of less than 1 milliwatt. Other embodiments using other reference frequencies and power output levels are also contemplated. A second frequency selection should cover most of the European Market. All Minion devices transmit and receive on a single frequency so that most components of the transceiver are utilized in both receiving and transmitting messages and in receiving and transmitting acknowledgments that the messages have been handed off to the next node. This eliminates the added cost and complexity inherent in spread-spectrum or frequency agile approaches. The receiver is a stable, inexpensive direct-conversion implementation. Minion devices do not have frequency synthesizers, local oscillators, IF filters, IF amplifiers, or antenna duplexes.

Implicit and Explicit Acknowledgments

Receipt of messages can be confirmed by either an implicit acknowledgment or an explicit acknowledgment. Implicit acknowledgment occurs when an originating Minion device sends a message via an intermediate Minion device to a destination Minion device and the originating Minion device receives a copy of the message when it is being transmitted by the intermediate Minion device. For example, suppose Minion devices A and B communicate with each other, Minion devices B and C communicate with each other and Minion devices B and D communicate with each other. Suppose Minion device A sends a message to Minion device B to be passed along to a Minion device F as shown in FIG. 6C. Minion device A transmits the message to Minion device B which receives it. Minion device B determines that Minion device D should get the message next and transmits the message to Minion device D. Since Minion devices A and B are in communication, when Minion device B transmits to Minion device D, Minion device A also receives the transmission and recognizes it as the same message Minion device A previously send to Minion device B. This is an implicit acknowledgment that Minion device B received the message since Minion device B could not be handing off the message to Minion device D unless it received the message from Minion device A in the first place.

Explicit acknowledgment occurs in the following manner. Each Minion device is programmed to listen for an implicit acknowledgment of a transmitted message within a window of time (e.g., one second) after it transmits the message. If the originating Minion device does not receive an implicit acknowledgment from the intermediate Minion device within the window, the originating Minion device retransmits the message to the intermediate Minion device. If the intermediate Minion device receives the message for a second time, then it sends an explicit acknowledgment that it received the message. In other words, each Minion device is programmed to transmit an explicit acknowledgment when it determines that another Minion device which sent it a message does not know that the message has been received. For example, suppose Minion devices A and B communicate with each other, Minion devices B and C communicate with each other and Minion devices B and D communicate with each other. Suppose Minion device A sends a message to Minion device B to be passed along to a Minion device F. Minion device A transmits the message to Minion device B which receives it. Minion device B determines that Minion device D should get the message next and transmits the message to Minion device D. Since Minion devices A and B are in communication, when Minion device B transmits to Minion device D, Minion device A should also receive the transmission and recognize it as the same message Minion device A previously sent to Minion device B. However, if this does not happen, Minion device A will retransmit the message to Minion device B. Upon receipt by Minion device B of the same message from Minion device A, Minion device B will send a specific acknowledgment message to Minion device A indicating that it has received the previous message sent by Minion device A to Minion device B. This specific acknowledgment message is an explicit acknowledgment that Minion device B received the message.

All message transmissions and explicit acknowledgments are transmitted on the same reference frequency. Optionally, each Minion device maintains a table of contacts with probabilities so that it knows the more or less likely Minion devices with which it can communicate.

Modulation Methodology

Preferably, the modulation is continuous wave (CW), also referred to as 'on-off keying', and the bit coding uses a self-clocking Manchester code. This minimizes the power required for transmitting since the transmitter is on for exactly half the time during a message transmission, and is completely off at all other times. Manchester coding requires the receiver to be able to accurately detect signal edges: on-off or off-on transitions. These edges must occur within certain timing windows to be valid. This provides an opportunity for increased noise immunity and rejection of spurious transitions. The self-clocking nature of the bit coding means that there is no requirement for long-term clock stability, start/stop bits or zero-bit-insertion such as would be found in asynchronous or synchronous schemes.

Since modulation using Manchester-coded data is balanced, the signal rides on top of the background noise level and is very easy to detect. A simple automatic gain control provides rejection of background noise and detection of data signals over a wide dynamic range. Other modulation schemes and coding formats will be apparent to those skilled in the art.

The micro-controller 510 keeps time by a real time clock 530 which is periodically adjusted by a timed broadcasted signal to be in synchronization with the other time clocks of the network. The micro-controller 510 stores data to be transmitted in the data memory 520 and stores its operating software in a flash program memory 540. Optional expansion memory 550 for increasing the size of the data memory 520 may be provided. The power supply options and power control of the µMinion device 110 will be described below with regard to FIG. 7.

Network Timing and Control

The micro-controller 510 controls the transceiver 500 via an a/d converter 560 and a peripheral interface 570. The interface may be any communications interface such as a GPS receiver, GPS differential augmentation, wide area wireless network, local area wireless network, cellular modem, land line modem, satellite data modem, personal computer interface, PDA interface, or any other hardware or software system interface. A schematic of the Minion device is shown in FIG. 8 and operates according to the flow chart illustrated in FIGS. 9A–9E.

Figure 8:
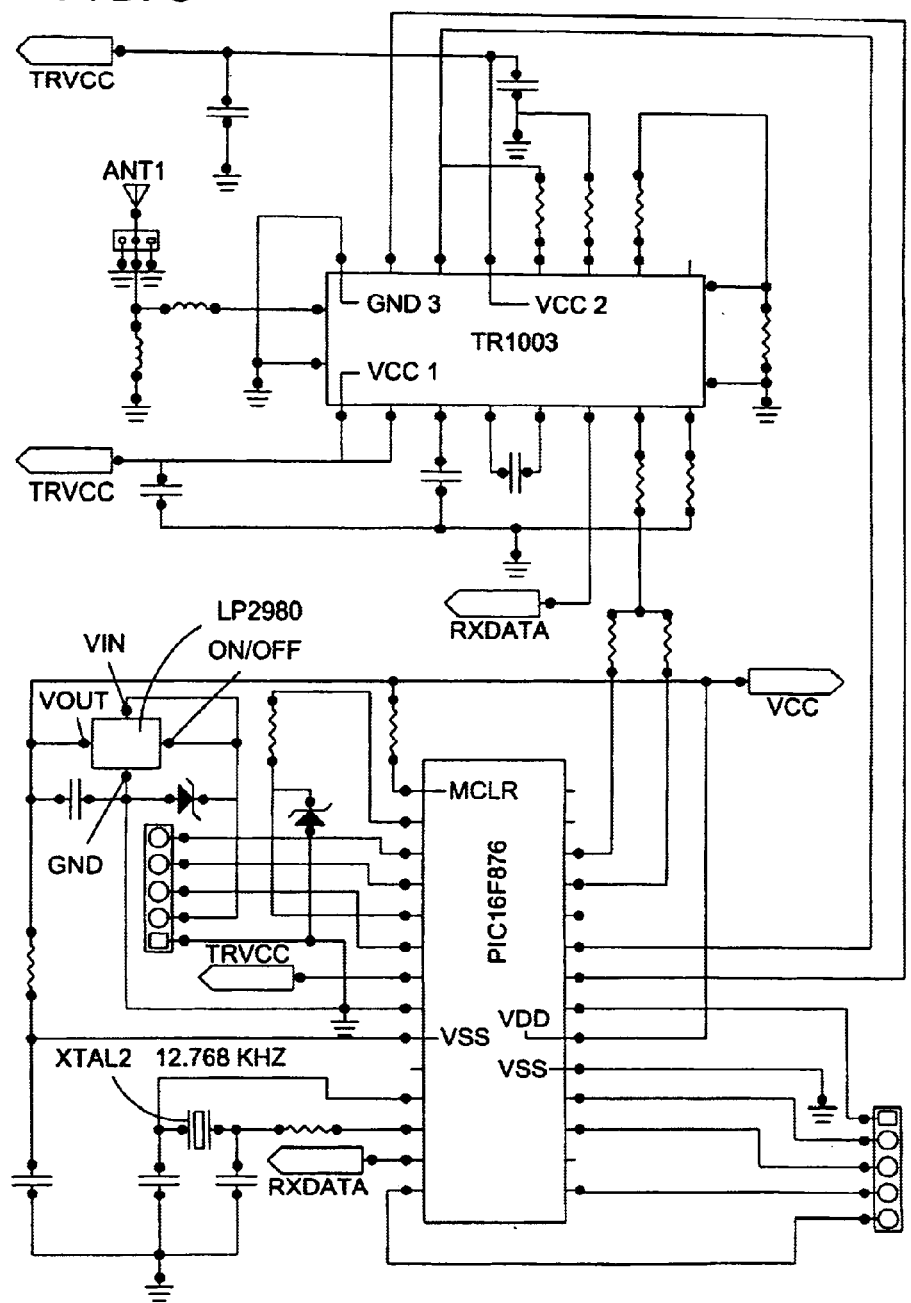
FIG. 8 is a schematic of the Minion™ device. illustrating the inputs/outputs to the micro-controller and the inputs/outputs to the transceiver.

FIG. 8 is a schematic of a µMinion device illustrating the inputs and outputs between the micro-controller 510 and the ASH transceiver 500.

Overall Operation

Figure 9:
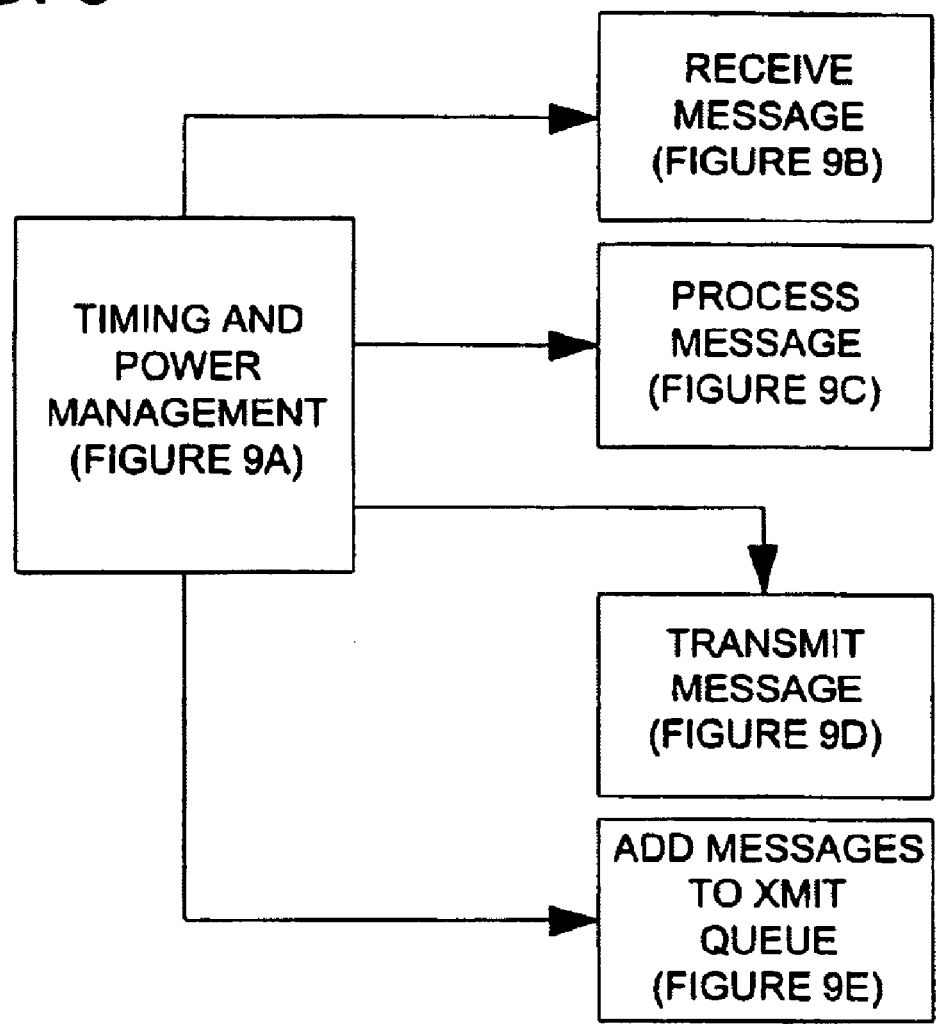
FIG. 9 is a block diagram illustrating the operation of the invention.

FIG. 9 is a block diagram of the Minion device according to the invention. Timing and power management is further illustrated in FIG. 9A, as performed by the micro-controller. Similarly, message receiving is illustrated by FIG. 9B, message processing by FIG. 9C, message transmitting by FIG. 9D and message adding to the transmit queue by FIG. 9E, each as performed by the micro-controller.

Figure 9A:
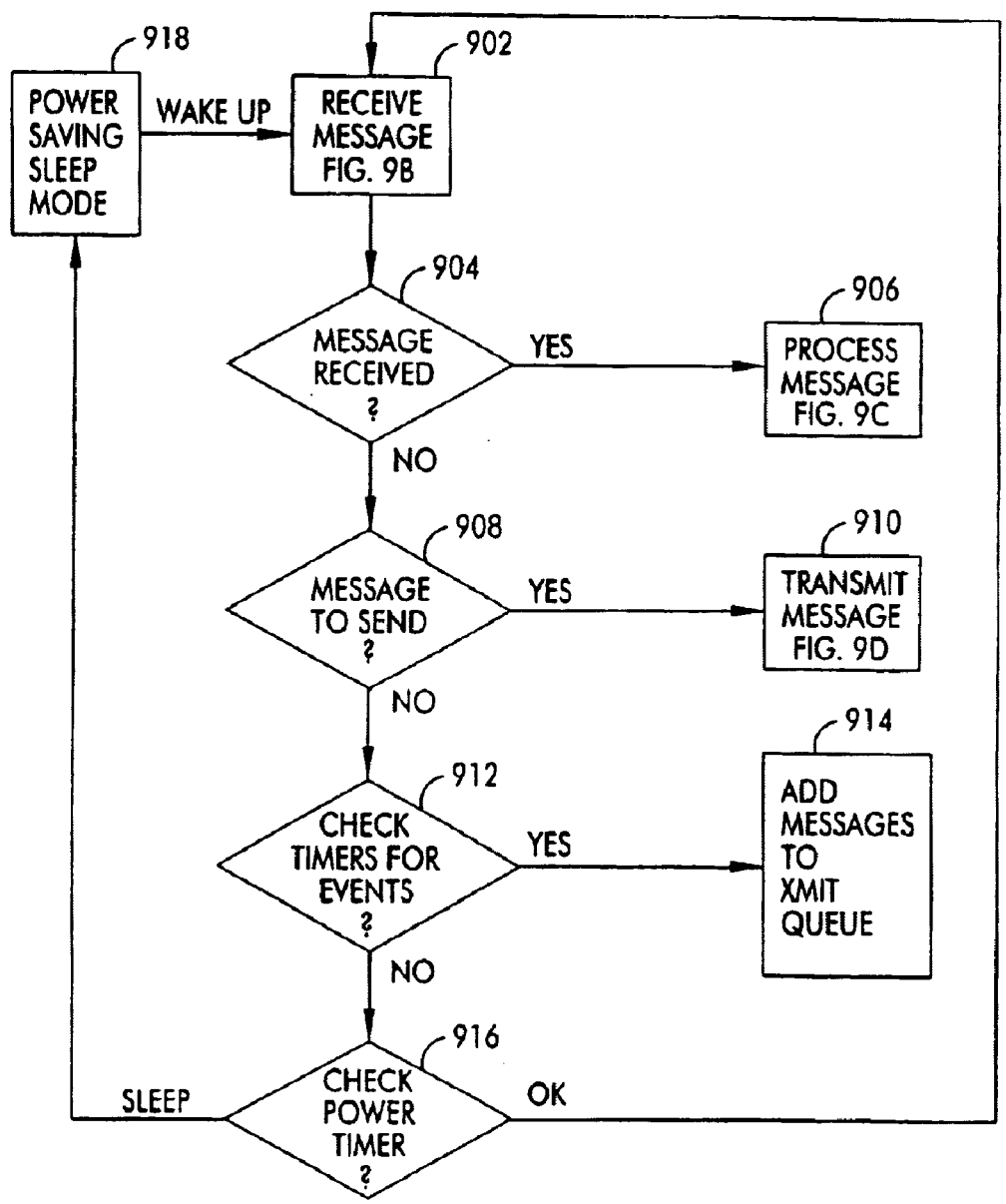
FIGS. 9A–9D are flow charts of the operation of the micro-controller.

FIG. 9A illustrates the overall operation of the micro-controller of a Minion device. The Minion device micro-controller is periodically energized from a power saving sleep mode to a wake up mode at step 902 to listen for a message. If a message is received at step 904, the micro-controller is processed at step 906 as indicated in more detail below in FIG. 9C. If no message is received at step 904, the micro-controller proceeds to step 908 to determine whether or not a message needs to be transmitted. If a message needs to be sent, the micro-controller transmits the message at step 910 (FIG. 9D). Otherwise, the micro-controller proceeds to step 912 to check the timers in its system for any events which may have occurred since the last sleep mode and wake up period. If events have occurred, the micro-controller proceeds to step 914 to add messages to the transmit cue. Otherwise, the micro-controller proceeds to step 916 to check the power timer. If the timer has not timed out, the micro-controller recycles to step 902 to listen for a message. If the timer has timed out at step 916, the micro-controller proceeds to step 918 to implement the power saving sleep mode until the next wake up call.

Figure 9B:
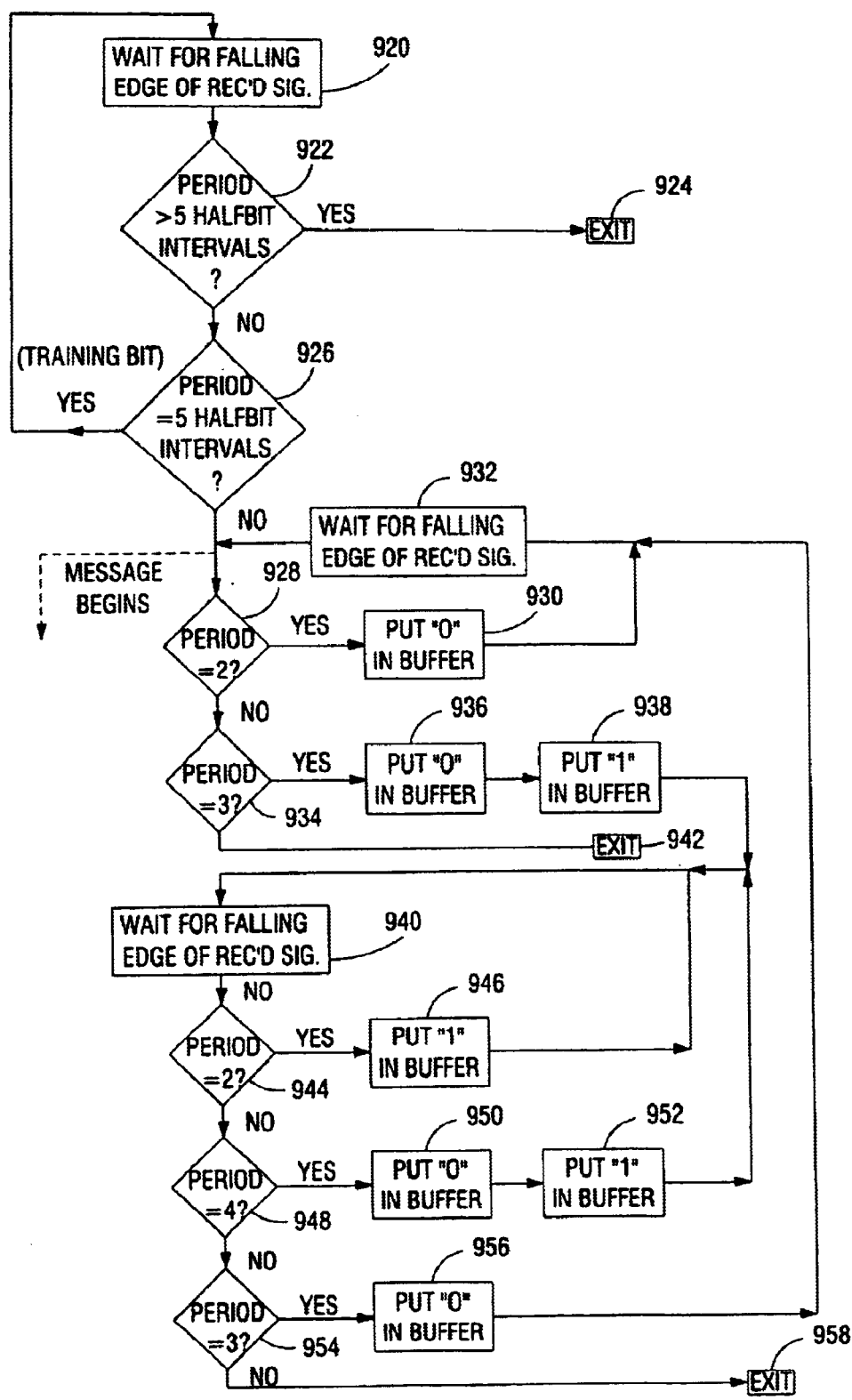

The micro-controller in implementing the flow chart of FIG. 9B employs a modified Manchester code receiving scheme. In general, the Manchester code takes every data bit and breaks it into two signaling or transmission bits. For example, a "01" (zero followed by one) corresponds to a "0" and a "10" (one followed by zero) corresponds to a 1. In this way, the number of transmitted bits is 50% ones and 50% zeros so that a 50% duty cycle results. As noted below, this allows receivers to more easily discriminate messages from noise. It also means that pattern sensitivity to the data is not needed.

In particular, the transmission of data via the MinionNet network according to the invention is accomplished at the lowest level using a modified Manchester encoding and data recovery method. In order to maximize reliability of data transfer in a single-frequency environment, it is necessary to ensure that there is a constant amount of energy in each bit of data in a message—regardless of whether that bit is a one or zero. This modified approach ensures that there will be no data-dependent conditions in which one message will be more susceptible to disruption by noise than another. This also ensures that claims related to bit-error-rate (at the heart of a proposed distance-measuring method) are not impacted by data dependencies.

Furthermore, the Manchester coding is self-clocking. There is one signal transition for every data bit so the transmitters and the receivers that comprise the transceivers do not have to have synchronized clocks and clock drifting is not a problem. Therefore, an accurate oscillator such as a crystal oscillator need not be used and other less accurate, less expensive oscillators, such as an RC oscillator, may be used. This self-clocking aspect guarantees at least one state transition (on-to-off or off-to-on) per bit. In particular, self clocking eliminates the need for clock synchronization between the transmitting transceiver and the receiving transceiver. Allowing wide variations in the system clocks used for generation and sampling of the data stream means that low cost Minion devices are possible, even including those that have no crystal oscillator for timebase generation. Also, Minion devices will still function over wide ranges of temperature and supply voltage. These factors traditionally mitigate against systems without stabilized oscillators.

Simply stated, Manchester codes replace each data bit with a pair of transmitted levels: a zero data bit replaced by a zero-one pair, and a one data bit replaced by a one-zero pair. The consequence exacted by this technique is that the minimum pulse width in the transmission medium is one half of the bit time for an actual data bit. This tends to lead to pulse distortion as the data rate reaches the maximum bandwidth of the channel for this modulation scheme.

Traditional demodulators try to oversample the levels from the receiver and recover the data based on the level pairs. An example technique tries to synchronize with a data bit interval and determine the direction of the transition that will occur in the center of the bit interval:.rising for a zero, falling for a one. This doesn't work in the presence of pulse-width distortion, level noise, or phase shifts that cause rising and falling edges to be displaced with respect to one another.

In one preferred embodiment of the invention, the Manchester code would be detected by falling edge discrimination. Generally, Manchester code is determined by measuring signal levels to determine the zero level and the one level. However, the invention contemplates that signal levels need not be determined. For example, by observing the behavior of the receiver and particularly the trailing edge of the bits, the message can be decoded. In particular, in order to decode the Manchester code, it is possible to measure the interval between falling edges to determine what the code is. Depending on whether the period between falling edge half bit intervals is two half bits, three half bits, or four half bits, this period determines whether the data results in a zero, a one or a zero followed by a one. This approach provides much more tolerance than an approach which measures the level of the bits and allows the receiver to maintain synchronization.

The encoding technique of the invention relies only on the time interval between falling edges of the received signal. Pulse distortion, phase shifts and level noise do not significantly affect the performance of this system. In addition, the characteristics of the preferred ASH receiver are such that the rising edge of the received signal pulse tends to be subject to significantly more jitter than the falling edge, especially with minimum receive signal strength. Therefore, falling edge detection means less jitter.

The Training Pattern has longer than normal pulses which result in falling edges that are 5 half-bit periods apart. This is detected and causes the receiving firmware to reset to its initial state. The purpose of these training bits is to condition the receiver to the signal levels that will be encountered in the message. The first training bits will usually not be detected. The system of the invention sends three training bits so that the receiving transceiver is properly conditioned at the end of the third. Specifically, the receiver must be able to reliably detect the falling transition labeled "Critical Edge" in the timing diagram of FIG. 9E. This marks the beginning of the data stream. Since we must have a falling edge here, the first bit in the data stream must be a zero. The transmitter artificially inserts this zero. The actual data message follows, and may begin with either a zero or one. Thus, the interval following the critical edge may be either two or three half-bit-times. The MinionNet network receiver uses this interval to build the data stream into the receiver buffer. The standard MinionNet network Message is 256 bits long. Preliminary error detection occurs in the Receive Message firmware itself, since bit intervals must allow correct detection of these data patterns and the number of bits must exactly conform to the message standard.

One preferred implementation uses interrupt-driven firmware which is triggered for each falling edge. This means that there is at most one interrupt per data bit.

Receive Message Operation

FIG. 9B illustrates the receive message flow chart of step 902 of FIG. 9A. To receive a message, the micro-controller initially waits for the falling edge of the signal received by the transceiver at step 920. If the period between falling edges is greater than 5 half bit intervals, as determined at step 922, the micro-controller exits the receive mode at step 924 assuming that this period means that no message is being transmitted. Otherwise, the micro-controller proceeds to step 926. If the period between edges is equal to 5 half bit intervals, this means the signal is a training bit and the micro-controller returns to step 920.

Otherwise, the micro-controller proceeds to step 928 to determine if the period between the falling edges is equal to two half bit intervals. If it is, this indicates that it corresponds to a zero data bit and a "0" is input into the buffer by step 930. The micro-controller then proceeds to step 932 to wait for the next falling edge from the received signal. If the period between falling edges is not equal to two, the microprocessor proceeds to step 934 to determine if the period is equal to three half bit intervals. If it is, this indicates two data bits, a zero followed by a one in which case the micro-controller inputs a "0" in the buffer at step 936 followed by a "1" input at step 938. Thereafter, the micro-controller proceeds to step 940 to wait for the next falling edge from the received signal. If the period between falling edges is not equal to three half bit intervals as determined by step 934, the microprocessor exits as step 942 on the basis that no message has been received.

At step 940, the micro-controller is again waiting for the next falling edge from the received signal. If the period between falling edges is equal to two half bit intervals, as determined by step 944, the micro-controller inputs a "1" in the buffer by step 946 and returns to step 940 to wait for the next falling edge. If the period does not equal two half bit intervals, the micro-controller proceeds to step 948 to determine whether the period equals four half bit intervals. If it does, a zero is stored in the buffer by step 950 followed by a one stored in the buffer by step 952. Otherwise, the micro-controller proceeds to step 954 to determine if the period equals three. If it does, a zero is stored in the buffer by step 956. Otherwise, the micro-controller exits the program by step 958.

In general, step 932 waits for the falling edge of the signal after a zero bit so it is the next step after steps 930 and 956. On the other hand, step 940 waits for the falling edge after a one bit so it is the next step after steps 938, 946 and 952.

Message Processing Operation

Figure 9C:
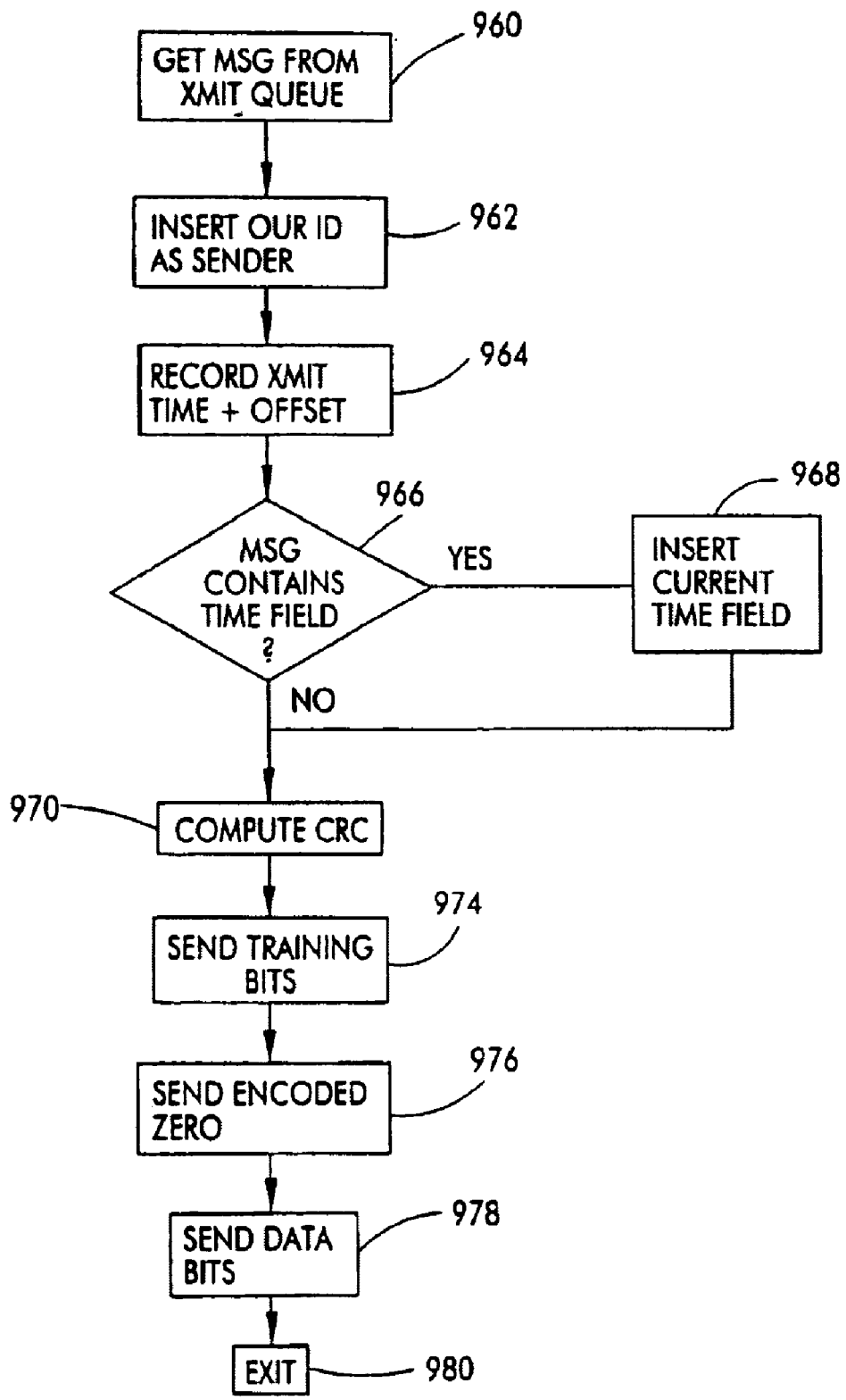
Figure 9D:
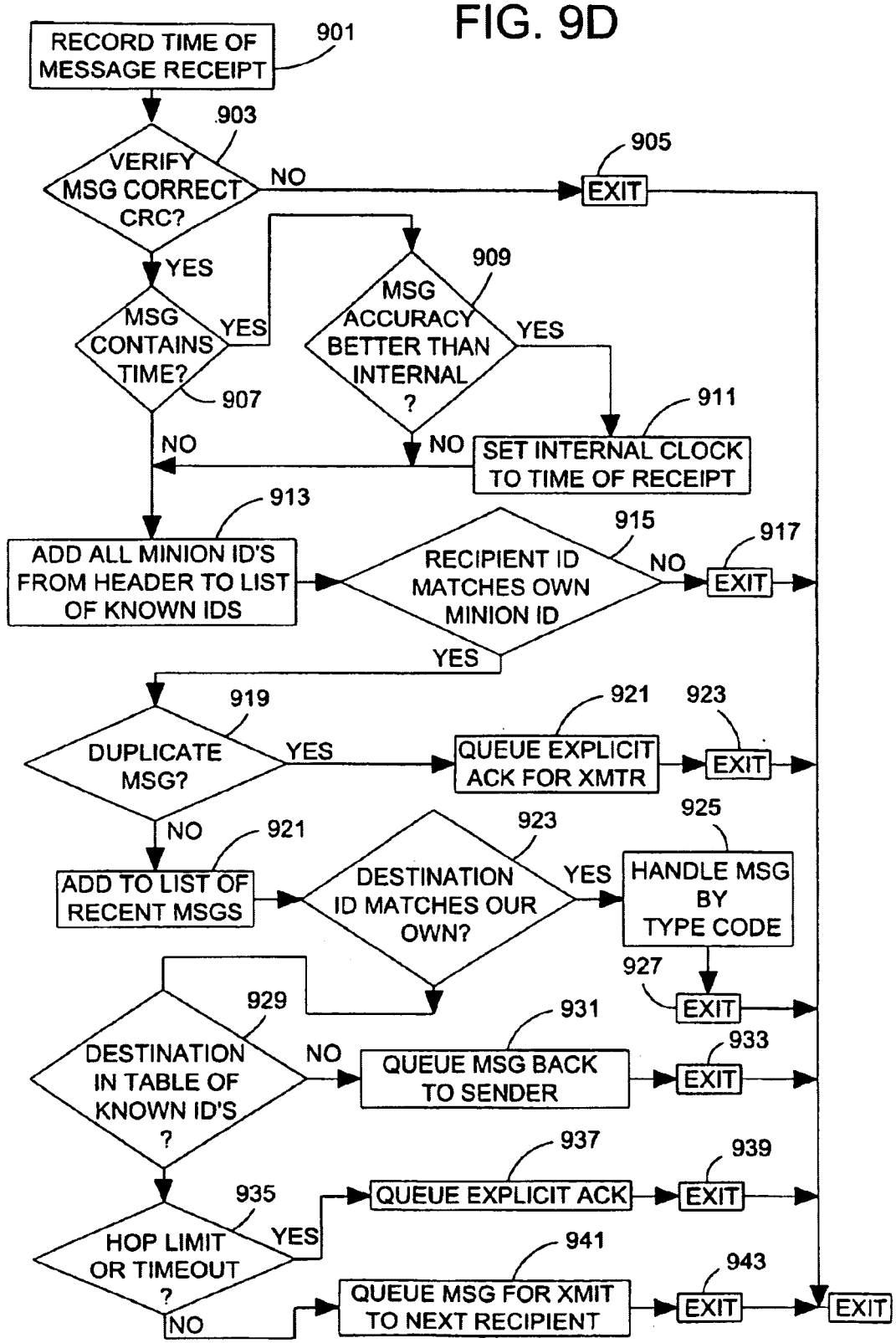
Figure 10B:
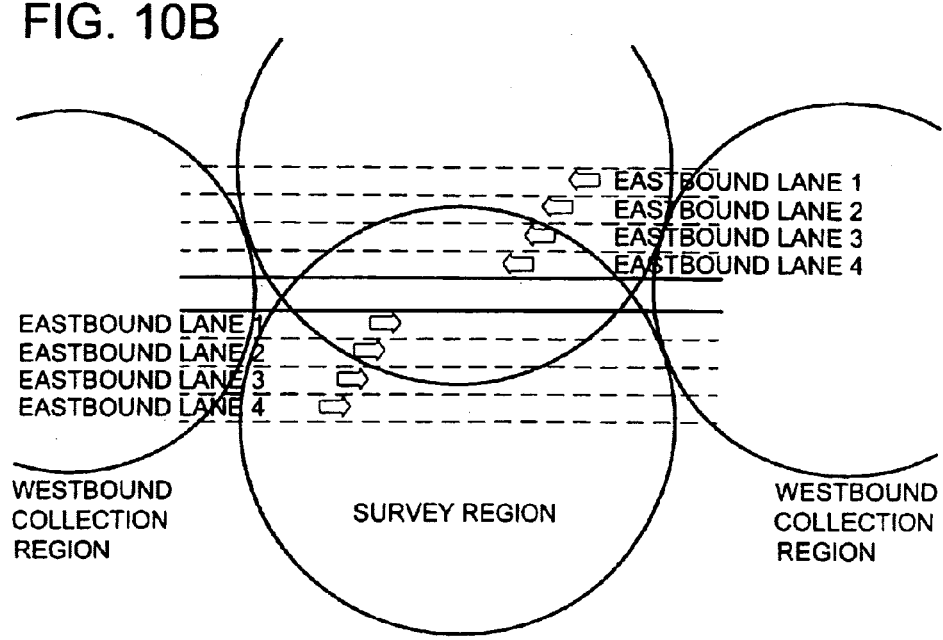
Figure 11B:
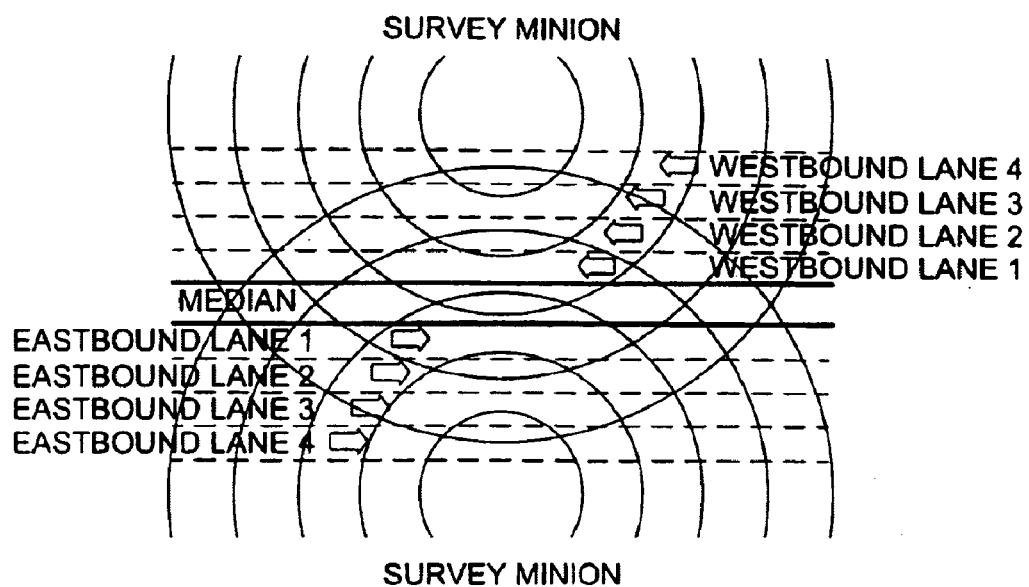

FIG. 9C illustrates the process of processing a message as indicated by step 906 of FIG. 9A. In particular, the micro-controller retrieves the message to be processed from the transmit queue at step 960, inserts its identification as the sender as step 962, records the transmit time and offset at step 964, and then proceeds to step 966 to determine whether or not the message contains a time field. If it does, the micro-controller proceeds to step 968 to insert the current time in the field. Otherwise, the micro-controller proceeds to step 970 to compute the CRC for error detection (i.e., the cyclic redundancy check). It proceeds to step 974 to send the training bits followed by an encoded zero that is sent at step 976 followed by the data bits which are sent by step 978. Thereafter, the micro-controller exits the process message mode at step 980.

Transmit Message Operation

FIG. 9D illustrates the transmit message mode of the micro-controller as indicated by step 910 of FIG. 9A. In FIG. 9D, the micro-controller records the time of message receipt at step 901. Next, it proceeds to step 903 to verify that the message is correct by examining the CRC. If it is not correct, the micro-controller exits at step 905. If the message is correct, the micro-controller proceeds to step 907 to determine if the message contains a time field. If it does, the micro-controller proceeds to step 909 to determine whether the accuracy of the message is better than the internal accuracy of the micro-controller. If it is, the micro-controller sets its internal clock to the time of receipt at step 911. Otherwise, the micro-controller proceeds to step 913 to add all the Minion device identification numbers within the header of the message to the list of the known IDs. At step 915, the micro-controller determines whether the receipt ID of the message matches its own identification. If it does not, it exits at step 917. If it does, it considers whether the message is a duplicate by step 919. If it is, the micro-controller instructs the transceiver to transmit an explicit acknowledgment at step 921 by flagging the acknowledgment cue and then by exiting at step 923. If it is not a duplicate message, the micro-controller adds the message to the list of recently received messages at step 921 and looks at the destination identification of the message at step 923. If the destination ID matches the ID of the micro-controller, the micro-controller executes step 925 to handle the message according to its type code and then exits at step 927. Otherwise, the micro-controller determines whether or not the destination of the message is in the table of known IDs by step 929. If it is not, the message is cued back to the sender by step 931 and the micro-controller exits at step 933. If the destination ID is in its table, the micro-controller determines at step 935 whether the hop limit or time out of the message has been exceeded. If it has, an explicit acknowledgment is cued by step 937 and the micro-controller exits as step 939. Otherwise, the micro-controller cues the message for transmission to the next recipient at step 941 and exits at step 943.

Although not shown in FIG. 9B, it is possible to include a counter after each bit is entered into the buffer to ensure that no more than 256 bits which equals one message are stored in the buffer. Alternatively, each time a bit is stored in the buffer, the micro-controller can check for overflow at that point. In other words, step 904 can include the function of determining that the number of bits for the particular message is correct. In addition, step 904 performs a CRC (cyclic redundancy check) calculation to confirm that there is a high probability that the message is accurate.

Protocol

The messages handled by the MinionNet network can be thought of as being 32 bytes long and transferred at 9600 baud, although other data rates are feasible. Each Minion device has a unique 32-bit serial number assigned during manufacture. This gives over four billion numbers, although number reuse is not as big an issue in this environment as it is in some others. Each message will contain space for four of these serial numbers: (1) the message originator, (2) the message final destination, (3) the device actually transmitting for this hop and (4) the intended receiver for this hop. Messages also contain a set of standard fields for message type codes, device status bits, message priority and handling bits. A payload area will contain application specific data such as geolocation information, time/date, etc., as determined by the message type codes. In addition, the protocol specifies a cyclic redundancy check (e.g., CRC-16) used to detect errors encountered during transmission. The message length and data rate combine to give a maximum of approximately 20 messages per second to or from a single node. The normal operation of the network will tend to keep the actual average rate down around one message every few seconds. The actual radio modulation scheme provides easily detected balanced modulation with self clocking data bits. This allows wide variations in microprocessor clock performance with temperature and eliminates the need for a crystal oscillator.

The basic protocol is completely connectionless and each message is treated as an independent datagram. Protection mechanisms are built in to ensure robustness, but delivery of any individual message is not guaranteed. The database server may initiate enquiries into the distributed network and ask for retransmission of suspected missing messages.

The purpose of certain applications is to detect missing items and generate an exception report or alarm. Much useful information may be derived from interrogating the message routing tables of nearby nodes to establish a Minion's last known location.

Transmission Methodology

The Minion device transceivers are 'half-duplex' devices, meaning they cannot transmit and receive at the same time. Several methods are used to avoid collisions (two nodes transmitting at the same time and garbling the message for the recipient). First, not all collisions will result in message corruption. If the receiver is not 'in range' of both transmitters it is unlikely that the message will be corrupted. Second, the level of traffic may be kept low and interval randomization techniques may be used to reduce the likelihood of simultaneous transmissions. Third, all messages are implicitly acknowledged when they are forwarded on the next hop, and explicitly acknowledged when received at their ultimate destination. Automatic retransmission and elimination of duplicate messages are features of the protocol.

Optional Protocol Features and Extensions

Since the basic operation of the MinionNet network provides for precision time synchronization between devices it is possible to implement additional features that will enable significant power savings for applications that need it. Battery powered devices which operate in TDMA modes with dynamically adjustable windows may be capable of extraordinarily low average current drain. These Minion devices would not directly participate in the normal message routing in the network, but would send and receive their own application-specific data via other Minion devices in the vicinity that did not have such extreme power constraints.

Certain applications will require the ability to transfer larger amounts of data than can be contained in a single packet. These applications will use a set of extensions to the basic MinionNet network Protocol. Minion devices will pair up for point-to-point burst data communications. A section of memory in each Minion device to be set aside as a buffer. Once these buffers are initialized the routine operation of the network will cause the data in one buffer to be duplicated in the buffer of the other Minion device. The mechanism for the transfer is referred to as semi-streaming because data is sent in packetized form at a high rate without explicit acknowledgment of each packet. Any missing packets are transmitted again; correctly received packets are never sent again, even if they were received in the wrong order. The maximum length of these extended data messages will be governed by the amount of memory available in each Minion device. Each Minion device may have multiple buffers and may be engaged in sending or receiving multiple messages concurrently. Each message may have an explicit primary function and other implicit functions (e.g., the content of a message and the fact that a message has been sent are two useful pieces of information which can be derived from a single message.

Once a message buffer is completely received and acknowledged the Minion device will examine the message and act on its contents. If the message has reached its final destination there may be any application-specific action necessary. If the message has reached an intermediate Minion device, the message will be forwarded on the next hop using the same burst protocol. The hop-to-hop routing is the same as for basic Minion device operation. Note that the burst data protocol causes an entire message to hop intact from one Minion device to the next. Messages will never be split or follow more than one route to their destination. This allows the burst data to be sent as a series of point-to-point messages that do not require the overhead of full routing information in each packet. The message originator, final destination and other header data are part of the full message, not each individual packet. Burst data thus has a lower overhead per byte than normal network traffic. Burst data is intended to be sent over reasonably robust, stable network segments.

Protocol extensions include the ability to explicitly acknowledge standard messages from multiple originators in a single message. The identification of the recipients is implied because recipients will scan their tables of recently sent messages (see below) to see if they had sent a message with the particular originator/sequence number pair for the standard message. For example, a multiple message acknowledgment may include the following fields: type code indication that this is a multi-message acknowledgment; the serial number of the Minion device transmitting the message; and a list of the originator's identification and sequence numbers that uniquely identify each message that is being acknowledged.

Data Transmission

Data transmission is accomplished by keying the transceiver in a transmit mode ON and OFF which makes the data easier to separate from background noise at the receiver and which reduces the power requirements over FM transmission schemes by 50%. As mentioned above, all packets are encoded using a modified Manchester code to provide a DC balanced data stream (50% duty cycle on the transmitter).

Transmissions begin with a training sequence of balanced pulses having a unique duration indicating that the pulses are training pulses and not data or some other information. The end of the training sequence will be signaled by a valid data bit with a value of zero. The message data will follow immediately after the end of the training sequence. Balanced coding ensures that each data bit will have equal periods of carrier OFF and carrier ON operation. A zero data bit is represented by an OFF-ON (or zero-one) transition and a one data bit is represent by an ON-OFF (or one-zero) transition.

The balanced coding enables accurate separation and detection by the transceiver of the data bits from the background noise in the receiver. In addition, balanced coding makes each bit self-clocking so that a precision time reference and synchronization for data transmission and reception is not required. Preferably, the microprocessor need only be able to distinguish three different pulse lengths received by the transceiver: ½ (half-bit), 1 (two half bits) and 1½ (three half bits) times the data bit rate. In one preferred embodiment, decoding is based on measuring the interval between the falling edges of the FR carrier signal. This is preferred over level detection since the transceiver can run at a lower sample rate.

Minion devices preferably include a hybrid transceiver that includes an ASH receiver, as described above. Falling edge detection and timing is accomplished with hardware in the micro-controller and is superior to leading edge detection since the leading edge in the ASH receiver transmission suffer from significant time jitter. Trailing edges tend to have less jitter.

Although any standard of error detection and correction may be used, it is preferred that each data message include a CRC-16 for error detection. Error correction bits may be included in the message to correct transmission errors.

In one preferred embodiment, it is contemplated that the transceiver output power be less than one (1) milliwatt, although other minimums may be implemented. For 1 mW, the effective transmission range would be about 100 meters. The power output relates to the range and the two parameters must be selected and adjusted based on the particular network implementation. For 1 mW at 100 m range, needless interference between adjacent Minion devices is prevented, particularly when the Minion devices are geographically dense. The micro-controller may control the actual power output steps to reduce interference even further in very dense areas.

Message Collision Avoidance

Since, to some extent, each Minion device is an independent transmitter, it is possible that two Minion devices may transmit simultaneously causing a collision of messages. Those skilled in the art will recognize many ways of preventing or minimizing such collisions. In one preferred embodiment, the protocol of the invention increases the interval between transmissions from a particular Minion device if the Minion device determines that a high density of data traffic is occurring. For example, before beginning the transmission of training bits at the start of a message, the transceiver in the receive mode will be used to listen for balanced data transitions that would indicate another message being transmitted in the vicinity. If such balanced data transitions are detected, transmission of a message will be delayed by a randomly selected amount of time before attempting transmission again. For example, this type of delayed transmission interval is referred to as a modified ALOHA procedure similar to the protocols used by Ethernet and Mobitex. Delaying the message helps prevent the collision of two messages which could cause garbling of both messages or corruption of either or both messages. One result of this approach is that it inherently increases the interval between transmissions from any particular Minion device in a crowded area. The benefit of this increased interval is that it limits the total RF signal strength radiated by all Minion devices in a particular area thereby reducing the possibility of collisions. This will also reduce the power consumption by individual Minion devices in crowded areas and will maintain a near-constant probability of successful message transmission.

Connectivity and Shared Resources

It is contemplated that connectivity on the local MinionNet network may be provided by external communications interfaces well known in the art. For example, mµMinion devices with external two-way communication capability may be employed as gatewayMinion devices. Such external communication between a gatewayMinion device and the system database allows messages to reach the central database so that the messages can be made available to users or customers via the Internet or other networks which interface with the system database.

In addition, Minion devices located in close proximity to each other may share the resources connected to their close Minion devices via their wireless MinionNet network connection. For example, Minion devices without a global positioning system receiver can learn their approximate position by communicating with a nearby Minion device with a GPS receiver, as described above in the section on virtual geolocation. Also, Minion devices without Internet connectivity can contact the Internet via a gatewayMinion device which is connected with the Internet.

Timing

All Minion devices maintain internal clocks which are synchronized with coordinated universal time (UTC) via a geoMinion device and the global positioning system (GPS). The precision time is maintained to approximately 1 millisecond in order to allow coordinated transmission and reception of the protocol messages. GeoMinion devices connected to the GPS are programmed to frequently broadcast high precision time messages to re-synchronize other Minion devices within the network. In addition, if a Minion device loses power or loses contact with the MinionNet network is programmed to recognize that its clock accuracy may be degraded and to defer to other Minion devices with more accurate clocks when synchronizing throughout the network. It is also contemplated that Minion devices may maintain local time zone offsets based on their geographical location. Internally, Minion devices maintain GPS time which is a monotonically increasing count of seconds. The conversion to UTC is handled on an as-needed basis.

It is also contemplated that Minion devices maintain an epoch correction and a magnitude correction for changes in time information to be implemented. For example, leap seconds may be inserted or deleted at scheduled times throughout the year as broadcast by the GPS satellites. The time at which a second will be inserted or deleted will be scheduled throughout the MinionNet network. In addition, local time changes caused by daylight saving time will be scheduled in advance and broadcast throughout the network.

Each Minion device is assigned a unique serial number which is installed during manufacture that identifies that particular Minion device so that each Minion device is unique. This allows Minion devices to distinguish themselves from each other and one Minion device from another. Minion devices may be programmed to receive messages from all other Minion devices in the vicinity on a continuous basis. "In the vicinity" may mean Minion devices within range or Minion devices within range at a particular time. Alternatively, it is also contemplated that Minion device transceivers may be selectively activated and turned on for short periods of time and off at other periods to conserve power. It is further contemplated that if a Minion device receives only during certain intervals, the interval during which it is receiving may be derived from the Minion devices' unique serial number so that other Minion devices can determine when to transmit to a particular Minion device which is normally off. Messages directed to a Minion device that does not receive continuously will be transmitted during the appropriate interval as defined by the serial number. Those skilled in the art will recognize other ways of conserving power and permitting intermittent operation of the Minion devices.

Message Header and Flags

Messages which are transmitted between Minion devices will each contain a header area and a data area. The header area will contain the following bit fields:

a. the serial number of the Minion device generating the message (originator);

b. the serial number of the Minion device transmitting the message (sender);

c. the serial number of the Minion device intended to receive this message (recipient);

d. the serial number of the Minion device intended as the final destination of this message (destination);

e. the number of hops that this message has taken (so far) toward its final destination;

f. the maximum number of hops that this message will be allowed to take;

g. a sequence number for this message created by the originator of this message;

h. a timeout indicating the time at which this message will expire if it has not reached its final destination;

i. a set of flags that control the disposition of this message and indicate the status of the sender or originator;

j. a type code that controls the interpretation of the data portion.

Type codes include but are not limited to the following: position, time, history, request/response, command, application specific data, velocity, prefix, Init stream, weather and firmware. It is contemplated that the data area in the MinionNet network message may be encrypted or transmitted as plain binary text. Preferably, if encrypted, encrypted data would use a public key crypto system that allows only the Minion device at the final destination of the message to decrypt the data. Plain text data may be examined by any Minion device that receives the message. Some plain text data may be encoded in an application specific manner accessible only by other Minion devices with firmware tailored to the application. The meaning of this data may not be publicly available to all Minion devices.

Messages including both the header and the data areas are forwarded from one Minion device to the other toward their intended destination. In this way, the range of each Minion device is extended to the range of the local MinionNet network and well beyond the range of any single transceiver. Messages may also be collected by a mobile Minion device which acts as a messenger delivering messages at a later time to Minion devices too far away to be reached directly.

As noted above, implicit acknowledgement of message receipt takes place as follows: a message originated by Minion device A is sent to Minion device B with an ultimate destination of Minion device C. When Minion device B transmit the message to Minion device C, Minion device A can also hear the transmission and is then certain that Minion device B received it correctly. Under some circumstances, implicit acknowledgement will not occur. Messages that are not acknowledged explicitly are sent again after a suitable delay. Upon receipt of multiple instances of the same message, the recipient will generate an explicit acknowledgement by transmitting the message with a null recipient. This acts as an acknowledgement without the possibility of a recipient trying to forward the message and wasting power and bandwidth.

The message Flags may include indicators with the following meanings. These Flags may not be explicitly present in the Header or other part of the message. They may actually be represented by combinations of values in other fields. The presence of the information indicated by the following descriptions allows many of the features and application of the MinionNet network to operate:

a. Forward All Messages/Forward Only Most Recent Message

Allows message consolidation when multiple messages from the same originator reach the same messenger or gateway before the earlier messages can be delivered. Also allows elimination of old messages in the event of a path failure.

b. Priority

Controls the intervals during which the first and subsequent attempts will be made to pass the message along toward the ultimate destination.

c. Specific Path/Any Messenger

Messages normally follow a single path, but sometimes it is appropriate to allow a single transmission to address all messengers in the area. Each messenger that receives the message will then attempt to deliver the message without explicit acknowledgment to the sender. As an example, a message uses this flag mechanism for vehicle travel time studies.

d. Area-Wide Announcement

The message is for the benefit of all Minion devices in an area. The area is defined by the number of hops in the Hop Limit field. No acknowledgment is made and the final destination is the null device.

e. I Can Act As a Messenger

Flag is set to indicate the ability of the transmitting Minion device to forward messages to others. Normally cleared in Minion devices that have power or memory limitations.

f. I Already Got this Message

Used to explicitly acknowledge receipt of a message. The actual representation of this flag will be having the intended recipient of the message be set to the null device.

g. I No Longer Have a Path to this Final Destination

Used to return a message to the sender to indicate a change in the routing tables.

h. Battery Low

The transmitting Minion device has a low battery. Used to allow location of devices that need batteries changed using a direct specialized receiver. Low battery or power level signals may also be sent via the MinionNet network itself to generate exception reports indicating the need for new batteries. Non-battery powered units may not be able to generate this signal.

i. I am a High Power Unit

I have no restrictions on the number of transmissions I can make, i.e., unlimited power supply. I can act as a preferred messenger. Used to help establish routing tables. The Flag may automatically change state. For example, a solar powered Minion device might claim High Power status only on clear days. At night and on cloudy days it might claim not to be High Power.

j. I am in Power Save Mode

Minion devices in Power Save Mode only listen for messages at infrequent intervals. The window during which the receiver is enabled is determined in part by the Minion's serial number. This allows Minion devices with messages directed toward the Power Save unit to know when to transmit. Multiple levels of Power Saving may be implemented to allow lower average power consumption. The power save mode may be adjusted dynamically by the Minion device itself.

k. Beacon Transmission

This indicates a blind transmission by a Minion device that is unable to receive. This may be deliberately implemented for a low cost application. It may be the result of a hardware failure. It may be the natural consequence of a solitary Minion device that is unable to receive because there is no other Minion device transmitting in the area. Beacon transmissions will be very infrequent and help to bootstrap isolated Minion devices as they become members of a group.

l. You Must Act as a Messenger

Used to force a message to be accepted by a Minion device, even though it has no current path to the Final Destination and would normally reject the message.

m. Request Response from 'New Arrivals'

This is a request for any Minion devices that have not communicated directly with the Transmitting Minion device to schedule and send a response message. This allows the routing tables to be updated, and provides a census of new Minion devices in the area.

n. Hold Off Responding Again

Normally used to acknowledge responses from 'New Arrivals' and to allow repeated polling to be sure to identify all new Minion devices.

o. Request Response from 'Old Timers'

This is a request for all Minion devices that have already communicated directly with the Transmitting Minion device to schedule and send a response message. This maintains the routing tables and allows for the timely deletion of Minion devices that move out of the area.

p. Request Response from Everybody

This is a request for all Minion devices to schedule and send a message to the Transmitting Minion device. This maintains the routing tables in a sparsely populated environment.

q. Transmit Signal Strength

Minion devices may be equipped with the ability to adjust the actual transmitted power in steps. This Flag indicated the power level that is being used for this particular transmission.

r. Receive Signal Strength

This flag is used to indicate the strength of the signal of the most recently received message from the intended recipient of this message. This provides the feedback necessary to allow each Minion device to adjust the output power to the level necessary to accomplish error-free transmissions with minimum interference with adjacent Minion devices.

s. I am a GatewayMinion Device

This Flag indicates that the Minion device is capable of forwarding messages directly to a particular centralized database and onto the Internet.

t. I am an Anchored Minion Device

This Flag indicates that the position messages sent by this Minion device are generally reliable but not based on GPS. In addition, this Minion device does not move, so continued long-term contact with this Minion device implies a minimal amount of motion on your part. Long-term position computations using anchored Minion devices as references will be of high quality.

u. I am a Portable Minion Device

This Flag indicates that the Minion device is normally stationary and can participate in position computations, but it may move and has no 'installed position'.

v. I am a Dynamic Minion Device

Minion devices attached to cars or carried by people. Frequently moves at high speed. Candidate for a Messenger, but not for position computations.

w. Send this Message through a Central Mailbox

This flag overrides the destination field to cause the message to be routed via the nearest gateway to the centralized database. The central database server will then send the message out to the gateway that most recently claimed to be able to communicate with the actual destination Minion device. Allows Minion-to-Minion device communication over the complete geographic area of the MinionNet network. Also allows messages to be centrally stored for later delivery if Minion devices are temporarily out of coverage or powered off.

Data Portion of Message

The Data portion of a MinionNet network Standard Message with a Type Code meaning "Position" will contain the following bit fields: Quality—estimate of the accuracy of the position value; Latitude; Longitude; Height—above a standard reference datum such as WGS84 derived from GPS readings; and Time—in seconds at which the position was derived.

MinionNet network Standard Message with a Type Code meaning "Position" are used to provide the virtual geolocation services to all Minion devices. Each Minion device will periodically transmit a message declaring its current best estimate of its own position. Minion devices equipped with GPS receivers that are currently receiving good quality data from the GPS constellation will provide the highest accuracy position messages. Fixed Minion devices permanently installed in stable structures will be able to provide high accuracy position messages without the cost of GPS equipment, and in locations in which GPS will not work (e.g. underground). Minion devices may derive increased accuracy in their estimated positions by receiving "Position" messages from multiple high-accuracy sources. Possible methods of calculating an improved position include:

1. Use a simple average of position values received. Use a weighted average based on number of hops from each reporting location.
2. Use an estimate of distance based on signal strength from each other Minion device.
3. Use a statistical method based on any information available to the Minion device.

The Data portion of a MinionNet network Standard Message with a Type Code meaning "Time" will contain the following bit fields:

Quality—estimate of the accuracy of the position value; Time—time with precision of 1 millisecond; Zone—offset of current time zone based on position; ChangeEpoch—time at which UTC or zone offset will change; and NewValue—value for new time zone offset or change to UTC.

MinionNet network Standard Message with a Type Code meaning "Time" are used to perform the synchronization of Minion device clocks throughout the network.

The Data portion of a MinionNet network Standard Message with a Type Code meaning "History" will contain multiple copies of a Quality/Time/Latitude/Longitude position history record. This is used to convey a travel history for the originating Minion device in a compact message format.

The Data portion of a MinionNet network Standard Message with a Type Code meaning "Velocity" will contain multiple copies of a Quality/Time/velocity/Direction history record. This is used to convey a velocity history for the originating Minion device in a compact message format.

The Data portion of a MinionNet network Standard Message with a Type Code meaning "Application-Specific Data" will contain data values that are interpreted by the devices attached to the final destination Minion device. This data is usually encrypted. The data is not interpreted or modified in any way by the intermediary Minion devices. It may be collected and stored for later retrieval in the MinionNet network database associated with the specific destination.

The Data portion of a MinionNet network Standard Message with a Type Code meaning "Command" will contain information originating with the MinionNet network Control Center that causes certain operations to be performed by the Minion device and results to be sent back to the Control Center. This can be used to set operating modes or data throughout the MinionNet network.

The Data portion of a MinionNet network Standard Message with a Type Code meaning "Request/Response" will contain a compressed representation of formulas used to compute certain results based on the values of memory locations and counters maintained by application-specific operations performed within the Minion device itself. These application-specific data and computations are performed and formatted into messages that are shared locally in the MinionNet network. Final results in a compact form may be sent via gateways to a central server or the Internet. Examples of the calculations that may be performed locally include Total Counts, Counts per Time Interval, Averages, Sums, Differences, Ratios, Maxima, Minima, etc. The data on which these formulae operate may include any data field from any message sent or received, data fields contained within the internal routing tables, and data fields contained within records received from attached hardware devices. The results of these computations may be used for further computations or for direct inclusion in an application-specific data message to be transmitted to other Minion devices or to a central Database or the Internet.

The Data portion of a MinionNet network Standard Message with a Type Code meaning "Prefix" will contain the high order bits of several fields from the Standard Message Header and Position records. In particular, the current Latitude, Longitude, Time and the Serial Number of the Transmitting Minion device all represent long binary fields whose leading bits are generally common to all Minion devices in an area or are redundant in that they provide no significant additional information. Transmitting them with every message would be wasteful, so they have been moved to the infrequently transmitted "Prefix" message.

The Data portion of a MinionNet network Standard Message with a Type Code meaning "Init Stream" will contain the data necessary to initiate a Semi-Streaming transfer of a large block of data directly from one Minion device to another. The message will contain fields which indicate the total size of the block of data to be transferred, a timeout value after which the transfer will be aborted, and an interval between acknowledgments to be sent by the recipient.

Antennas and Physical Embodiments

Figure 15:
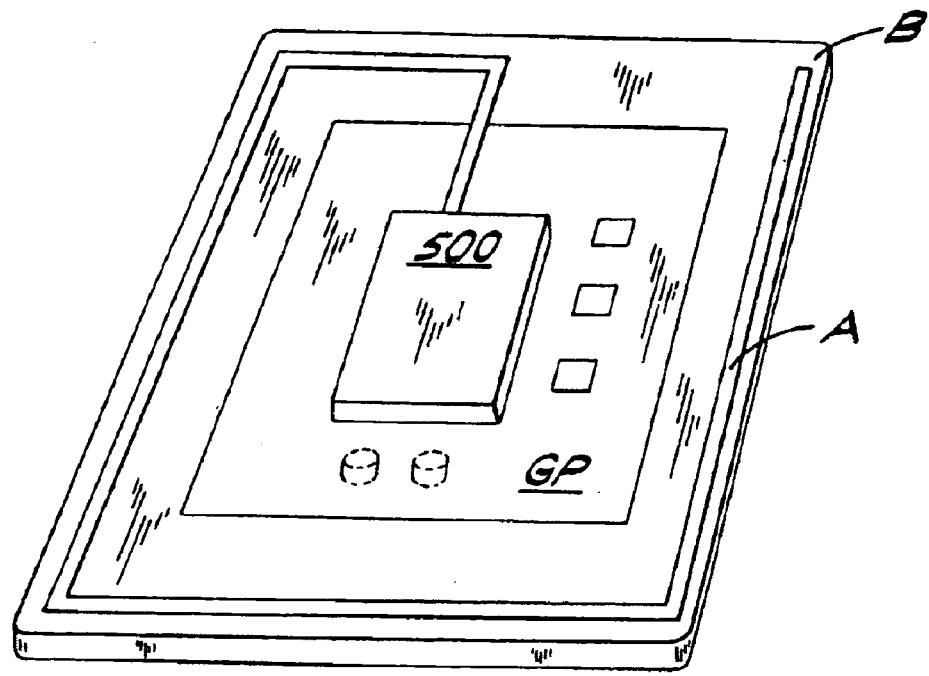
FIG. 15 is a perspective view of one preferred embodiment of a Minion™ device and printed antenna on a printed circuit board.
Figure 16:
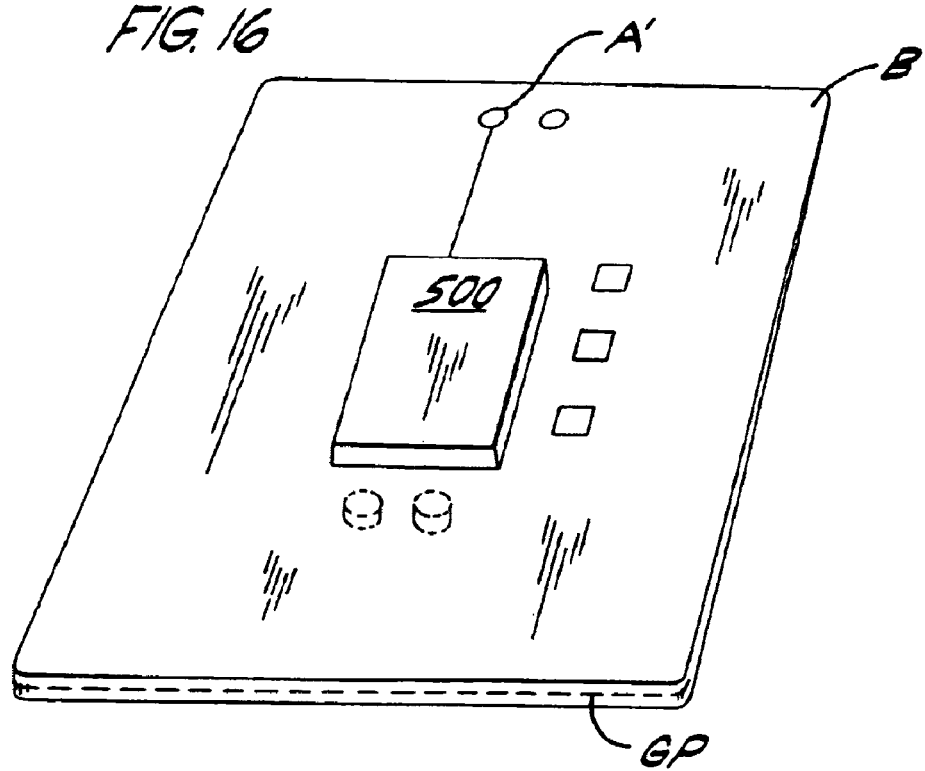
FIG. 16 is a perspective view of one preferred embodiment of a Minion™ device on a printed circuit board with an external antenna connection.

The antennas for the radios are built into the case and are intended to provide omni-directional coverage. As illustrated in FIG. 15, the antenna A is printed on a dual sided circuit board B itself and wrapped around the periphery of the board. This allows the antenna to be printed as part of the printed circuit board layout. In general, the antenna would function as a monopole with a ground plane GP which may be embedded in the board B, although it is also contemplated that the antenna may be a dipole or j-pole or other antenna implementation. The other side of the board would have mounted thereon the micro-controller 510, memory 540 and connectors (+and−) for connecting to the battery power supply (shown in phantom). Alternatively, as shown in FIG. 16, it is contemplated that the antenna may be a whip antenna A in the form of a single piece of wire extending from the board B and having an imbedded ground plane GP. For example, a Minion device M mounted on a traffic sign post P may be provided with a one foot long quarter wave whip coil WC within its housing H (see FIG. 17) or hanging from the housing. The housing may be a PVC pipe with endcaps for enclosing a battery as illustrated in FIG. 17. Minions can be mounted in a number of ways. One preferred method is to use standard mounting brackets SMB used for mounting cameras, sensors and other traffic monitoring equipment on traffic signal standards. Alternatively, the PVC pipe may be covered by an exterior sleeve of amorphous silicon SAS functioning as part of a solar cell to recharge the batteries. In cases where directionality is desired or required, a beam antenna with gain such as a three element yagi or an antenna with a reflector may be used. For example, in a situation where a Minion device may need to know which side of the road other Minion devices are located would use a directional antenna. Also, a Minion device on a police car may have a directional antenna to focus on and interrogate a Minion device directly in front of it located on another vehicle. Omnidirectional antennas will never actually be realized and environmental limitations are an expected part of the operation of the network. The operating range of any transceiver will not be a fixed distance but should rather be viewed as a probability function. Thus, the likelihood of successfully exchanging messages between radios is a function of their position in space. Viewed in this way, all sources of transmission error can be incorporated into a single function. This is similar to taking the bit error rate allowed for a fixed length message and determining the probability of successful reception. Unlike the wired network, the wireless network has a spatially distributed error rate.

That being said, think of the effective range of a Minion device as varying from 100 to 300 feet. Additional control of the area of coverage will be possible with the use of application-specific antenna and packaging designs. Optional application specific interfaces include interfaces to vehicles, door locks, utility meters, appliances, building controls, user displays and user keyboards. Application specific interfaces may also be links to external sensors such as sensors for magnetic flux, temperature, meteorology, acceleration, altitude and pressure.

The antenna used for most Minion devices are intended to provide omnidirectional coverage so that any omnidirectional antenna known in the art may be employed.

In some applications, a Minion device may require a directional antenna to provide directionality so that Minion devices will only communicate in a specific region or with certain other Minion devices. This can be accomplished by a directional antenna well-known in the prior art or by electronically tuning the above-noted antennas to have limited sectors of reception with other sectors having nulls. Also, the directionality of an antenna may be controlled by placing the antenna in a shield or reflector such as employing the antenna in combination with the parabolic reflector so that only other antennas facing the parabolic reflector can communicate with the antenna in the reflector. In general, antennas would have a range of about 100 meters in order to avoid too much cross talk between too many Minion devices. The use of antennas designed to provide gain in a particular direction may be used to increase the effective range to significantly greater than 10 meters in a particular direction. In order to maintain the most compact size for each Minion device,, particularly μMinion devices, and because high performances is not necessarily required for μMinion devices, the antenna is preferably built and mounted on the printed circuit board containing the other components of the Minion device. Some applications may require an external antenna. For example, an external antenna may be used when it is necessary to house the mμMinion device circuitry in a shielded enclosure because of RF interference caused by other devices near the Minion device. In such cases, a suitable interconnect cable may be used between the Minion device and the external antenna.

Power Sources

Figure 7:
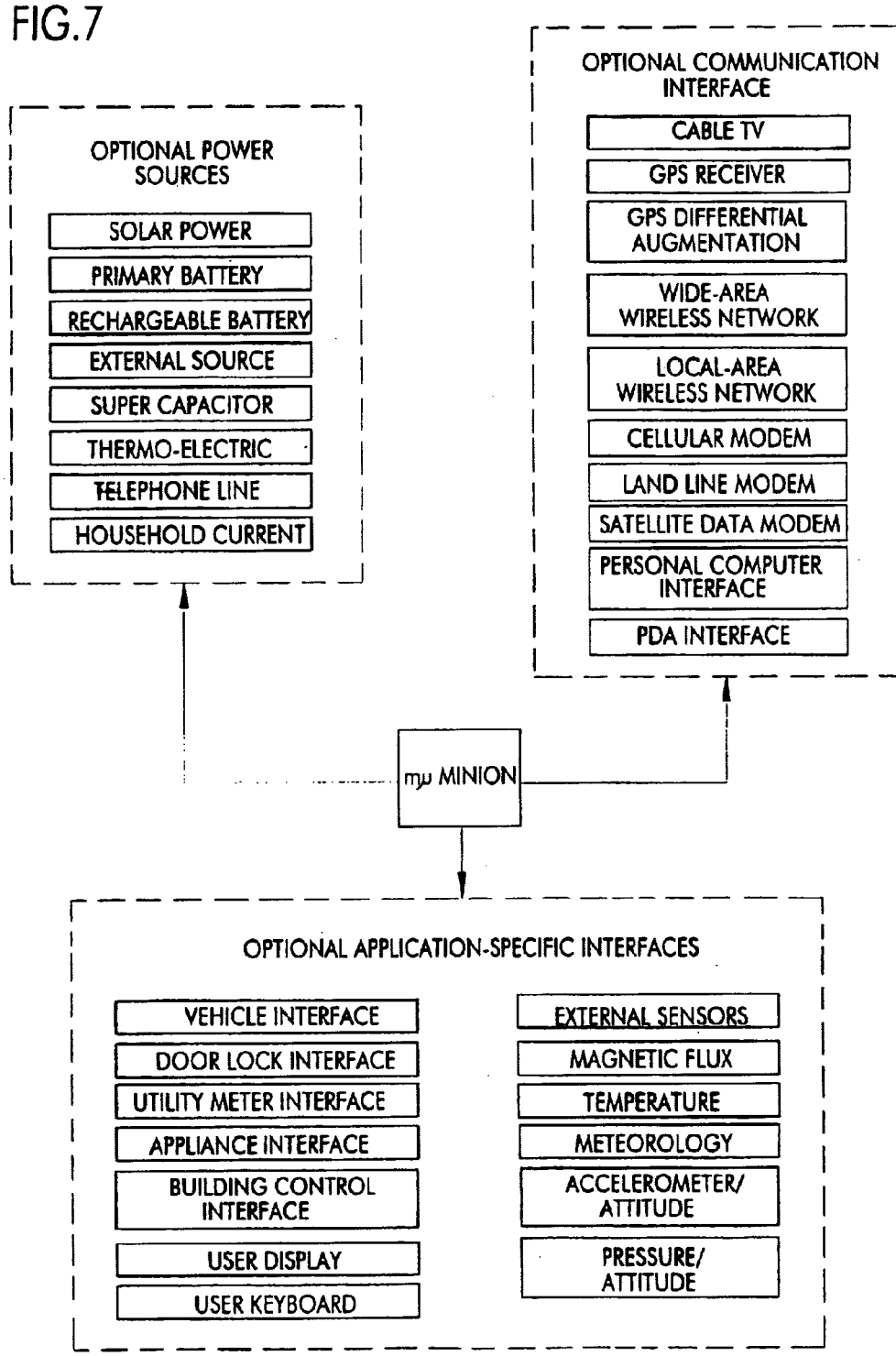
FIG. 7 is a block diagram of the various power supply options, communications interfaces and application specific interfaces, including various gateways, which may be associated with a µMinion™ device according to the invention.

As shown in FIG. 7, self-contained Minion devices may be powered by one or more of the following power sources:

1. Primary Batteries

Some applications will lend themselves to user-replaceable batteries. Some mechanism to indicate the need to replace the batteries will be necessary. Some applications will allow for disposable Minion devices and sufficient battery life can be obtained from a single battery for the life of the unit.

2. Rechargeable Battery

Used in conjunction with another power source to provide for the charging function. Primarily for applications in which the power source is unreliable or intermittent. Also applicable in situations where tampering with the power source must be detected and reported.

3. Solar power

Generally applicable for charging a rechargeable battery. May also be used as a supplementary source to extend the life of a primary battery.

4. Super Capacitor

Alternative to the rechargeable battery. Does not require chemical reactions, so would be appropriate for harsh environments which are either too hot or cold for batteries.

5. Thermoelectric

A thermal difference may provide sufficient power to operate a Minion device in an environment which has no other power source available.

Minion devices connected to another device may receive power from that device. For example, Minion devices may receive external power from:

1. Household Current

A wall transformer or direct connection may be used.

2. Connection to a Vehicle Electrical System

This may include intermittent sources, such as the wiring for brake lights. In a trailer, for example, this may be the only available source. Rechargeable batteries may also be used and charges from an intermittent source.

3. Telephone Line

A Minion device providing ring detection or Caller-ID services may also receive all power from the phone line.

4. Minion devices attached to personal computers may communicate with and be powered by the interface: Serial, parallel, keyboard or Universal Serial Bus, for example.

Semi-Streaming

MinionNet network Protocol Extensions include the ability to send a burst of data in the form of multiple messages directly from one Minion device to another. This semi-streaming data has compact headers and reduced overhead compared to sending the data via Standard messages. Normal MinionNet network message formatting and transfer methods apply, including the transmission of training bits, message encoding, the addition of CRC-16 and error correction bits. Semi-streaming data messages are the same length as Standard Messages and can be received using the same buffers and error detection and correction algorithms. Data streams may be concurrently received from multiple Minion devices. The ability of a Minion device to participate in Semi-streaming data transfers is dependent on the amount of memory available and the power situation of the Minion device. Semi-streaming data transfers assume a fairly stable communication environment; they will not be initiated until a high probability of message reception has been established.

Semi-streaming data messages contain the following fields:

1. A Message Type code indicates that this is semi-streaming data message.
2. The serial number of the Minion device transmitting the message.
3. The serial number of the Minion device intended to receive the message.
4. Flags relating to the condition of the data transfer.
5. The number of the block of data within the transfer.
6. The data itself.

Semi-streaming data messages are acknowledged by a specialized form of multiple block transfer request. A message containing the block numbers of data that have not been received is returned to the sender. The sender uses this as a prompt to retransmit or continue transmitting data. There is no explicit acknowledgment for blocks successfully received. The Transfer Request message has the following fields:

1. Type code indicating that this is a Multiple Block Transfer Request.
2. The serial Number of the Minion device transmitting this request.
3. The serial number of the Minion device intended to receive this request.
4. A list of data block numbers requested for transmission.

The actual data sent via Semi-streaming data transfer may be arbitrarily large, limited primarily by the memory available for buffering. The actual data will contain header information, including the size of the total data transfer, the ultimate recipient if the data is to be forwarded, error detection information and instructions for handling the data such as transfer priority, etc. This control information is in addition to the data sent in the "Init Stream" message used to start the semi-streaming data transfer.

Central Services

Figure 18A:
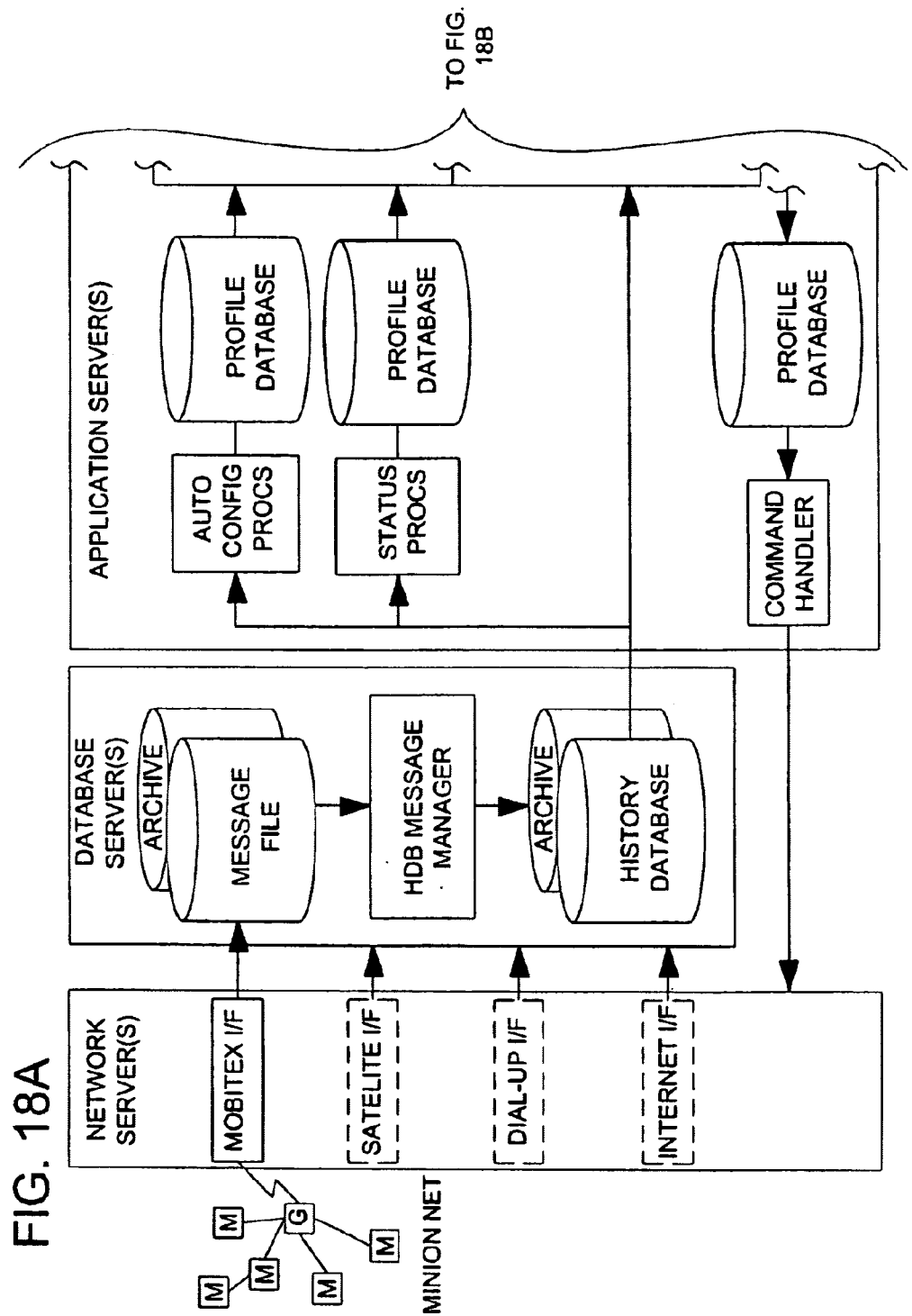
FIGS. 18A and 18B are a block diagram of a system of the invention including MinionNet™ central services which include the system History and Current Databases, Network Servers which communicate with each available Gateway and Application Servers which communicate with the various user applications. Internet connections with both the MinionNet and with the application users are protected with web server firewalls.
Figure 18B:
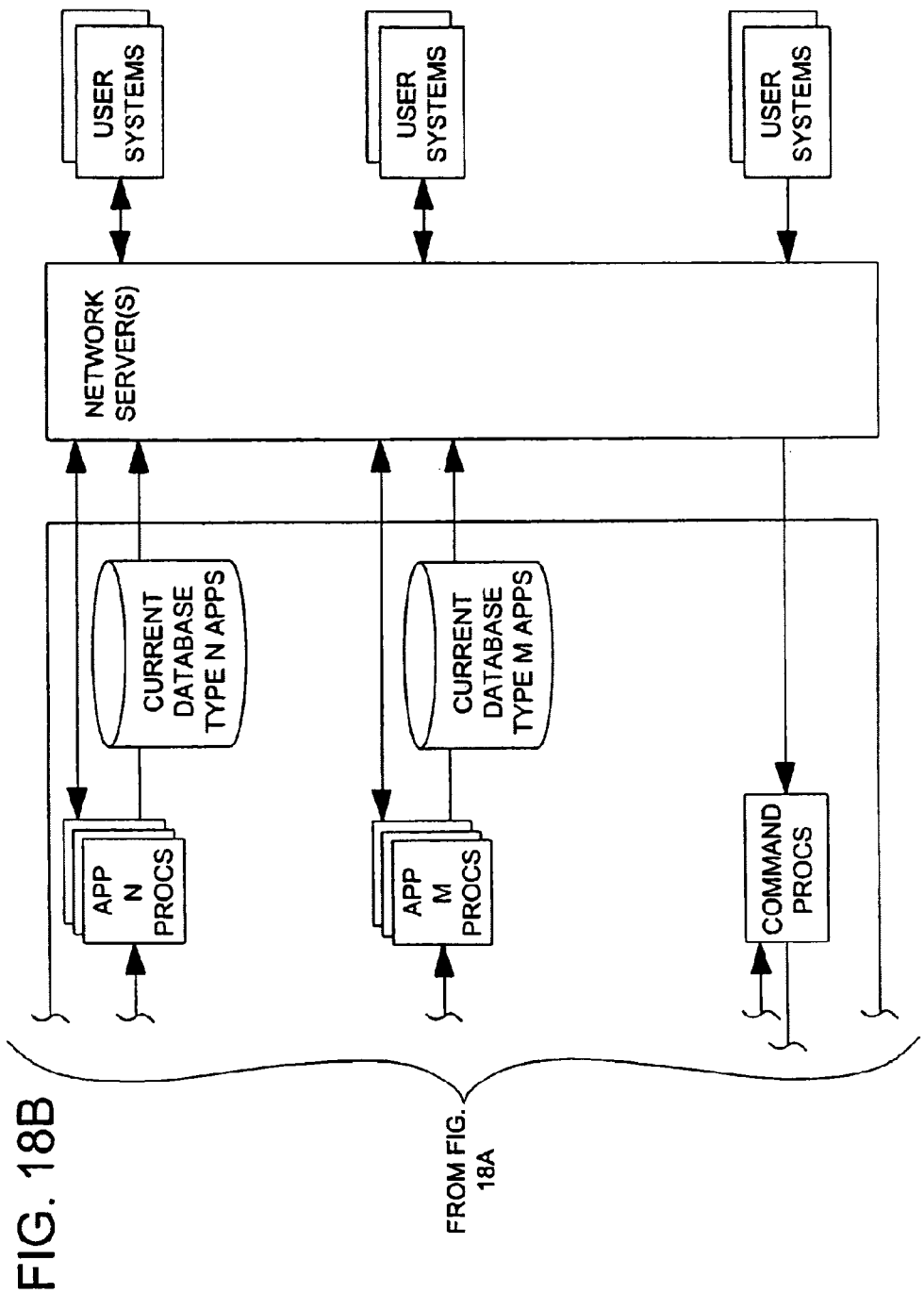

FIGS. 18A and 18B are a block diagram of a system of the invention including MinionNet central services which include the system History and Current Databases, Network Servers which communicate with each available Gateway and Application Servers which communicate with the various user applications. Internet connections with both the MinionNet and with the application users are protected with web server firewalls.

Examples of the Capability of the Minionnet Network Technology

Weather Services

The Data portion of a MinionNet network Standard Message with a Type Code meaning "Weather" will contain data fields related to the operational environment of the Originating Minion device. Fixed solar-powered Minion devices provide an opportunity to record cloud cover and relative insolation through measurements of the performance of the solar power source. Vehicle-mounted solar Minion devices provide the opportunity to determine intervals outside vs. garaged. Temperature sensors allow recording operating environment information useful for meteorology as well as improvement of the Minion device products themselves. Other sensors may be attached to Minion devices to provide additional fields of information including Barometric Pressure, Relative Humidity or Dew Point, Precipitation, wind velocity and direction. Minion devices may be attached to such locations as highway "mile markers", on or near bridge and overpass surfaces to provide useful data to drivers, police and emergency vehicles, and traffic managers.

The Data portion of a MinionNet network Standard Message with a Type Code meaning "Firmware" will contain memory address and instruction codes used to update the firmware contained within the Final Destination Minion device. Usually, multiple "Firmware" Messages will be required to send the amount of data required to perform an upgrade of Minion device functionality. The various messages need not be received in a particular order: each encode their own place in the overall update message. Validity checks, including CRC-16 will be performed on the complete set of "Firmware" messages before the new instruction code is allowed to execute within the Minion device. Allowing field updating of the Minion device control program allows low cost, flexible growth as new applications are developed for the MinionNet network. Multiple Minion devices may be targeted for updates simultaneously. The number of messages sent through the network will automatically be minimized by selecting groups of Minion devices for concurrent updating. Each version of MinionNet network operating firmware will have an associated version number. Updates to the firmware may be sent as incremental changes, thus allowing the transmission of small pieces of code that change from one version to the next and not the large body that remains constant. These 'Patches' will be specifically applied to change one version to the next— Minion devices that do not contain the correct original version will automatically ignore any patched not intended for their version.

Each message transmitted by a Minion device has an originating Minion device ID and a Final Destination ID which will result in passing through one or more gateways in the process. Usually the ID is the serial number of a Minion device. Some ID's are of special significance. The Null Minion device (ID zero) is used as a destination for messages that are broadcast and actually intended for all recipients in an area. Application-specific Minion devices send data to a Final Destination ID that represents the database that corresponds to the application. The MinionNet network routes the message to a gatewayMinion device that forwards the message to the correct server.

Each Minion device maintains a message routing table containing the following fields:

1. Target Minion Device ID

ID of Minion device that a message might need to reach.

2. Intermediate Minion Device ID
   ID of Minion device to use to send messages to Target.
3. Hops
   Number of hops required to send a message to Target Minion device via Intermediate Minion device.
4. Expiration
   Time at which this table entry will no longer be valid.
5. Intermediate Minion Device Attributes
   Information about the Minion device, such as its Power Save status, Signal strength and Transmit power level required to send to it.

The routing table is maintained by snooping all received messages, not just those for a particular recipient. Thus, all message traffic helps to maintain correct routing tables in all Minion devices without generating additional traffic geared solely for routing table updates.

Each Minion device maintains a table containing all messages recently received. Each incoming message is compared against the list. Duplicate messages may cause an explicit acknowledgment to be scheduled for transmission. Message flags may cause the list of scheduled messages to be altered, either to forward this message or to consolidate messages from a single originator or directed toward a single destination. The number of entries in each of the tables will be constrained by the available memory and the speed of the micro controller. The oldest entries will be lost as new messages are received.

Each Minion device maintains a table containing all messages recently transmitted. A flag will indicate if an acknowledgment has been received. Unacknowledged messages may be scheduled for retransmission.

Each Minion device maintains a table containing all messages that are scheduled to be sent.

Messages may be received or created that cannot be forwarded immediately. This Minion device may be acting as a messenger and not have a current path to the destination. The next intermediate Minion device may be in a power save mode and not have a window available. There may be too much traffic in the local area so transmission will be delayed. The Minion device will always be able to determine the next message to be transmitted, and when transmission will be attempted.

Collateral Protection System

The discussion that follows describes a normal operation situation such as might be encountered in support of the cap Certified Collateral Protection System for the Mobile Equipment Finance market which is also used for the geolocation example above. All operating parameters such as the interval between transmissions, the power consumption of each device, the number of devices and the level of network traffic are dynamically adjusted to fit the application and environment. The numbers given below is intended to provide a representative view of a possible implementation.

Figure 6A:
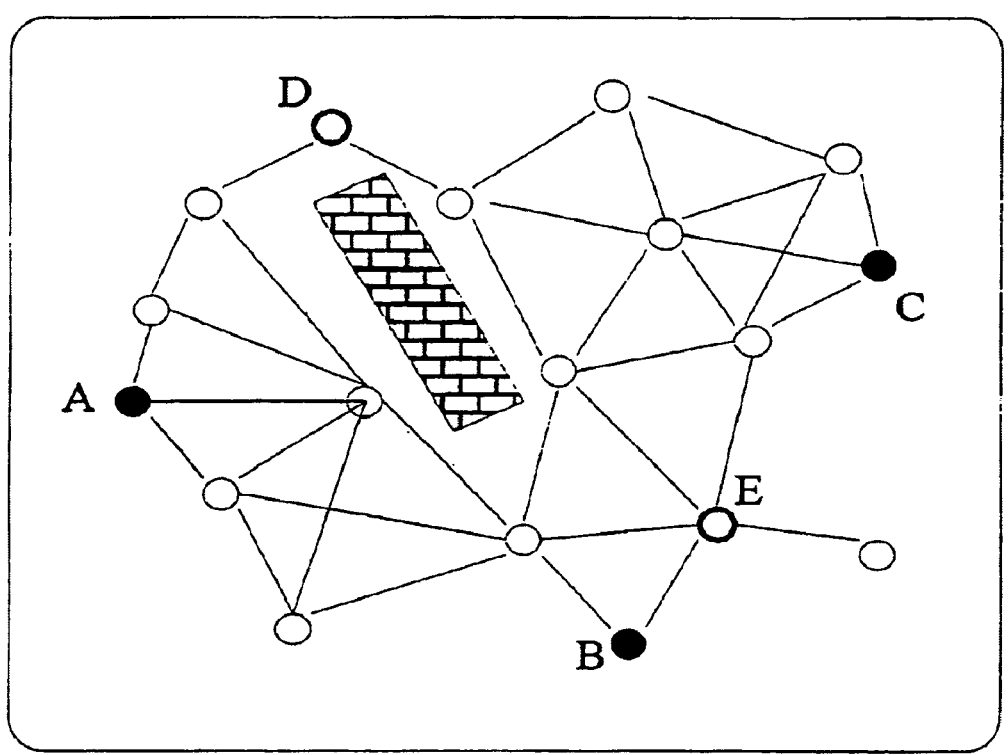
FIG. 6A is a sample network of Minion™ devices (e.g, a MinionNet™ network).

Consider the sample situation depicted in FIG. 6A. The local network consists of 18 Minion devices, each able to communicate with at least one other as indicated by the connecting lines.

These lines are not intended to indicate adjacent nodes, and in some cases connections may be established over unusually long distances. This represents the possibility of favorable geometry and low radio background noise that may be encountered. In contrast, some physically nearby Minion devices may be unable to establish direct connections because of adverse environmental conditions, such as indicated by the metaphorical brick wall.

Again, the network has no a priori knowledge of the location or connection paths available. The messages sent by the Minion devices themselves and the operating protocol allow this information to be dynamically derived.

Each node in the diagram represents a Minion device with a short-range radio transceiver, a microprocessor and a small amount of memory. The labeled nodes have additional hardware that results in added functionality throughout the network. Even the least capable Minion devices will be able to make use of the features of the more capable devices nearby.

Figure 6B:
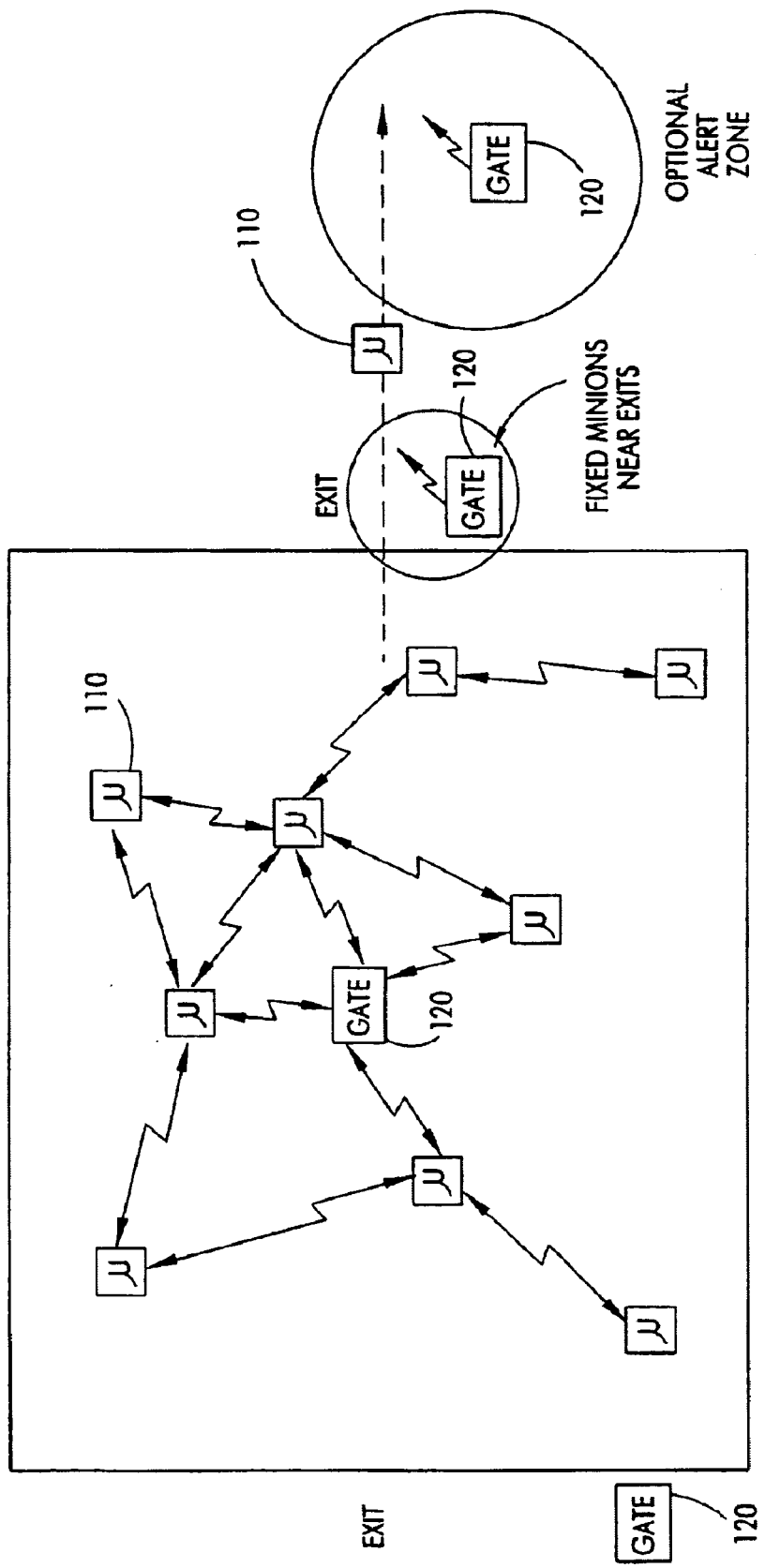
FIG. 6B is a diagram of MinionNet™ network according to the invention configured as a virtual geolocation system.
Figure 6C:
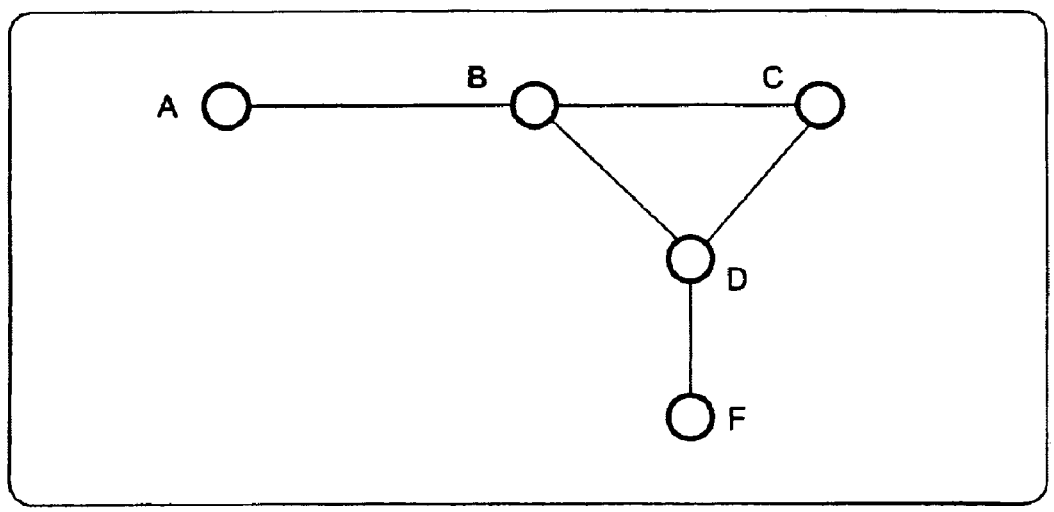
FIG. 6C is a simplified sample network of Minion™ devices (e.g, a MinionNet™ network).

The nodes labeled 'A', 'B', and 'C' represent geoMinion devices and act as anchor points for the virtual geolocation system as shown in FIG. 6B. Each is equipped with a GPS receiver, or has been installed at a fixed point with known coordinates to act as a static beacon. The nodes labeled 'D' and 'E' are gatewayMinion devices. They provide connections to a wide area network using Mobitex® radios, for example. The Gateways allow direct connections to the MinionNet network Server and database facilities.

On a periodic basis each gatewayMinion device will send out a broadcast message identifying itself and indicating that it is capable of sending and receiving messages to the central database server. This occurs on a random basis a few times per hour. Each Minion device that receives the message remembers the number of the gatewayMinion device and adds it to a list of candidates to handle traffic destined for the database server. After an interval the message is transmitted on a second hop with an incremented counter. The message now means "I am a Minion device that is one hop away from a gatewayMinion device, and I can handle your messages." The recipients of this message make note of it and send one that says "I am two hops away . . . " Nodes that have already heard about this Gateway will have smaller hop counts stored in their table and will ignore these later messages, since they are only proclaiming longer paths than the node already knows about. A message parameter controls the maximum number of hops allowed so that the proliferation of messages from distant sources will be controlled.

In this manner, each Minion device will have built a list of all of the nearby gatewayMinion devices. The number of hops required and the identity of the Minion device to use as an intermediary will also be known. Thus, sending a message to the database server is accomplished by looking up the identity of the Gateway with the smallest hop count and sending out the message to the appropriate intermediary.

Once a Minion device has discovered a valid way to contact a Gateway it will do just that. At random intervals (think several times per day) each Minion device will send a message to its 'nearest' gatewayMinion device. This message is basically just a status report and is buffered with others in the Gateway. After some interval, and dependent on the desired traffic level on the Gateway network, these status messages will be forwarded to the database server via the wide area network. The purpose of these status messages is two fold: (1) the database server gets a 'heartbeat' from each Minion device and knows how to address Gateway traffic destined for any particular Minion device, and (2) each Minion device involved in handling intermediary hops of status messages has seen routing information to allow a 'reply' to be delivered.

In this context a 'reply' to a status message could be any message from a Gateway to another Minion device. Remember that this is really a connectionless protocol and that all messages are really datagrams. It would be possible for the database server to originate a message for a particular Minion device at any time, but the chances of its successful delivery are greatest just after a status message has been sent by that Minion device. This assumption allows us to maintain very short history tables in each Minion device. Perhaps only a few dozen entries would be needed to provide thoroughly effective delivery if only the most recent information is kept.

The same philosophy of communicating in multiple hops and retaining records in each Minion device can be extended to the Virtual Geolocation application.

Each of the geoMinion device nodes ('A', 'B' and 'C' in FIG. 6A) periodically sends out a broadcast message with its current GPS position and time. As this message is forwarded from node-to-node the position and number of hops is recorded by each Minion device. After data has been collected from several geoMinion devices, it is possible for each Minion device to compute a weighted average position based on the relative distances from each known location implied by the hop counts.

This is an example of the benefits of using short-range radios in the MinionNet network. Short range coverage means better resolution for position estimates. Wide area networks require sophisticated and expensive time-delay or time-of-arrival measurement equipment to achieve similar results. This equipment is so bulky and expensive that it can only be installed at fixed base stations. In addition, position information using time of arrival data can only be derived if the target unit is in the coverage area of multiple base stations.

The Mobile Finance Market-An Example of Virtual Geolocation

Referring to FIG. 6A, one preferred application of the MinionNet network is to establish a virtual geolocation infrastructure for use as a certified collateral protection system such as the cap System of the assignee. This is just one example of how geolocation can be applied. An expanded description of several cap application is included in the market applications section on Additional Alternative Network Applications. The cap System provides mobile equipment finance companies with exception and audit reports concerning unusual movement patterns of financed vehicles and other types of nonstationary, movable or mobile equipment.

Many applications such as this can actually be best addressed by a system that provides a general view of the location and movement of items without the expense of traditional precision location technologies such as GPS.

A Virtual Geolocation system provides 2-dimensional (or 3-dimensional) relative position information that is only loosely associated with absolute latitude and longitude (and altitude). Some applications will be adequately served by 'virtual addresses' alone, while others will need tighter correlation with actual physical positions. The MinionNet network anchors a small percentage of points in the network with known locations. These anchor points may be Minion devices with GPS receivers that report accurate positions but which move with time, or they may be Minion devices installed in fixed locations such as on light poles, street intersections or on different levels of a high-rise structure.

Nearby devices need only receive messages from these fixed points to have an approximate idea of their own location. With each 'hop' from device-to-device the area of possible position increases and the position accuracy degrades. The MinionNet network is designed to automatically keep track of the count of 'hops' involved. The presence of multiple anchor points, and the use of the 'hop count' to approximate relative distances allows the MinionNet network to approximate the actual position with the least possible expense in hardware. The use of short-range transceivers actually improves the resolution of this approach, as well as keeping the power requirements for each device to a minimum. This not only reduces costs but eases certification and reduces environmental concerns.

Dynamic Traffic Monitoring System

One application is to use the MinionNet network technology and services to provide a wireless dynamic traffic monitoring system (DTMS) for municipal, regional, state and federal government agencies, as illustrated in FIGS. 10A, 10B, 11A and 11B. Organizations such as city traffic departments, regional and state mass transit agencies like any COG (Counsel of Governments) and any DOT (Department of Transportation such as the US/DOT or TX/DOT) can use this cost effective system to monitor traffic movement. Dynamic Traffic Monitoring System "DTMS" can be initiated on a limited basis and incrementally expanded as more fixed and mobile gateway Minion devices are diffused into the system. The entire MinionNet network functions as a collective and even the lowest level Minion device becomes part of the data collection infrastructure. With this technology there is no need for high dollar roadside reading devices, nor is it necessary to install hard-wired infrastructure.

Minionnet Network Data Collection Network Background

The Dynamic Traffic Monitoring System "DTMS" gives the City the ability to monitor obstructions, travel time, traffic flow and traffic pattern deviation along highways, thruways, and side streets. This information is important to all governmental traffic control agencies and represents an opportunity to better serve their community.

The MinionNet network uses a virtual network control program that controls the operations of Minion devices. There are three classes of Minion devices associated with "DTMS". First, there are gatewayMinion devices. These are fixed or mobile "DTMS" devices that provide a wireless interface to a terrestrial or satellite network. Data is collected from the "DTMS" network and is then placed into a local "DTMS" database. Second, there are geoMinion devices. These devices are fixed or mobile and give the entire network at the device level a virtual latitude and longitude address. Third there are Minion devices. These are minimal cost digital RF radios that are fixed or mobile and transmit status information from the field locations to the database using the MinionNet network wireless network backbone.

By establishing a network of fixed and mobile GatewayMinion devices and then an appropriate combination of low-cost single and multi-radio Minion devices, a superior wireless "DTMS" data collection network is created. Traffic flow data can now be collected and processed both locally and remotely. The traffic flow data is transmitted to a database through wireless links and is made available to the city engineers from a secure Internet Service Center.

Wireless Data Networks For Dynamic Traffic Monitoring

The MinionNet network is a wireless data collection network characterized by two-way short-range device-to-device messaging that can operate with both fixed and mobile devices. Thus, it is ideal for traffic management applications. Messages are automatically routed through multiple device-to-device 'hops' to provide robust area coverage, redundancy, and noise immunity. Additionally, MinionNet networks are virtual networks with virtual addresses, dynamic routing, and reconfiguration. This is an example of how the inexpensive two-way data radios (Minion devices) described above are used by the MinionNet network. The key feature of Minion devices is the ability to share short data messages with each other. Each Minion device becomes a part of a community and can share the burden of conveying messages throughout the area dynamically seeking a gateway to a specific destination database.

This concept is in contrast to all traditional network concepts, which require the installation of an expensive fixed base station infrastructure prior to the operation of the network. Typical cellular phones, for example, require that each subscriber phone communicate only with the cellular base station. Even though there may be thousands of actual phones in the area, they are not capable of communication with each other directly. The ability to use short-range messaging between devices such as this has been historically ignored due to the perception that consumers require robust, real-time connections. In actuality, these connections may be real-time, but are not necessarily robust. Since the MinionNet network is a data network designed for device-to-device messaging without a time-critical component, it is able to leverage these capabilities into applications such as Dynamic Traffic Management Systems (DTMS). The typical MinionNet network system periodically transfers data back to a central database for analysis, making the collection of traffic "travel-time" practical.

In addition, exceptions can be identified and communicated on a near term basis, as required. For example, a traffic accident will immediately register on the network. With this early warning, emergency vehicles can be dispatched sooner, resulting in faster clearance and quicker return to normal traffic patterns. The "exception process" operational nature of the network gives the user the exception earlier than if done on a poling basis. Lack of movement along a highway could be the exception. Thus, when there is an obstruction detected, Minion devices will start reporting immediately and continue to report the condition until the network returns to a normal operating state.

Once the initial fixed and mobile gatewayMinion devices are installed, applications other than strict traffic monitoring can easily be added. Other governmental and commercial vehicles like, utility trucks, delivery vehicles, school buses and garbage trucks, can add important traffic flow information while providing additional safety, security and traffic management capabilities simply by placing a low cost Minion device on the vehicle. More gatewayMinion devices can then be placed in neighboring cities leveraging already installed Minion devices and giving additional information about traffic as it approaches the city, also providing the service to the new city for very little added expense.

DTMS Provides Virtual Geolocation

In the DTMS application, virtual geolocation system capability, as described above in the section on the Mobile Finance Market, provides 2-dimensional relative position information that is only loosely associated with absolute latitude and longitude. Some applications will be adequately served by 'virtual addresses' alone, while others will need tighter correlation with actual physical positions. The MinionNet network anchors a small number of fixed points in the network with GPS-derived positions or known locations such as street intersections or floors of a building.

Nearby Minion devices need only receive messages from these fixed or mobile points to have an approximate idea of their own location. With each 'hop' device-to-device, the area of possible position increases and the position accuracy degrades. However as mobile gatewayMinion devices approach an area or the concentration of Minion devices increases the accuracy of the original geolocation is validated and even improved. The MinionNet network is designed to automatically keep track by counting the 'hops' involved. The presence of multiple anchor points, and the use of the 'hop counter' to approximate relative distances allows the MinionNet network system network to approximate actual position using low cost hardware. The use of short-range transceivers actually improves the resolution of this approach, as well as keeping the power requirements for each device to a minimum. This not only reduces costs but eases certification and environmental concerns.

Wide Area MinionNet Network Extensions

Just as certain points in a geolocation network need to be anchored to associate physical locations with virtual ones, other points in the network should be connected to a wider area network so that message travel times and network loading are minimized. This is accomplished by adding gateway transceivers, such as the BellSouth Mobitex® digital radio network, to a small percentage of the "DTMS" Minion devices in the field. These gatewayMinion devices act as concentrators for messages bound to and from the centralized supervisory components of the MinionNet network.

The dynamic configuration and automatic routing aspects of the MinionNet network Protocol cause these messages to be routed by the most efficient method from their origin to their ultimate destination.

The protocol is completely connectionless and each message is treated as an independent datagram. Protection mechanisms are built in to ensure robustness, but delivery of any individual message is not necessary nor is it guaranteed. The database server may initiate enquiries into the distributed network and ask for retransmission of suspected missing messages.

The purpose of certain intelligent applications is to detect missing items and abnormal states and status then provide a report or alarm to the user. Much useful information may be derived from interrogating the message routing tables of nearby nodes to establish the last known location. In this way the network will begin to report immediately when there is a lack of motion or a dramatic change in the rate of motion on a given highway or thruway. Average and expected travel times can be monitored and reports will be generated when the normal expected parameters are not being seen by the "DTMS". This differentiates the "DTMS" from all other known traffic monitoring products as it will focus on troubled spots and report only those on an automatic basis. This automatically reduces the amount of system air-time required, thus providing a more efficient and less expensive solution than otherwise possible. Special purpose monitoring can be accomplished by changing parameters or inquiring specifically within a given area or zone. Moreover, gatewayMinion devices can report their location outside of their logical domain. An example of this is the use of a gatewayMinion device on a school bus. The bus will collect traffic data as it travels its route both to and from school, and then it will functions as a tracking device on trips outside of the district. Even if this device passes a Minion device outside of its normal "local domain", it will still ask and receive data from any Minion device it may encounter. So a bus on a school trip to another district, can track its trip, as well as function as a data collection device out of its local domain.

Implementation Example: Any City, USA

Consider a sample situation. The local seed network may consist of 50 Roadside gatewayMinion devices (along thruways), 10 Mobile gatewayMinion devices placed on police cars, and 20 additional gatewayMinion devices placed on city road repair equipment, emergency vehicles, and school buses. Each of these units is able to communicate with other Minion devices. Then place 300 Minion devices with select companies that have work sites within the city limits. An example might install, 150 Minion devices in vehicles at Company A and an additional 150 Minion devices in vehicles at Company B. Employee selection in a test would be done so vehicles will enter and exit the city in diverse directions and along different travel paths. As vehicle travels the roads in the city it will be registered and logged as to location and travel time as the vehicle 20 enters the city and proceed to its final destination. Vehicle will be moving into and out of the city on shifts, at different times, allowing the city to record valuable data about normal thruway traffic patterns, abnormal thruway traffic patterns, average travel time, traffic flow and traffic obstructions. These data can be shared with the companies and help employees find the most efficient route to and from work. The entire collection process can be enhanced by adding more Minion devices and extending the gatewayMinion devices into neighboring cities and along major highways.

In Summary, contrasted to a traditional read-only Roadside Reader approach, the MinionNet network can be installed with wireless networking technology. Additionally, all Minion devices in the network serve a useful data collection function. The more Minion devices in an area, the better the network functions. Minion devices can be installed on vehicles for short tests in several minutes and will be battery-and/or solar-powered.

The MinionNet network is dynamic and functions on an exception basis by screening out data that is not necessary to process and present to the user. This in a cost effective network, both in terms of initial and ongoing operational costs.

Buddy Systems

Figure 14:
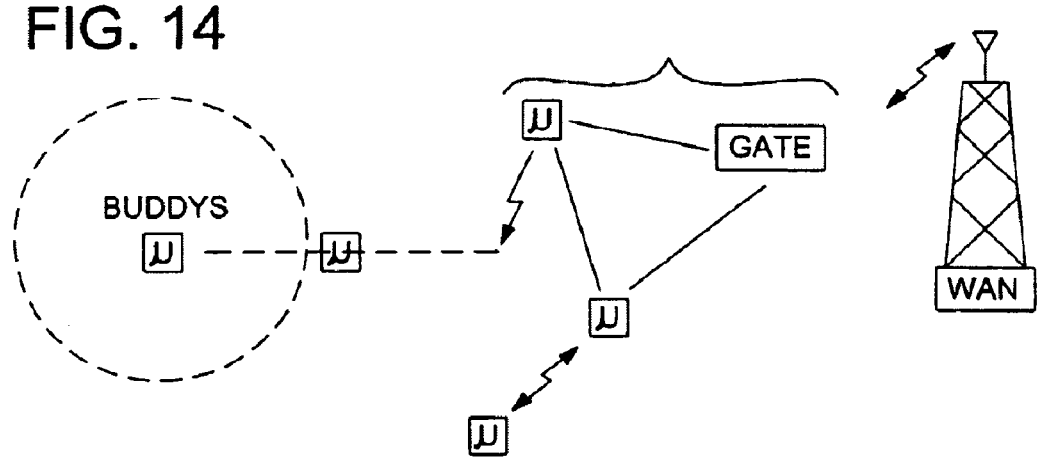
FIG. 14 is a diagram of a buddy system according to the invention.

FIG. 14 illustrates a buddy system, as mentioned in the section on parking applications, according to the invention. In the system, pairs of mµMinion devices operate as "buddies" when they are able to communicate directly with each other. When the Minion devices are separated, or unable to communicate for a given period of time, the Minion devices send exception messages or alert messages via the MinionNet network system network. Status messages can be suppressed if the particular Minion device remains stationery since movement of the Minion device can be detected by passing other fixed Minion devices within the network. One application of the buddy system is a child and parent system wherein the child and the parent each have a Minion device. If the child moves outside of close proximity of the parent, the parent's Minion device can alert the parent. Both the child and parent Minion devices can provide an alert via the MinionNet network to other cooperating Minion devices such as a mall security if the system is located at a mall or a large amusement park. In this application, child Minion devices could be in a bracelet, watch or necklace or other form such as embedded in a tennis shoe.

Another application for the buddy system is a system, which allows car owners to monitor the location of their car. Each car owner and their car would have a Minion device, which communicate with each other. When the car Minion device and the owner Minion device are outside of range of each other, the Minion devices would communicate with each other through the MinionNet network system network. If the car begins to move without the car Minion device being in communication with the owner Minion device, the car Minion device sends an alert via the MinionNet network. This alert could be provided to secure your law enforcement personnel. This system would also allow the location of stolen property through the use of a wide area network. For example, it would serve as an electronic enhancement to current theft reduction and prevention programs, which allow a vehicle owner to attach a sticker to alert police that a vehicle should not be on the road during certain hours. Using MinionNet network technology offers an electronic version of this capability. This would provide a less expensive electronic theft prevention and reduction system than products currently available. It can also be structured as to provide a possible flow of revenues for local police departments managing the system.

Other possible uses of the buddy system include a house arrest/anti-stalking system in which a detainee must remain near certain Minion devices to prevent alert messages or, conversely, exclusion zones can be created to generate alerts when a specific Minion device is able to communicate with another Minion device indicating that the specific Minion device is too close to the other Minion device.

Other System Applications

As noted herein, the invention may also be implemented as a device and process for the automated collection of toll road fees (virtual toll roads) or for locating children in amusement parks, day care centers and schools. A number of applications are outlined later.

Approximate Determination of Vehicle Travel Lane

This section describes a system and method according to the invention for determining which one of a possible set of allowed paths was traversed by a vehicle. In particular, a system and method for approximately determining the distance from the vehicle to a fixed location is described, and a system and method for integrating a set of such measurements over time to arrive at a solution unique to one of the several allowed paths which typically represent parallel travel lanes is described, as shown in FIGS. 10A, 10B, 11A and 11B. The system and method are applicable over distances on the order of 300 feet from the fixed location, can resolve five or more lanes in each direction, as shown in the figures, requires only low cost equipment, and yields repeatable results over a wide range of vehicle speeds.

Comparison to Traditional Methods—Traditional methods of achieving lane specificity involve loop detectors embedded in individual travel lanes, lane specific interrogators installed above the roadway, or remote-sensing techniques involving infrared or video cameras positioned to observe the roadway. Traditional distance measuring methods rely typically on time-of-flight or signal strength measurements. Time-of-flight systems include radar, lidar (light detection and ranging) and most transponder-based systems such as aircraft DME (distance measuring equipment). Signal strength systems have not achieved wide acceptance due to the difficulty of achieving repeatable results. Signal strength systems do have the appealing aspect of being able to service an essentially unlimited number of mobile targets since no transponders are used and the targets act as passive receivers.

Bit Error Rate Considerations—The system and method of the invention are based on the fact that the bit-error rate of a digital signal is inversely proportional to the energy per bit. It has been found that, if a system transmits a bit stream in an isotropic environment from an omnidirectional antenna, then the energy per bit will decrease as the square of the distance from the transmitter to the receiver. Therefore, the bit-error rate will increase as the square of the distance. The system of the invention encodes a message using a fixed number of bits and a constant amount of energy per bit, and provides for an error detection mechanism to determine when the message is received with one or more errors. When projected onto a plane, this yields a circular region centered on the transmitter, in which the probability of successful reception of the message is high and outside of which the probability is low.

Transmit Power Management—In the implementation the number of bits is set at the MinionNet network standard of 256 bits per message and the individual bits are Manchester encoded and the carrier is on-off keyed at a rate on the order of 9,600 bits per second to yield a constant energy per bit throughout a message. The transmitter is capable of varying the actual peak transmit power in steps. The transmitting device will send a series of messages at varying power levels, corresponding roughly to effective reception ranges. Encoded in these messages will be a value correlated to the expected maximum reception range.

The passive receiver in the target vehicle will record the subset of messages which were received without error and use the largest such range value as the estimate of distance to the sender.

This technique completely eliminates the requirement for analog measurements of signal strength. The bit-error rate has been translated to a pass/fail test of individual data messages. This allows for an adaptable system in which varying transmit power levels can be used as appropriate for the installation and without any knowledge of the particular location by the target vehicle systems. The only analog portion of the system is involved in the generation of stepped power levels at the fixed transmitter.

Assumptions

Minion-equipped vehicles with omni-directional antennas.
Roadside Minion devices with omni-directional antennas.
At least 3 Roadside Minion devices spaced linearly so their coverage does not overlap.
Vehicles progress sequentially through the coverage of each roadside Minion device.
Roadside Survey Minion device is located in the center and acts to transmit beacon messages.
The other Roadside Minion devices act as brackets to collect data in each direction of travel.
1 (one) milliwatt maximum signal strength corresponds approximately to 100 meter effective range.
Transmit signal strength from roadside Minion devices may be adjusted in steps.
The survey area extends in a 100 meter radius from the Roadside Survey Minion device.
Vehicles tend to remain in the same lane for the duration of the transit of the Survey Area.
Vehicles tend to have a constant velocity through the Survey Area.

Implementation—The current preferred implementation consists of a Roadside Survey Minion device which transmits beacon messages. These messages are sent with varying output power levels. Each message at a given power level contains a data field which represents a bias constant. Each passing Vehicle Minion device will successfully receive a subset of the messages sent by the roadside Minion device.

Each message sent by the Survey Minion device has normal MinionNet network structure and formatting, including error detection bits. When a receiver is out of range of a transmission at a given power level, the message will not be received correctly. Only messages that are received intact and complete will be eligible for further consideration by the receiver. Correctly received messages will cause the values of one or more of a set of software counters to be incremented.

After passage through the area of the Roadside Survey Minion device, the vehicle will come to the area of one of the bracketing Roadside Minion devices. Two bracketing Minion devices are used to allow collection of data from vehicles traveling in either direction on the roadway. The bracketing Roadside Minion device will interrogate the Vehicle Minion device for the value of the counters associated with the passage by the Roadside Survey Minion device. The vehicle Minion device will send a response message containing the counter values to the bracketing roadside Minion device.

"Bias Average" Approach—Correctly received messages will cause the receiver to add the value of the bias constant field to a data field ("total bias") maintained internally within the receiving Minion device. A second total field ("total messages") will be incremented by one, thus counting the total number of messages successfully received from the roadside Minion device during this passage through the area.

The bracketing roadside Minion device will use the two values to compute an estimate of the path that the vehicle took through the area of the Roadside Survey Minion device. One possible method will be to compute an "average bias" by dividing the "total bias" counter by the "total messages" received during the transit. This yields a value that is independent of the speed of the vehicle through the survey area. The resulting average is dependent only on the vehicle path and the transmit signal strength/bias constant values used by the Roadside Survey Minion device. The operating parameters of the Roadside Survey Minion device are set up when the device is installed. The relationship between a particular range of "average bias" values calculated by the bracketing roadside Minion device and a specific travel lane used by a vehicle Minion device is also determined at installation and is stored in the bracketing Minion device. Thus, the bracketing Minion device can estimate the travel lane used by a vehicle through the survey area. In addition, the "total messages" is inversely proportional to the average speed of the vehicle through the survey area. The method of choosing optimal bias values and power settings for particular installations is under study.

"Data Binning" Approach—Our currently preferred approach consists of using a number of counters in the Vehicle Minion device which corresponds to the number of different power levels used by the Roadside Survey Minion device. Since each data message has a value correlated to the power level it becomes a simple matter to count the number of messages received at each level.

Excellent correlation with actual travel lane may be achieved by looking only at the ratio of the counts in the smallest non-zero bin with the counts in the largest non-zero bin. This works best if the change in radius from one transmit power level to the next differs by three lane-widths or less. In the example using 6 different power levels results in 4 bins whose data is not directly used for calculating a given path (but this is not known ahead of time).

Using all of the available counter data allows for the elimination of illegal or erroneous paths which could not be detected with the previously discussed methods. In particular, using the values of all six counters and knowing the transmission pattern of the Survey Minion device allows a least-squares solution to the problem of closest approach to the Survey Minion device and thus uniquely identifies the chord which corresponds to the travel lane. The assumption that the travel lane will be a straight segment over the ~600 foot survey area is probably warranted, especially in light of the overriding assumption that the vehicles will move with near-constant speed through the area.

The following data is of value to traffic engineers and can be derived directly from this system:

1. Direction of travel,
2. Vehicles per unit time,
3. Travel lane (for toll collection, HOT lanes, etc.)
4. Travel lane (for vehicle counts),
5. Average speed,
6. Average speed in each lane.

The current implementation uses roadside Minion devices that transmit messages 10 times per second at 6 different power levels. Low power transmissions occur more frequently than high power so that a vehicle passing through the smaller region of low power reception will be given a higher probability of receiving a message. Power levels are chosen such that the maximum range is divided into 6 equally spaced radii. Vehicles passing the area in the lane nearest the Survey Minion device (most nearly a diameter of the Survey Area) at 60 mph would receive up to 60 messages if all were sent at full power. Proportionately fewer will be received due to the power reduction algorithm.

This demonstrates operation during a possible worst-case scenario with a vehicle traveling at high speed through the area.

Slower speeds would yield proportionately larger numbers of messages. The large number of messages received by each passing vehicle Minion device results in a robust tolerance for lost messages. Messages are subject to sporadic interference or noise and may be lost as a result. The present method tolerates a high loss rate for individual messages and still yields a good approximation of the desired data. The method automatically compensates for the speed with which the vehicle transits the area.

A primary advantage of the proposed method is that the individual Vehicle Minion devices do not need any analytical capability or a priori knowledge of the survey area or geometry. Vehicle Minion devices need only be able to add a bias constant from a message received from the Survey Minion device to a total which will be sent on demand to a bracketing Minion device. The value of the bias constants and the output power levels and transmission rate and pattern are contained solely within the Roadside Survey Minion device and are selected at the time the Minion device is installed. Additional calculation capabilities, data collection and consolidation, and possibly gateway services will be required in the bracketing Minion devices. The calculations required at these Minion devices need only include integer multiplication and division, and the ability to compare a resulting value with installation parameters to establish specific lane numbers in a particular installation.

Note that after the lane-specific resolution is complete the information may be coupled with other application-specific data such as cumulative vehicle counts, toll collection data, etc. The resulting information may be forwarded to a central collection center using MinionNet network gateway connectivity, or it may be returned to the Vehicle Minion device for storage or display. A simple example would include an in-vehicle display of expected travel time in each different lane using data relayed from one end of a section of roadway to another by gatewayMinion devices located at each end and then forwarded on to the in-vehicle Minion devices.

Radio Transceiver Operating Parameters—The subset of messages received will be determined primarily by the following factors: 1) distance from the roadside Minion device to the vehicle Minion device, 2) sensitivity of the vehicle Minion device receiver as installed, 3) directionality of the vehicle Minion device reception pattern, 4) environmental factors including obstructions and reflective surfaces.

The distance from the roadside Minion device to the vehicle Minion device is the quantity that should be the dominant factor regarding success or failure of reception of an individual message. This will allow the system to derive the actual path followed by the vehicle as it passes the vicinity of the roadside Minion device. The system is arranged to receive a large number of messages with different transmit power levels as the vehicle transits the survey area.

The sensitivity of the individual Vehicle Minion devices will affect the resulting estimated path of travel through the Survey Area. A standardized installation in the vehicles could be used to make the sensitivity from one vehicle to another uniform. This would probably be impractical due to the variation to strive for antenna pattern uniformity in the vehicle installations (make the reception as close to omnidirectional as feasible) and install Roadside Survey Minion devices in pairs as described below. This pairing would allow dual solutions to the travel path equation that could be used to eliminate the receiver sensitivity variable and result in a single unique path solution.

Optimal results will be obtained if the vehicle Minion device receiver has an omni-directional sensitivity pattern. This may require care in placement of the antenna for the vehicle Minion device.

The effect of environmental factors on the performance of the system can be minimized by careful selection of location for the installation of roadside Minion devices. Choosing straight, flat, unobstructed roadways with minimal signage will achieve the best results. The quick, convenient, flexible installation options for roadside Minion devices will simplify this selection. The ease of repositioning roadside Minion devices will allow adjustment for optimal data collection.

Roadside Survey Minion device Pairing—Pairing of roadside Minion devices as described above could provide the additional information needed to resolve a unique travel path through the survey region in the presence of unknown but constant receiver sensitivity in the vehicle Minion device. The technique is as follows. A pair of Roadside Survey Minion devices as described above are installed, one on each side of the roadway. As described above, passing vehicle Minion devices will collect and totalize the messages from each roadside Minion device into independent data values. Each of these totals could be used to independently derive a travel-lane estimate, but the results would be biased by the (unknown) receiver sensitivity. The pair of results from the two roadside Minion devices, derived from the same physical passage of the vehicle through the area can be used to compute an improved estimate that eliminates receiver sensitivity as a major source of bias.

In this implementation, the roadside Minion devices will be time-synchronized such that their data message transmissions occur at alternate intervals. This cooperation will prevent messages from being sent at the same time from each side of the road—a situation that would garble the data for virtually all recipients.

Automated Parking Fee And Management Systems

Figure 12:
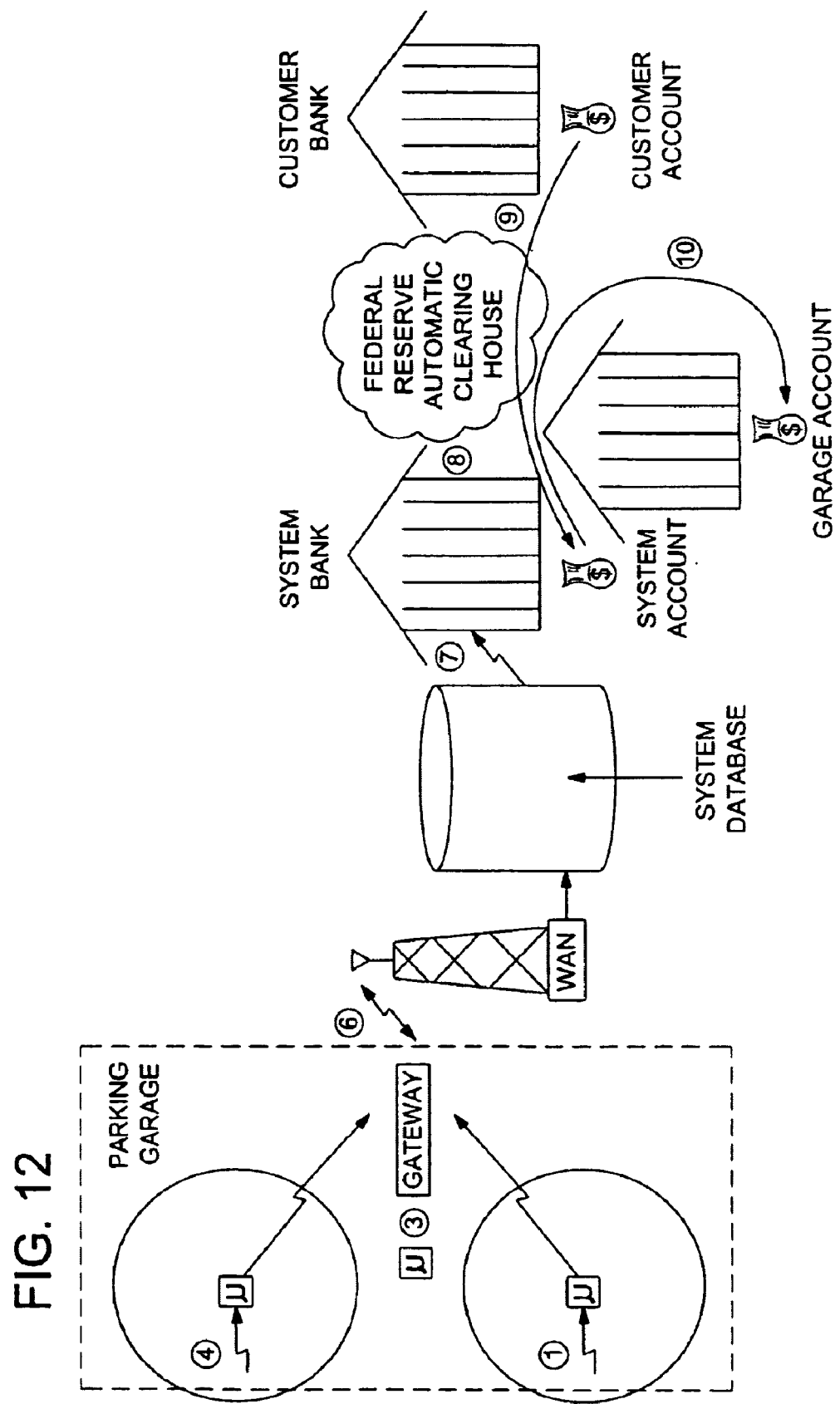
FIG. 12 is a diagram of a parking garage system according to the invention.

Flat Lots and High-Rise Garages—FIG. 12 is a schematic diagram illustrating one implementation of the MinionNet network system according to the invention for use in a parking garage wherein parking tolls are automatically charged to a customer depending on a particular customer's actual use of the parking garage. In addition, the operator's parking management system is enhanced. At point 1, the customer's vehicle enters the parking garage having a Minion device on the vehicle. The vehicle Minion device communicates with the gatewayMinion device at point 2. Essentially, the vehicle Minion device sends a message to the gateway Minion device indicating its identification and the time that it has entered the parking garage. At point 3, the vehicle is parked and using the garage and will be charged for the time therein or so noted on the vehicle operator's monthly rate parking record. At point 4, the vehicle exits the garage providing a last message to the gatewayMinion device indicating its identification and time. In this system, the gatewayMinion device is programmed to determine the time of receipt of the first message and the time of receipt of the last message and the total time there between thereby indicating the amount of time that the vehicle has been using the parking garage. At point 6, the gatewayMinion device sends the composite transaction information including the total time and the vehicle ID via the wide area network to the system database. At point 7, the system database consolidates all transactions for that vehicle and sends the information to a system bank. At point 8, the bank forwards the information as a request to the automatic clearing house. At point 9, the automatic clearing house transfers funds from the customer's bank and the customer's account to the system account. At point 10, the automatic clearing house transfers funds from the system account to the garage account thereby paying the parking garage owner for the time that the customer used the parking garage. This approach offers a number of options such as allowing monthly parking customers to park in other lots of the operator on an hourly basis. As will be outlined below, there are at least six different types of parking that may be able to use MinionNet network system technology.

Automated Collection of Parking Fees Using RPM Minions—Raised roadway markers (RPMs, also known as "Botts Dots") are glued to a pavement surface and are typically used for lane markings. A Minion device consisting of power source, micro-controller, radio transceiver and antenna can be embedded in the solid, non-conductive material of the RPM and provide the ability of extending the short-range wireless communication aspects of the MinionNet network throughout a flat parking lot or high-rise parking garage.

In addition, a solid-state magnetic flux sensor may be embedded along with the Minion device. The flux sensor is used to detect changes in ambient magnetic field caused by the nearby presence of the metal of a vehicle. The intended applications would involve the installation of RPM Minion devices near the center of marked parking spaces. The Minion devices would thus provide vehicle presence information on a per-slot basis to the network.

The MinionNet network architecture allows a small number of gatewayMinion devices to relay information from the large number of RPM Minion devices to a centralized database or dispatch center.

Tow-Away Zones—By placing RPM Minion devices in locations that are marked as No Parking zones they can detect and report stationary vehicles which represent probable violations as exception reports. These exception reports can be used to optimize enforcement actions such as ticketing or towing. A dispatch center directs the enforcement agents directly to the locations of suspected infractions instead of relying on expensive and unproductive patrolling.

Reserved/Contract Parking—In a contract parking scenario each parking spot would have a RPM Minion device installed and each authorized vehicle would be issued a Minion device which would be installed in the vehicle. The vehicle Minion device and the RPM Minion device would represent 'buddies', as described in the section on Buddy Systems. An exception message would be generated and passed through the MinionNet network if a vehicle was detected in the spot but the corresponding Vehicle Minion device could not be contacted. Multiple Vehicle Minion devices could be assigned to a single parking spot to accommodate users who drive different cars on different days, or employees who work different shifts but share the same parking spaces.

The ability of the MinionNet network to collect transaction data with associated time-stamps would allow prorated or time-based billing. Multiple slots could be assigned as a pool to a particular company's employees and the employees could choose to park in any of their assigned spots on a first-come first-served basis. The MinionNet network would collect information regarding the number of spots actually used at any given time and verify the legitimacy of the vehicles using those spots.

Parking Meters—Parking meters could be equipped with Minion devices to allow automatic payment of parking fees by Minion-equipped vehicles. This scenario also involves a RPM Minion device located in each parking space. When a vehicle arrives at a spot it is detected by the associated Minion device and a message is sent to the Minion device in the meter. The user could pay with traditional coins, or the meter could interrogate the vehicle for a Minion device with parking account information. If payment is not made, an unauthorized vehicle exception is generated and the network promotes enforcement actions. If payment is made with coins and the meter expires while the vehicle is still parked an exception is generated. If the vehicle leaves before the meter expires the meter will immediately reset so that the next vehicle is required to pay the full fee. If the fee is being paid through an automated account with a Minion device in the vehicle the fee can be accurately prorated based on the actual time in the spot.

Special Event Parking—Minion-based tokens could be used as pre-paid or debit parking vouchers for sporting events, fairs, amusement parks, etc. The comparatively long communication range of several hundred feet would allow rapid access to the parking facility by allowing the payment transactions of an entire group of cars to be processed in parallel. Pre-paid Minion devices could be purchased at convenience stores or used as promotions in VIP packages or with season tickets. Credit or debit account information could be added to a Minion device by the user via an Internet site.

Airport Parking—Airport parking creates a number of special parking management needs. There are various types of vehicles that routinely enter and leave the area to provide services, such as taxis, buses and delivery trucks. There are also many vehicles that come only to drop off and pick up customers, and those that park while traveling. An automated parking management system, such as provided for by the MinionNet network system technology could greatly enhance the flow of traffic, plus improve the parking fee collection process. The system also allows for a level of security and safety not currently available. Other airport applications for MinionNet network are described later.

Figure 13:
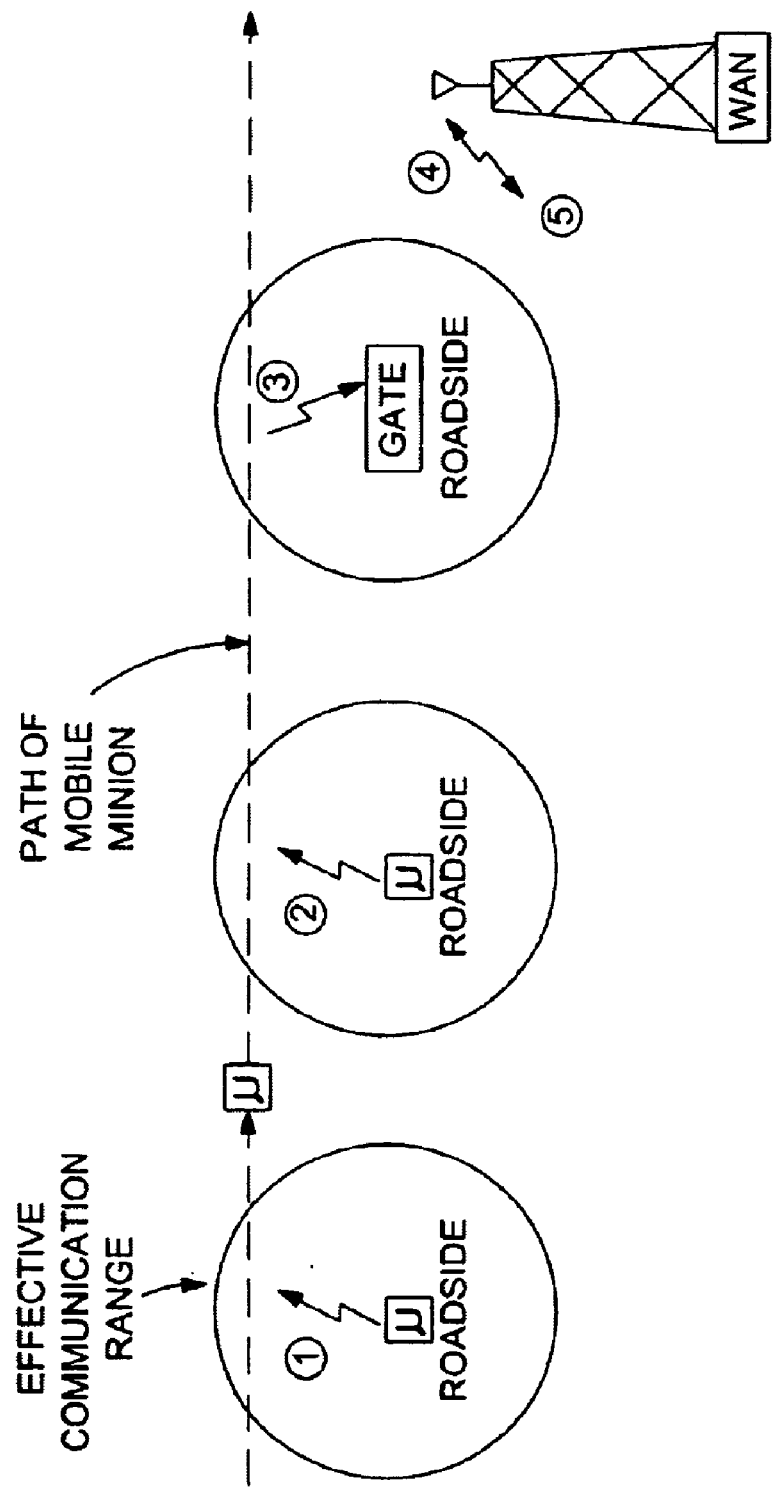
FIG. 13 is a diagram of a toll road system according to the invention.

Automated Toll Collection System—FIG. 13 illustrates another preferred application of the system according to the invention wherein a network is set up for charging tolls to customers who use a toll road. Each customer would have a mobile Minion device connected to its vehicle which travels along the road and passes a series of roadside Minion devices. At point 1, the roadside Minion device sends position and time messages to the mobile Minion device. At point 2, the mobile Minion device receives a second message from the second roadside Minion device and stores the information therein. At periodic points such as point 3, gatewayMinion devices are positioned which receive the stored messages in the mobile Minion devices and transmit the information to a wide area network for processing the information for charging tolls to the customers. In particular, at point 4, the gatewayMinion device sends the collected results to the wide area network. The system of FIG. 13 is in contrast of the traditional approach presently used wherein roadside readers are positioned along a toll road to read tags mounted on a vehicle. In these prior art systems, the readers have narrow read bands and narrow read zones with high misread rates. Furthermore, vehicles must be forced into individual narrow lanes, thus requiring drivers to slow down considerably, to improve reliability. Such prior art systems have little or no flexibility as fixed tolls are assessed from passing readers with no prorated rates. In contrast, the system of FIG. 13 can prorate rates depending on the amount of usage of the vehicle as cataloged by the mobile Minion device. Another drawback of the prior art system is that all readers must communicate directly with a central database so that system installation is extremely expensive and implementation requires long term planning. Finally, the system is inflexible because once it is installed, changes in architecture and location are very expensive. In contrast, the system of FIG. 13 provides flexible installation and low cost variations thereto.

Due to the omnidirectional characteristics and variable range of the MinionNet network radios it is possible that certain ambiguities could arise in closely-packed parking applications. Consider the case of two vehicles parking at adjacent meters simultaneously. If one was valid, Minion device Equipped and the other was not it would be difficult to automatically determine which was the offending vehicle. The number of occupied slots and the number of payments would be out of balance so an enforcement exception could be generated, but it would be necessary for a human being to examine the situation to identify the violator. This implies that the vehicle mounted Minion device should be visible for enforcement purposes, or that it should contain vehicle identification information in electronic form that can be interrogated for enforcement purposes. Enforcement personnel could use a hand-held device to interrogate the Minion devices in an area to determine the vehicle that was not properly equipped.

The Distributed "Black Box"

The present application describes the use of MinionNet network technology and specialized Minion devices to form a distributed Black Box data recorder for vehicles including military, railroads, commercial and private aircraft, commercial and private cars and trucks, etc., e.g, a device for distributed collection and recording of vehicle performance data. In this implementation, Minion devices would be installed in various locations distributed throughout the vehicle. Gateway black boxes would be located in and around secure facilities, at railroad crossings and along highways, for example.

Each Minion device would include an interface to a sensor related to a measurable phenomenon located in close proximity to the Minion device itself. In general these phenomena would include an electrical potential, such as the current that powers a light or actuator, and would thus be capable of providing operating power to the Minion device itself. Some instances might involve a non-electrical quantity such as a shaft position or hydraulic pressure or the presence of noxious gases. In this latter case it would be necessary to make additional provision for power to the Minion device.

The Minion devices would form a distributed data recorder with the following primary advantages:
1. Ease of installation. No provision is needed for wiring from all parts of a vehicle to the central recorder.
2. Low Cost. Individual Minion devices are inexpensive and can be added or replaced incrementally.
3. Light Weight, due to the elimination of extraneous wiring and centralized recorders.
4. Survivable. Minion devices are tolerant of shock and the distributed nature means that this implementation avoids the all-or-nothing aspect of traditional black boxes in fires. Minion devices located in peripheral areas may be scattered away from the main vehicle in a fire or explosion. In addition, the data storage chip may contain recoverable data, even if the Minion device itself is rendered non-functional following an accident.
5. The wireless transmission capabilities of Minion devices could assist searchers in locating scattered pieces of wreckage.
6. Individual Sensor/Minion devices may be pre-programmed with certain operating limits and can initiate an alert transmission during normal vehicle operation in the event of an out-of-tolerance condition.
7. The MinionNet network would allow automatic time synchronization of data recorded throughout the vehicle. This is done without requiring traditional point-to-point wiring throughout the vehicle.

In a military application the distributed Minion devices would initialize and synchronize when the vehicle is initially powered up for a mission. After confirming normal operation of the individual Sensor/Minion devices, an instruction would be sent throughout the network to eliminate further transmissions for the duration of the mission, thus eliminating the possibility of interference or unwanted radiation in a hostile zone. After the mission, a message with an encrypted authentication sequence would reenable the normal MinionNet network operation and allow downloading the collected data for debriefing or performance analysis.

Other MinionNet Network Transceivers Embodiments

The current implementation of the MinionNet network uses Minion devices that incorporate single-frequency ASH transceivers. The primary reasons for this choice are as follows:
1. Lowest possible cost implementation.
   A. Design
      1. Minimum certification requirements - no local oscillator
      2. No licensing required due to 1 mW max power output and use of shared frequency band
   B. Manufacturing
      1. Lowest component count.
      2. No tuning or calibration required
2. Lowest power consumption.
   A. Allows wide selection of power sources.
   B. Allows compact implementations if needed.
3. Adequate performance for the intended applications.
4. Smallest size.

Key features that enable MinionNet network operation are the fact that all transmission and reception is on the same frequency. This means that Minion devices do not have to seek an active frequency or hopping pattern. All Minion devices in an area automatically snoop all message traffic and build a table of Minion device IDs automatically—it is not necessary to explicitly transmit routing tables over the network. The low transmit power and ~300 foot range means that this single frequency is able to handle many parallel, geographically diverse micro nets which are interconnected either through gatewayMinion devices or Minion devices with overlapping ranges.

It is possible to expand the MinionNet network concept to include implementations using other transceiver technologies. In particular, a spread-spectrum implementation with higher power transmitters, greater range and higher data rates would be possible. In any multi-frequency implementation the applications would have to justify the added cost of synthesized transceivers and the necessary power supplies. In addition, provision for operation on multiple "virtual channels" at the same time would probably be required. These channels could be implemented with different hopping patterns or code-division schemes. The purpose would be to provide a single type of channel for traffic identification and routing purposes and to use other channels for the bulk of the data messages. Simultaneous use of the channels would allow the equivalent of the snooping feature of the traditional MinionNet network and yet increase the effective overall bandwidth and data rate for longer rang or more data intensive applications such as the Internet, real-time voice or video. Since the longer range communications would cover a geometrically increasing number of Minion devices, the bandwidth required by the spread-spectrum implementation would also increase geometrically. Careful power modulation in each transmitter would be required to keep such an implementation practical. Power modulation is a feature of the single-frequency implementation, but the ramifications of using excessive power in the wider-area implementation are much more drastic.

The main reason for implementing a spread-spectrum approach is 1) to allow higher bandwidth transfers to each Minion device, and 2) to make near-real-time delivery of data possible over a larger area. Specifically, any two single-frequency Minion devices can expect to communicate, but this may require a large number of hops and may have to involve gateways. Expanding the range of each Minion device through spread-spectrum or multi-frequency implementations with higher transmit power levels would allow direct communication over larger areas. There will be a trade-off between the conflicts generated by these large coverage areas and the delays caused by multiple hops. It is anticipated that a balance will exist based on the type of application that needs to be supported.

Intermediate Range Organization

For example, MinionNet network based telephony might be practical with effective maximum transmission ranges on the order of 6000 feet. This is 20 times the range anticipated for the single-frequency MinionNet network and would probably require a power output level of 3 watts or so for digitized voice. It is anticipated that short voice exchanges could be accomplished using this technology, even if a small number of hops were included. Thus the effective coverage of such a network would encompass many square miles and require no fixed infrastructure such as cellular phone towers.

In addition, it is anticipated that the correct organization of such a network would include a hierarchy of Minion devices with different service radii. An automatic negotiation would take place among Minion devices in a locally communicating network that would appoint a particular Minion device as the gateway to a larger service radius. Typically, this Minion device would communicate with the gateways that were similarly selected for adjacent areas. This establishes a multi-tiered gateway architecture that is dynamically configured and could extend to four or five levels, as opposed to the basic MinionNet network implementation that uses a flat, single-level gateway architecture. This yields a totally wireless network that is conceptually organized more along the lines of the traditional wired telephone system with its hierarchy of different level (i.e., local, regional, national and international) switching offices. The key features of the MinionNet network architecture—multiple identical nodes, automatic reconfiguration, and dynamic routing—are preserved and expanded in this approach.

Palm Connected Applications

Hot-Sync Data—Minion devices could be installed in Palm Pilots to perform the data transfer currently done with hard wire, modem or infra-red links.

Clock Synchronization—Minion device based Pilots would have accurate time and time zone information.

Bus/Train Schedule—Minion device based Pilots would link to current Minion-based schedule updates.

Pager and E-MAIL—Minion device based Pilots would have access to two-way pager and email services.

Universal Control Panel Replacement--Minion device based Pilots would replace the user interface on a variety of devices.

Route Sales Terminal--Minion device based Pilots could be used as route sales order entry terminals. The wireless link could connect to a portable printer and a gateway in the truck.

Restaurant Order Entry--Minion device based Pilots could be used to link waiters with the kitchen, ticket printers and credit verification terminals.

Time Independent Voice Applications

The major drawback to establishing real-time voice connections is that the nodes involved in the connection need to remain nearly static for the duration of the connection. This becomes more problematic if the call is lengthy. If connections could be limited to a simple exchange of short messages, possibly including limitation to half-duplex, the practicality of this approach would be increased. In addition the peak bandwidth allocation could be reduced proportionately.

Simple examples of the difference between a MinionNet network based voice messaging system and traditional telephony could be as clear as the differences between the Star Trek communicators and a teenager's telephone.

The Star Trek scenario allows virtually instantaneous transmission of a short message from one communicator to any other, by name, without any central processing or switching: "Kirk to Spock". A short verbal reply follows: "Spock here." Kirk concludes the exchange with "One to beam up." This is entirely one-at-a-time, half-duplex communication with certain delays that are completely obscured by the short, asynchronous nature of the communication. In particular, the (hypothetical voice actuated routing) system cannot possibly know the intended destination of the message until Kirk finishes saying the word "Spock". Therefore, the system has to have recorded the entire origination message, analyzed it, established the message routing, activated Spock's communicator and then played back the "Kirk to Spock" message. This delay is not obvious from the way the communication is seen on TV, but the effectiveness and utility of these short transmissions is amply demonstrated in the TV series. This type of voice communication would be feasible with MinionNet network technology.

In contrast, current public expectations of a telephone system more closely match the teenager's. Connections can last for hours. There can be long periods of silence or background-only transmissions. During conversation, there will be frequent interruptions by the other party. A side-tone and continuous receipt of "comfort noise" from the other party are expected. It would be difficult for a Minion-based system to provide this type of service in a cost-effective manner.

Intelligent Transportation Systems (ITS)

Regional Transportation

Dynamic Traffic Signal Control--Minion devices provide data to be fed back to the traffic management system to dynamically control traffic signals.

Personal Mobility Survey—Minion devices carried by survey participants could assist in collecting accurate trip information for intermodal travel.

Pattern Analysis—Minion devices could be installed on vehicles to gather historical travel pattern data.

Congestion Monitoring—Minion devices installed on vehicles with roadside or mobile gateways to provide early notification of incidents.

Survey of Violation Rates—Minion devices could be installed at school zones to provide estimates of the number of infractions. Similar systems could monitor speed zones and traffic signals.

Driver Information—Minion devices could be installed on speed limit signs, school zones and construction sites to provide Minion-equipped drivers with current speed limit information.

Municipal Transportation

Bus Schedule Display—Minion devices could be installed on bus stop signs with gateways on buses to provide updated displays of expected arrival times of the next bus.

Signal Maintenance—Minion-equipped traffic signal controls could be operated by maintenance personnel from a maintenance truck or central office. This eliminates the need for control panels and user interfaces inside the control box.

Signal Operational Status—Minion devices could be installed on traffic signal devices to monitor operational status and generate exception reports for outages, physical damage, burned out bulbs, etc.

Fare, Toll and Tariff Collection

Bus, Cab, Train Fares—Minion devices could be carried by passengers to provide automated fare collection or credit card billing.

Parking—Minion devices could be installed in parking meters or lots. Motorists could be directed to vacant spots. Fees could be collected automatically and could be pro-rated for specific times. Enforcement personnel could be immediately notified of violators.

Vehicle Registration, Inspection and Insurance—Minion devices could be required as a registration tag. Inspection and insurance updates would be automatically transmitted to the vehicle. Enforcement personnel could be immediately notified of violators.

Toll Road Collection—Minion devices installed on vehicles could replace existing toll tags. Virtual toll booths would eliminate much of the toll road infrastructure.

Tariffs in interstate commerce—Minion devices could be installed on individual trailers to provide automated tariff collection and centralized manifest management.

Railroads

Maintenance of Rolling Stock—Minion devices could be installed on individual rail cars to provide odometer-like distance traveled. Coupled with maintenance records this could provide exception reports indicating the need for scheduled maintenance.

Audit—Minion devices installed on individual rail cars could provide location and existence audit.

Toll Collection—Minion devices installed on rail cars could assist in audit and collection of appropriate right-of-way tolls.

Consist Monitoring—Minion devices installed on rail cars could help to assure proper consist assembly.

Grade Crossing Status—Minion devices could be installed at grade crossings and in locomotives to provide engineers with advance notification of switch or crossing status.

Trucking

Audit—Minion devices could be installed on individual trailers to provide an audit of freight yard or trailer locations.

Location History—Minion devices could be installed on individual trailers to provide a movement history.

Status Monitoring—Minion devices could be installed on individual trailers to provide alarms for refrigeration or tire pressure.

Freight Container

Audit—Minion devices could be installed on individual freight containers to provide an audit of freight yard or container ship contents.

Location History—Minion devices could be installed on individual freight containers to provide a movement audit.

Airports

Ground Handling Monitoring—Minion devices could be installed on individual aircraft and taxiways to provide controllers with information on the identity, location and movements of aircraft operating on the ground.

General Aviation Insurance—Minion devices installed on general aviation aircraft could provide for location exception reports and theft recovery.

Hazardous Materials

Audit—Minion devices could be installed on industrial containers to facilitate required record keeping during normal usage, storage, transportation, cleaning and refill.

Emergency Response—Minion devices installed on containers would enable emergency response personnel to be aware of the materials in a warehouse, truck or freight train. Warnings of unusual combinations would be automatic.

Waste Disposal—Minion devices could be installed to monitor the disposition of hazardous waste containers.

Hazardous Environments

Personnel Location—Minion devices in the form of badges or dog tags could be required of all personnel working in hazardous environments such as chemical plants and refineries or aircraft carrier flight decks. Current location of personnel would be maintained so that an accurate count could be obtained in the event of an emergency such as fire, explosion, chemical leak or other situation requiring evacuation.

NAFTA—NASCO (North American Superhighway Coalition)

Border Expediting—Minion devices could be installed on individual trailers to provide automated identification as the truck approaches the checkpoint. The manifest would be available to the inspector immediately. Arrivals could be anticipated for personnel scheduling.

Compliance Monitoring—Minion devices installed on individual trailers would record route history and anticipated schedule. Added hardware could provide notification of seal tampering.

Law Enforcement

Vehicle Silent Alarm—Minion devices could be installed as pairs: vehicle and key-chain. Vehicle operating without its 'buddy' Minion device would generate a Minion-based silent alarm for law enforcement.

Stolen Property Recovery—Minion devices installed in vehicles or other personal property would provide location upon interrogation if recovery is needed.

Remote Shutoff—Minion devices could be installed in vehicles to provide a remotely controlled 'kill switch' feature. Could eliminate high-speed chases and provide for the vehicle to be disabled for safety reasons during routine traffic stops. Disabling signal could come from a helicopter or police car.

Enhanced 911 Location Services—Minion devices installed in cell phones would provide virtual geolocation services for emergency response personnel. This would allow cellular service providers to meet the legislated E-911 requirements without installing additional infrastructure of their own.

Personal and Public Safety

Universal Panic Button--Minion devices carried by individuals could provide for summoning appropriate response.

Lost Child--Minion devices worn by children at home, day care or at the mall would generate alerts if the child moved away from an appropriate area. Variant on the house arrest idea. Also appropriate for Alzheimer's patients at home.

Amusement Park Locator--Minion devices could be carried by children at amusement parks to facilitate location by parents.

House Arrest Device--Minion devices worn as bracelets would provide alarms if the subject moved into or out of a prescribed area. Also appropriate for hospitals and mental health facilities.

Hospitals

Capital Equipment Audit--Minion devices could be installed on equipment such as cardiac monitors, defibrillators or wheelchairs. This would provide for remote audit (possibly of multiple facilities) and would enable exception reports for missing or mis-located equipment.

Equipment Locator Service--Minion devices installed as above could be located rapidly. This could provide faster emergency response as well as reducing the time required for routine patient transfers, etc.

Patient Registration and Location--Minion devices attached to patient ID bracelets would facilitate patient location, identification and speed access to chart records in an emergency.

Handicap Assist

Exit Locator--Minion devices could be installed at exits, stairways, restrooms, etc. in public buildings. Handicapped or visually impaired people could use handheld or wheelchair-mounted Minion devices to rapidly locate these places and be warned of obstacles or dangers along the way. In an emergency evacuation these could function in reverse to allow emergency personnel to assist the handicapped.

Mobile Finance Management

Floor Plan Audit and Management--Minion devices installed on floor plan vehicles provide collateral protection and notification of sale or exception status.

Vehicle Auction

Parking Lot Locator--Minion devices could be installed on vehicles to be auctioned. Virtual geolocation services would allow rapid location of specific vehicles. Used car dealers, seeing the value MinionNet network provides new car dealers and vehicle auction houses, may want to incorporate Minion devices in their operation.

cap Collateral Protection

Consumer Loan/Lease--Minion devices installed in the vehicle provide the finance organization with location history on request and exception reports based on unusual movement patterns.

Commercial Equipment Loan/Lease--Minion devices installed on trucks or construction equipment provide collateral protection and exception reports.

Alternative Network Applications

The lowest level Minion device will be capable of participating in the network, routing traffic, providing time and location services and acting as a proof-of-existence token. Many applications may find that this is all the service that is actually required. However, added functionality will always be requested as customers find additional potential markets for the technology.

Minion device modules provide a component-level capability that can be incorporated into existing designs with very little engineering effort. This will provide the shortest time to market for the technology.

In addition, we envision a set of OEM modules designed for direct incorporation into consumer appliances as a replacement or supplement to the receivers for infrared remote controls, modules that plug directly into the Standard Automotive Bus, the Universal Serial Bus for personal computers, and standard analog phone lines.

By replacing or supplementing the infrared receiver in home appliances the manufacturer would be able to offer distinctive new features for new and existing product lines. Controlling appliances such as televisions, stereos, cable and satellite receiver boxes, thermostats, and fire alarms, would be possible from a personal computer, personal digital assistant or from other rooms via a Minion-equipped remote control. This would require minimal design changes to the appliances. Ultimately it would be possible to eliminate the expensive displays and switches that form the user interface to virtually all appliances.

For automotive applications, a Minion device that plugs directly into the Standard Automotive Bus would allow such features as wireless diagnostics. This extremely easy installation of Minion devices in vehicles would not require any additional design work.

Many of the applications require a Minion device that can connect to a personal computer. It would be possible to connect a Minion device via the serial or parallel ports of any existing PC. Most new computers have an implementation of the Universal Serial Bus interface. This interface is ideal since it provides a self-configuring Plug-and-Play connection scheme. Power is available on the bus, and it is designed to support multiple devices without conflicts.

Minion devices could be designed for direct connection to existing analog telephone lines without interfering with the normal operation of the phones. This provides a convenient source of power for the Minion device as well as offering the opportunity for clever value added services such as wireless Caller ID, ring detection, recording of phone usage, automatic muting of televisions during calls. The MinionNet network services would help to unify the telephones, computers and appliances throughout a home or business.

Even though these application-specific Minion devices add new features to each application and are cost justifiable on that basis alone, the real benefit comes from the universal nature of the Minion devices themselves. Each Minion device incorporates the basic MinionNet network features of unique identity, message routing, time synchronization, virtual geolocation and gateway access. This combination of features coupled with large numbers of Minion devices deployed in the field allow for services far beyond what any single application could provide.

Application Specific Transceivers

The basic mµMinion devices may be used as stand-alone devices which perform the prescribed network functions, or they may be connected to or embedded in external equipment or devices. For example:

Consumer Devices--Household appliances, Televisions, TV remote controls, clocks, microwave ovens, telephones, doorbells, security systems, swimming pool controls, swimming pool safety alarms, water sprinkler controls, garage door openers, automobiles, home entertainment equipment, stereos, CD players, pocket pagers, cell phones, personal digital assistants, notebook computers, desktop computers, keyboards, monitors, cameras, camcorders, video cassette recorders.

Building and Factory Management and Controls--Heating, Ventilation, Air Conditioning and Refrigeration equipment and their controls, including thermostats, humidity sensors, motion detectors, occupancy sensors, exit signs, door locks, lighting fixtures and controls, emergency alarms, signaling devices, security devices.

Wide-area Networking Connections--Wireless LAN, Wireless data network devices such as Mobitex and Ardis, Land-line telephones, computers with Internet connections, two-way paging networks such as Pagemart, cellular phones, satellite phones, satellite data networks such as Orbcomm or Teledesic.

Global Positioning System--Receivers for GPS, GLONASS or other systems can provide position services, including receivers equipped for differential augmentation or other accuracy-enhancement techniques.

User interfaces--Keyboards, displays, changeable message signs, indicators, audible annunciators, recorded or synthesized verbal announcements, alarms, vibrators, buzzers, etc. may be provided.

Sensors--Temperature, barometric pressure (for weather or altitude), magnetic flux (for metal detection, change in attitude or compass), accelerometers (for motion, attitude change), motion or shock detectors, etc. may be connected.

Although these are network applications may not be part of the authorized MinionNet network because the applications are unlicenced, these Minion devices would be available to transfer data to and from licensed Minion devices. Furthermore, any Minion device would have the option to join the licensed network in the future by becoming a part of one of the MinionNet networks.

Additional Alternative Network Applications

The following applications are generally grouped by the type of market. However, it should be recognized that many applications can be applied to multiple markets and/or may be combined.

Utilities

Meter Reading--Minion devices could be built in the form factor of a modem for inclusion in various advanced meter designs to provide remote meter reading capability. Similar opportunities exist for water and gas meters. The system would also provide remote meter reading capability for electric, gas and water, as well as numerous generation, production and distribution applications, such as pipelines. It is especially applicable for high density configurations such as apartment complexes. Reading could also be provided via gateways to reduce or eliminate field work for reading. Two-way control could allow implementation of prepaid electric services, variable rate charge plans, etc.

Quality of Service--Minion devices could be installed in association with customer's equipment or on feeder lines to monitor for sags, surges, power factor, and outages. Gateways would provide direct feedback for some applications, while others would need only historical profiles.

Power Management--Power management applications such as wireless load shedding, power connect and disconnect and other management functions are now possible using the intelligent two way MinionNet network.

Several Other Miscellaneous Applications

Automotive

Remote Vehicle Diagnostics--Minion devices could be installed on vehicle engine control systems to allow wireless diagnostics of various onboard systems.

Remote Start--Minion devices could be installed in vehicles to allow remote start for warm-up or other remotely programmed activities.

Clock Synchronization--Minion devices could be installed in automobile clocks to provide synchronization and correction for daylight time and driving to different time zones.

Intelligent Keyless Entry--Minion-equipped vehicles would detect the approach or departure of their owners.

General Business

Capital Equipment Audit--Minion devices could be installed on equipment such as cardiac monitors, defibrillators or wheelchairs. This would provide for remote audit (possibly of multiple facilities) and would enable exception reports for missing or mis-located equipment.

Field Service

Fleet Equipment Inventory--Minion devices could be installed on test equipment, tool boxes, etc. Driver would receive notice if he leaves a site without an important piece of equipment.

Equipment Contract Status--Minion devices could be installed on equipment covered under warranty or maintenance contracts. Assists service personnel in locating the equipment in a building, as well as assuring its status. Examples would be copier service.

Building Systems Monitoring and Control

HVAC--Minion devices could be installed in wireless thermostats and HVAC ducts and control points to provide flexible, remotely administered operational control and historical monitoring.

Lighting--Minion devices could be installed as part of lighting controls and occupancy detection to control lighting on a time and demand basis.

Security--Minion devices could be used as authorization for access to certain areas. Occupancy of a area without a proper Minion device could trigger a security response.

Access Control--Minion devices could be installed in door locks to allow remote reprogramming as new electronic keys are issued. No wired infrastructure would be needed, so retrofitting older facilities would be simplified. Minion device locks would also report usage status and low battery conditions.

Hotel/Motel Management

Door Locks--Minion devices could be installed in door locks to allow immediate re-keying as guests check in and out.

Air Conditioning Control--Minion devices could be installed in air conditioning controls to disable heating/cooling of unoccupied rooms.

Smoke/Fire Alarms--Minion-based wireless smoke alarms in each room could facilitate rapid response throughout a building.

Vending

Machine Status--Minion devices could be installed to provide inventory and coin-box status. Multiple machines would share a gateway.

Home Control

Lighting--Minion devices could be installed to provide automated light schedules and remote controls. Occupancy detectors could turn off lights in unused areas.

Appliance Remote Control--Minion devices could be installed in all appliances to provide centralized control panels, remote operation and scheduling. Candidates would be TV, VCR, Satellite/Cable boxes, refrigerators, dish washers, washer/dryer, telephone/answering machine/caller-id. Minion device clocks would automatically synchronize and correct for daylight time and changing time zones in a move.

Security--Minion devices could be installed to provide motion/occupancy detection and coupled with schedule information to detect unusual patterns.

Fire/Smoke Detectors--Minion devices could be installed to provide wireless fire and smoke detectors that could initiate an alarm throughout a home or apartment building.

Garage Doors--Minion devices could be installed in vehicles and garages to provide automatic door control and prevent unauthorized access.

Swimming Pools--Minion devices could be installed to provide remote control and scheduled operation of pool features.

Lawn Sprinkler Systems--Minion devices could be installed to provide remote control and programming of sprinkler settings. Central records or forecasts of rainfall, freeze alerts or watering restrictions could be automatically applied. Flow metering could provide automatic notification of clogged or damaged heads.

Heating/Air Conditioning--Minion devices could be installed to provide remote control and programming of air conditioning systems. Intelligent comfort zones could be arranged with portable Minion device thermostats.

Cable Television

Quality of Service--Minion devices could be installed in association with customer's equipment or on feeder lines to monitor for outages. Current implementations require customers to notify the cable company in the event of a service interruption.

Weather Bureau

Remote Weather Station--Minion devices could be installed in inexpensive remote weather monitoring devices. These could be easily mounted and provide infrequent updates of recorded conditions such as wind, temperature, humidity, rainfall, river flood stage, etc.

Cave Research Communication

Survey--Minion devices could be left like a trail of bread crumbs to provide hop-to-hop communication between a survey team and a logging system on the surface.

Emergency Response--Bread-crumb Minion devices would facilitate rescue response by minimizing the time it takes to request and receive the proper tools or assistance.

Routine Environmental Monitoring--Bread-crumb Minion devices could be installed as part of a long term survey project and could convey data from subterranean sensors for long periods without human contact. Useful for recording air flow, water level, temperature, humidity, $O_2$, $CO_2$, hydrocarbons, etc.

APPENDIX

µMinion Firmware Operational Overview

This document describes the features and implementation of the kernel functions of the base µMinion. The hardware listed is common to all Minions and does not cover any application-specific ports, interfaces or software. The software listed includes standard API calls that would be used by application-specific drivers for external hardware.

1. µMinion Overview
2. Basic Radio Protocol Features
3. I/O Port Usage
4. Internal hardware operating modes and initialization parameters
5. Transceiver Hardware
6. Firmware Features
7. MinonNet Message Format
8. Programming Conventions
9. Driver APIs µMinion Overview The µMinion is a low-cost, intelligent two-way data radio. It participates as a member of a self-organizing network of functionally identical nodes. Each µMinion can originate and receive data messages, and can act as an intermediary in forwarding messages on behalf of other µMinions.

Each µMinion may optionally be connected to external devices such as sensors, memory or wide-area network connections. Each µMinion makes these resources available to the other µMinions in the vicinity. µMinions with wide-area connectivity are referred to as gatewayMinions.

The base µMinion uses a Microchip PIC16LF876 microcontroller and an AFX proprietary hybrid RF transceiver. The transceiver operates in the unlicensed 900 MHZ ISM (Industrial, Scientific and Medical) band.

The physical implementation of a µMinion consists of a radio transceiver, microcontroller and memory contained on a double-sided circuit board about the size of a postage stamp.

The radio transceiver operates in the unlicenced ISM band above 900 MHZ. The effective output power is less than 1 milli-watt. All Minions transmit and receive on a single frequency. This eliminates the added cost and complexity inherent in spread-spectrum or frequency agile approaches. The receiver is a stable, inexpensive direct-conversion implementation. Minions do not have frequency synthesizers, local oscillators, IF filters, IF amplifiers, or antenna duplexers.

The modulation is CW, also referred to as 'on-off keying', and the bit coding uses a self-clocking Manchester code. This minimizes the power required for transmitting since the transmitter is on for exactly half the time during a message transmission, and is completely off at all other times. Manchester coding requires the receiver to be able to accurately detect signal edges: on-off or off-on transitions. These edges must occur within certain timing windows to be valid. This provides an opportunity for increased noise immunity and rejection of spurious transitions. The self-clocking nature of the bit coding means that there is no requirement for long-term clock stability, start/stop bits or zero-bit-insertion such as would be found in asynchronous or synchronous schemes.

Since modulation using Manchester-coded data is balanced, the signal rides on top of the background noise level and is very easy to detect. A simple automatic gain control provides rejection of background noise and detection of data signals over a wide dynamic range.

The µMinion hardware will operate over a temperature range of −40° C. to +85° C.

Basic Radio Protocol Features

The messages handled by the Minion Network can be thought of as being 32 bytes long and transferred at 9600 baud. Each Minion has a unique 32-bit serial number assigned during manufacture. This gives over four billion numbers, although number reuse is not as big an issue in this environment as it is in some others. Each message will contain space for four of these serial numbers: (1) the message originator, (2) the message final destination, (3) the device actually transmitting for this hop and (4) the intended receiver for this hop. Messages also contain a set of standard fields for message type codes, device status bits, message priority and handling bits. A payload area will contain application specific data such as geolocation information, time/date, etc., as determined by the message type codes. In addition, the protocol specifies a cyclic redundancy check (CRC-16) used to detect errors encountered during tranmission. The message length and data rate combine to give a maximum of 20 messages per second to or from a single node. The normal operation of the network will tend to keep the actual average rate down around one message every few seconds. The actual radio modulation scheme provides easily detected balanced modulation with self clocking databits. This allows wide variations in microprocessor clock performance with temperature and eliminates the need for a crystal oscillator.

The basic protocol is completely connectionless and each message is treated as an independent datagram. Protection mechanisms are built in to ensure robustness, but delivery of any individual message is not guaranteed. The database server may initiate enquiries into the distributed network and ask for retransmission of suspected missing messages.

I/O Port Usage

The following table shows the I/O pin usage for the base μMinion and the intended usage of the 'unused' pins as implemented in various current board designs.

| Port | Pin | Function | I/O | Base μMinion Usage | Enhanced Support |
|---|---|---|---|---|---|
| A:0 | 2 | RA0 | O | Power Supply Reference Enable | |
| A:1 | 3 | RA1/AN1 | | Unused-Available | LEDs |
| A:2 | 4 | RA2/AN2 | | Unused-Available | LEDs, Contact Closure In |
| A:3 | 5 | RA3/AN3 | I | Power Supply Reference Level 1.2 V Zener | LEDs |
| A:4 | 6 | RA4/T0CKI | | Unused-Available | LEDs |
| A:5 | 7 | RA5/AN4 | O | Transceiver Vcc | |
| B:0 | 21 | RB0/INT | | Unused Available | GPS 1PPS in |
| B:1 | 22 | RB1 | O | Transceiver Mode Control - Cntl 0 | |
| B:2 | 23 | RB2 | O | Transceiver Mode Control - Cntl 1 | |
| B:3 | 24 | RB3 | | Unused-Available (Must allow ICSP) | GPS Enable |
| B:4 | 25 | RB4 | O | Transceiver Modulation - Low Bit | |
| B:5 | 26 | RB5 | O | Transceiver Modulation - High Bit | |
| B:6 | 27 | RB6 | | Unused-Available (Must allow ICSP) | WAN Enable |
| B:7 | 28 | RB7 | | Unused-Available (Must allow ICSP) | |
| C:0 | 11 | OSO | — | 32 KHz Real-Time Clock Oscillator | |
| C:1 | 12 | OSI | — | 32 KHz Real-Time Clock Oscillator | |
| C:2 | 13 | RC2/CCP1 | I | Transceiver Receive Data | |
| C:3 | 14 | RC3/SCL | | Unused-Available | I²C Serial Clock |
| C:4 | 15 | RC4/SDA | | Unused-Available | I²C Serial Data |
| C:5 | 16 | RC5 | | Unused-Available | RS232 Enable |
| C:6 | 17 | RC6/TX | | Unused-Available | UART Transmit |
| C:7 | 18 | RC7/RX | | Unused-Available | UART Receive |

The purpose of certain applications is to detect missing items and generate an exception report or alarm. Much useful information may be derived from interrogating the message routing tables of nearby nodes to establish a Minion's last known location.

The Minion transceivers are 'half-duplex' devices, meaning they cannot transmit and receive at the same time. Several methods are used to avoid collisions (two nodes transmitting at the same time and garbling the message for the recipient). First, not all collisions will result in message corruption. If the receiver is not 'in range' of both transmitters it is unlikely that the message will be corrupted. Second, the level of traffic will be kept low and interval randomization techniques will be used to reduce the likelihood of simultaneous transmissions. Third, all messages are implicitly acknowledged when they are forwarded on the next hop, and explicitly acknowledged when received at their ultimate destination. Automatic retransmission and elimination of duplicate messages are features of the protocol.

The antennas for the radios are built into the case and are intended to provide omni-directional coverage. This will never actually be the case and environmental limitations are an expected part of the operation of the network. The operating range of any transceiver will not be a fixed distance but should rather be viewed as a probability function. Thus, the likelihood of successfully exchanging messages between radios is a function of their position in space. Viewed in this way, all sources of transmission error can be incorporated into a single function. This is similar to taking the bit error rate allowed for a fixed length message and determining the probability of successful reception. Unlike the wired network, the wireless network has a spatially distributed error rate.

That being said, think of the effective range of a Minion as varying from 100 to 300 feet. Additional control of the area of coverage will be possible with the use of application-specific antenna and packaging designs.

Internal Hardware Operating Modes and Initialization Parameters

The Microchip PIC16F876 has the following integrated hardware devices.

1. Memory

Memory and special function registers share a 512 byte address space divided into four pages. Some locations are duplicated in each page. There is a total of 368 available bytes of memory for programmatic usage. Sixteen of these bytes are duplicated across all pages; we reserve these for interrupts service and language-dependent uses.

2. Processor Clock Oscillator

Options for either RC or XT clock in the 4.0 MHZ range.

The RC option provides a low-cost implementation that assumes that any precision timing requirements are met by the real-time clock. This allows the processor to spend most of its time in sleep mode without having an expensive oscillator powered off.

The XT option is intended to use a 4.0 MHZ crystal to provide a 1.0 MHZ instruction rate for general Minion operation.

3. Timer 1 Oscillator

A 32,768 Hz crystal oscillator used to provide the real-time clock reference for Timer 1.

4. Power-Up Timer

The power-up timer is normally only enabled on Minions that are expected to have low power operational requirements such as solar power. The power-up timer provides a fixed 72 mSec delay before releasing the processor reset after power is applied.

5. Oscillator Start-up Timer

The oscillator start-up timer provides a fixed delay of 1024 oscillator cycles when a crystal oscillator is used. There is no delay if the processor clock is provided from a RC oscillator. The start-up delay is invoked on power-up and when waking from sleep mode since the clock is stopped in both cases.

6. Watchdog Timer

The watchdog timer is normally not enabled.

An analysis is currently underway to explain certain operational problems in certain environments that change their characteristics when the WDT is enabled. This appears to be related to ESD but further study is required.

7. Brownout Reset

Brownout reset is not usable since the Minion is a 3.3 Volt (not 5.0 Volt) device. The brownout set point is a nominal 4.0 volts.

8. I/O Port A

Port A:0 (output) provides power to a voltage reference for measuring the power supply level. The reference is attached to Port A:3.

Port A:1 and Port A:2 are unused and available for application-specific usage.

Port A:3 (input) is from a 1.2 V Zener reference. The A/D converter measures this value when the reference is enabled by setting Port A:0.

Port A:4 is unused and available. It may be used as the Schmitt trigger input to the Timer 0 counter or as an open collector output.

Port A:5 (output) provides the radio transceiver Vcc. This allows complete power-down of the radio section without using a separate regulator for the purpose.

9. I/O Port B

Port B:0 (Schmitt trigger input) is the external interrupt input generally used only for 1 pulse-per-second inputs from GPS receivers.

Port B:1 and Port B:2 (output) are the mode control signals (Cntl 0 and Cntl 1) for the radio transceiver. Usage is as follows:

| Port B:1 Cntl 0 | Port B:2 Cntl 1 | Operating Mode |
|---|---|---|
| 0 | 0 | Power Down |
| 0 | 1 | Amplitude-Shift Keying (Transmit) |
| 1 | 0 | On-Off Keying Transmit (not used by the Minion) |
| 1 | 1 | Receive |

The actual transmitted signal level is either 'off' or 'on', but we use the Amplitude-Shift-Keying mode to allow the Minion to vary the transmitted signal level. In ASK mode, the output power is governed by the current into the TXmod pin of the transceiver. We use a resistive divider to set the actual modulation level each time a bit is sent by the Minion.

Port B:3 is unused and available for peripherals.

Port B:4 and Port B:5 (output) are the radio transmitter modulation control. These are connected to a resistive divider network to allow modulation of the transmitted power level.

Port B:6 and Port B:7 are reserved for the Microchip In-Circuit Debugger and In-Circuit Serial Programming.

10. I/O Port C

Port C:0 and Port C:1 are used by the 32768 Hz crystal oscillator for the real-time clock function.

Port C:2 (input) is the input to the Capture/Compare/PWM Module. It is connected to the radio transceiver received data.

Port C:3 and Port C:4 (I/O) are the $I^2C$ serial clock and data lines used to communicate with optional on-board memory.

Port C:5 is unused and available for peripherals.

Port C:6 and Port C:7 are the UART transmit and receive lines used to communicate with gateways or other peripherals.

11. Data EEPROM

The processor contains 256 bytes of non-volatile EEPROM data memory. This is used to store the unique device serial number, as well as program version information.

12. Flash Memory

The processor contains 8192 words (14-bits each) of program memory divided into four pages. This flash memory contains the MinionNet operating system and any application-specific drivers. It is field programmable and program updates may be received from the network and installed in a device without user intervention.

13. Timer 0 Module

Timer 0 is an 8-bit counter with edge select for the external clock source. It has an 8-bit programmable prescaler.

Timer 0 is not used. Application-specific drivers may use the Timer 0 module for counting pulses on the T0CKI pin.

Future implementations of the timing calibration algorithm for the processor clock oscillator may use the Timer 0 module in conjunction with an external time base. This could allow precision measurement of the processor clock using attached GPS, remote geoMinions or the 32 KHz clock while the receiver and interrupts remained enabled. It would probably be best if the pre-scaler could be assigned to Timer 0 during this type of operation. Care should be exercised since the pre-scaler is currently used by the Watchdog Timer for diagnostics.

14. Timer 1 Module

Timer 1 is a 16bit counter/timer with its own oscillator.

Timer 1 is used as the real-time clock with the 32,768 Hz crystal oscillator. It uses the pre-scaler in divide-by-1 mode and generates an interrupt once per second. The interrupt service is responsible for updating a software count of elapsed seconds that is the basis of the real-time clock available to applications.

Network synchronization messages establish the real-time value of the clock and adjust the value of the Timer 1 registers so as to maintain overall synchronization. The highest possible resolution is maintained as messages propagate through the network since Timer 1 counts in units of 31 micro-seconds. Every effort is taken to ensure that precision is maintained.

15. Timer 2 Module

Timer 2 is an 8-bit timer with an associated 8-bit period register and comparator. It counts instruction cycles. It can pre-scale by 1, 4 or 16 and can post-scale by 1 through 16.

Timer 2 is used to measure the interval between falling edges of received Manchester data from the radio receiver, and to provide the required interval timing for transmitting Manchester data via the radio transmitter. The prescaler is used in 1:1 mode for interval counting and the postscaler is used in 1:1 mode to generate the interrupt that terminates reception of a faulty message.

In receive mode the timer is cleared by software after the falling edge interrupt in the receive data ISR. Subsequent interrupts read the current timer value prior to clearing the counter. The interval thus meaured is used to determine the values of incoming Manchester data bits. The longest possible valid data interval is preloaded into the compare register. If this long interval expires, the module generates an interrupt which resets the receive mode, clearing any message reception that was in progress.

In transmit mode the timer is used to measure the intervals between rising and falling edges of the encoded data to be sent via the radio transmitter. The FastSend implementation for 4.0 MHZ processor (1.0 MHZ instruction rate) implementations runs with the interrupts disabled. The timer module is programmed to generate interrupts at intervals of one half-bit-time, but the interrupt flag is polled and transitions are generated based on the outgoing bit stream. This generates extremely precise edge timing with no interrupt latency jitter. The data rate is high enough that not much processing time is left over with a 4.0 MHZ clock. It is anticipated that for a 20.0 MHZ (5.0 MHZ instruction rate) implementation a fully interrupt-driven variant would be used. The only significant issue would be additional latency generated by the possibility of other interrupts, specifically the real-time clock's one-second interrupt and the serial communications port's I/O interrupts.

For Minion implementations that do not use a stable processor clock oscillator we periodically measure the relationship of instruction rate to the real-time clock and adjust the timing of our I/O accordingly. This is handled by placing updated operating parameter values in the table-driven implementation of the Manchester Encoder/Decoder. Since the main sources of processor clock error are related to temperature and supply voltage and these will normally be slowly varying quantities we implement an algorithm that randomly varies the re-calibration interval based on the anticipated operating environment of the Minion. The interval between re-calibration cycles uses a control parameter based on the same algorithm that handles message expiration. An exponent (which acts as a scale factor) is chosen based on the anticipated environment and a random mantissa value is used. When the indicated time arrives, re-calibration occurs and a new control parameter is chosen to cause the next re-calibration. Care is taken to ensure that the new time is actually in the future, since a purely random mantissa has a one in sixteen chance of matching the current time.

Re-calibration involves the following sequence of steps:
 a. stopping reception,
 b. reprogramming Timer 2 and its prescaler and comparator,
 c. waiting for a one-second Timer 1 tick,
 d. clearing Timer 2,
 e. counting Timer 2 overflows until the next Timer 1 tick,
 f. computing new values for the Manchester control parameters based on the observed clock speed,
 g. restoring Timer 2and its prescaler and comparator,
 h. starting reception.

This will result in an interval of up to 2 seconds during which transmission and reception will be inhibited. The one-second sample interval is chosen to obtain a representative measurement and to mimimize the effects of jitter in both the processor- and real-time-oscillators.

16. Capture/Compare/PWM Module (CCP)

The microcontroller has two Capture/Compare/PWM modules. The CCP2 module is not used since its input shares a pin with the 32 KHz oscillator.

The CCP1 module is used to detect the falling edge of the received serial data from the radio receiver. The falling edge generates an interrupt which is timed by the ISR using Timer 2. The captured value from Timer 1 is not used in the current implementation since Timer 1 is the free-running Real Time Clock (32,768 Hz divided by 8).

It should be possible to implement a delta-time function in the current ISR that would use the more-precise edge-latched time values but the source for Timer I would have to be the processor clock. This would mean losing the 32 KHz real-time clock.

The way it works now is that the falling edge triggers an interrupt, the ISR reads and clears Timer 2, evaluates the interval for the Manchester Decoder. If timer 2 reaches the value in the period register (PR2) it causes an interrupt which is used to restart message reception.

In the current implementation the receiver runs with all of the interrupt sources enabled. This means that there is an inherent jitter in the received time values based on the ISR service time for any combination of other interrupts. In reality the major source of error will probably be the real-time clock's one second interrupts which may increase the probability of corrupting an incoming message that spans a one-second boundary. The simplest solution would be to disable all other interrupts after the preamble of a message is received and to re-enable them after message completion or when the receiver detects an error. This would add a worst-case latency of one message time (~30 mSec) to these interrupts which corresponds to the delay that is already imposed due to the FastSend transmission methodology which disables interrupts completely during transmission.

17. Master Synchronous Serial Port (MSSP)

The Synchronous Serial Port is used in $I^2C$ mode to interface to optional on-board serial EEPROM memory. Current boards allow up to four memory devices, although the addressing scheme would support eight. Each memory device may be a Microchip 24AA256 with 32 K bytes of capacity, giving a maximum external memory address space of 256 K bytes.

18. Universal Synchronous Asynchronous Receiver Transmitter (USART)

The USART is used in gateway implementations, for communication with a host PC, MOBITEX modem or GPS receiver.

19. Analog-to-Digital Converter (A/D)

The A/D converter is used to measure the level of the primary power source, although other channels are available for application-specific usage.

20. Interrupt Sources

The micro-controller implements 13 discrete interrupt sources which are summarized here.

| Source | Description | Usage | Clear By |
|---|---|---|---|
| T0IF + T0IE | Timer 0 | Unused | ISR |
| INTF + INTE | External Interrupt | GPS 1 Pulse per Second-Rising | ISR |
| RBIF + RBIE | Port B:7 . . . 4 Bit Change | Unused | ISR |
| PSPIF + PSPIE | Parallel Slave Port R/W | Not Implemented - Must be disabled | ISR |
| ADIF + ADIE + PEIE | Analog-to-Digital Converter | Unused | ISR |
| RCIF + RCIE + PEIE | USART Receive | Receive Buffer Handler | Auto |
| TXIF + TXIE + PEIE | USART Transmit | Transmit Buffer Handler | Auto |
| SSPIF + SSPIE + PEIE | Synchronous Serial Port | Unused | ISR |
| CCP1IF + CCP1IE + PEIE | Capture/Compare/PWM 1 | Radio Receive Manchester Handler | ISR |
| TMR1IF + TMR2IE + PEIE | Timer 2 | 32 KHz Real-Time Clock | ISR |
| TMR1IF + TMR1IE + PEIE | Timer 1 | Manchester Receive Timeout | ISR |
| EEIF + EEIE + PEIE | EEPROM Write | Unused | ISR |
| BCLIF + BCLIE + PEIE | Bus Collision in I$^2$C Master Mode | Unused | ? <br> I dunno |
| CCP2IF + CCP2IE + PEIE | Capture/Compare/PWM 2 | Unused | ISR |

Each interrupt has its own flag bit and enable bit. All peripheral interrupts also require the global peripheral enable (PEIE bit) to be set before any actual interrupt will occur. The interrupt sources may be used in a polled manner by simply ensuring that the corresponding enable bit remains clear. Most interrupts require that the flag bit be explicitly cleared in the service routine as indicated in the table.

21. In-Circuit Programming and Debugger

In order to allow application developers to use the Microchip In-Circuit Debugging tool designed for the 16F876 we reserve 5 memory locations at 0x01EB through 0x01EF, and the location 0x0070 which appears in all four banks. In addition, the pins associated with RB6, RB7 and RB3 and the MCLR pin are able to be connected to the debugger hardware without interference. When the debugger is loaded into the PIC it occupies the highest 0x0100 words of the 8K flash address space.

Initial programming of a µMinion takes place using a workstation running the Microchip MPLab software, an ICD module and a 28-pin clip attached to the processor chip. Power is applied through the ICD, not through the µMinion.

Transceiver Hardware

The hybrid transceiver module uses SAW technology to provide direct-conversion receive and transmit functions using shared filters. The transmit power level is a function of the current into the TXmod pin of the device. The µMinion circuitry provides a resistive divider to allow selection of the transmit power level. Certification requirements for the ISM band require that output power be less than 1 mW.

Firmware Features

This section describes briefly the major aspects of the Minion operating system kernel. These features are present in all Minions and provide the base-level networking functionality and the ability to add application-specific support.

1. Message Transmission

Message transmission begins by calling MakeMessage with the message type code. This creates a blank message with some header fields filled in. The destination field and payload are then filled in as needed by the application. Changes may also be made to the Hop and expiration fields.

The transmit power level that will be used is set prior to beginning the message transmission.

A call to SendMessage waits for current receive operations to complete, imposes a short random delay to help prevent message collisions, computes the correct message RC-16 and then a makes call to FastSend. FastSend is a brute-force Manchester encoder that runs with the interrupts disabled to ensure high-quality edge timing in the transmitted message. Edge jitter will be less than 3 instruction cycles (normally 3 microseconds).

Following transmission, the message reception is automatically reenabled.

2. Message Reception

Message reception consists of an interrupt-driven edge detector attached to the receive-data line from the radio transceiver. The edge detector establishes the interval between falling edges. These intervals drive a state-machine that translates into the series of data bits that are placed into the receive buffer. When a complete buffer has been received without blatant timing errors the CRC-16 is computed and checked for correctness. If the message is correct a flag is set indicating that a valid message has arrived and further reception is disabled by setting the state machine to an idle state.

Received messages are processed as part of the operation of the main program, i.e. not at the interrupt level. Upon completing the processing of a received message, the main program will set the receiver state machine to reenable reception.

Handling of a received message may consist of adding it to a list of messages to be forwarded—the transmit message queue. This is generally the case when the message 'You' field is our ID but the message 'Destination' field is not ours.

3. Message Acknowledgment

When we speak of messages and message acknowledgment in this section we are discussing a single hop from one Minion to the next and the acknowledgment that occurs. This is not an 'end-to-end' confirmation of delivery.

Messages from 'F' to 'G' are acknowledged in one of two ways: implicit or explicit. Explicit acknowledgment occurs when an acknowledgment message is generated and sent specifically back from 'G' to 'F'. Implicit acknowledgment occurs when the message is forwarded on to its next hop and the previous sender is able to hear the message being forwarded: 'F' deduces that 'G' received the message successfully when 'F' hears 'G' send the message on to 'H'.

If the received message is intended specifically for us (our ID is 'Destination') we generate an explicit acknowledgment. This covers the case where we are the 'end-of-the-line', so to speak.

An explicit acknowledgment is also sent if a Minion 'G' has received a message from 'F', forwarded it to 'H', received satisfactory acknowledgment, and then hears 'F' sending the same message again. 'The same' means, at a minimum, a matching 'Source' and Serial Number; it is not necessary for a Minion to retain the entire message although this will probably be the most common case. Minions with large amounts of memory may retain the entire message and allow for the case where the message Serial Number has wrapped around (256 messages from the same 'Source'). Full comparison would prevent the accidental suppression of non-duplicate messages.

Upon receipt of an acknowledgment message the minion removes the message from its queue of pending transmit messages. A portion of the message (or the whole thing) may be retained in a list of 'sent messages' (memory permitting) to allow the detection of duplicate transmissions and their elimination.

An explicit acknowledgment from 'G' has 'F' in the 'You' field. The Hop limit will be adjusted to prevent accidental propagation in case 'F' had lost the record of having sent the message originally.

4. Message Retransmission

Each Minion maintains a queue of messages to be transmitted. These include ones originated by the Minion itself and ones received for forwarding. The Minion firmware idle process will scan the queue, transmitting each message in turn. In general, messages will remain in the transmit queue until they are acknowledged or until they expire.

When a message expires a supervisory message is queued to be sent to the message's Sender to notify of the loss of connectivity and to update the intermediate routing tables.

5. Routing Tables and Message Forwarding

Consider a message forwarded by 'F' to 'G' to 'H' for destination 'X'.

As part of the process of preparing a message for transmission Minion 'G' will look up the 'X' in the routing table. If 'X' is found, the correct next hop 'H' is filled in as 'You', the hop count is adjusted and the message is transmitted.

A check is also made to ensure that the number of hops allowed by the message will allow routing via the entry we found in the table.

If the Destination 'X' is not found in the table, the message is replaced in the transmit queue by a supervisory message directed at 'F' indicating that 'I no longer have a path to the destination'. Note that this eliminates the possibility of acknowledgment of the message, so when 'F' gets around to re-transmitting the message he will have the opportunity to discover and use an alternate route to the Destination.

The situation may occur where a Minion 'F' receives a supervisory message (as above), has no alternate path, and has a pending data message (awaiting acknowledgment) for the (now unreachable) destination. 'F' will modify and send the supervisory message all the way to the 'Sender' of the pending data message. This notifies the sender and all intermediate Minions that there has been a path disruption. 'F' then discards the (undeliverable) pending data message.

The Sender may use this notification as a hint that messages have been dropped and so re-transmit recent messages or perform other (session-level) tasks as necessary to confirm or re-establish the link.

Routing Table Format (bytes)

| 0 | 1 | 2 | 3 | 4 | 5 | 6 | 7 | 8 | 9 |
|---|---|---|---|---|---|---|---|---|---|
| Destination ID | | | | Via ID | | | | Hop Count | LRU Count |

The total amount of memory (number of entries) allocated to the Routing Table is dependent on the available memory in the Minion and its intended application. Short routing tables can be allocated in processor RAM, but longer tables are stored in non-volatile EEPROM either on the processor chip or in external memory.

The Hop Count field stores the expected number of hops required to reach 'Destination ID' when sending via 'Via ID'.

The LRU Count is used to conceptually order entries in the table so that the oldest will be overwritten by new entries.

6. Real-Time Clock

As a goal, the MinionNet network maintains unified network time with an accuracy in the 1 milli-second range. This time standard is fundamentally derived from GPS time. We implement a monotonically increasing count of GPS seconds and coordinate the time base with GPS receivers attached to geoMinions which achieve an accuracy on the order of several micro-seconds.

geoMinion synchronization messages are broadcast using precision edge timing that is correlated to the time reference contained in the message. This allows the receiving Minion to adjust its timer to synchronize with the rest of the network.

The kernel clock functions maintain a figure-of-merit associated with the real-time clock. This is essentially a tolerance value that is used to determine the degree of faith that should be placed on the time value. Upon power-up, or after periods running autonomously without network contact the figure-of-merit will be low. geoMinions receiving good satellite data will have high figures-of-merit. Any Minions receiving synchronization messages from multiple geoMinions, with tight correlation between the messages, will have the highest figure-of-merit Minions use their internally-maintained figure-of-merit as a sanity check for network synchronization messages. If a message claims a higher figure-of-merit than the Minion's own, and the time value in the message is within the tolerance band of the Minion, the Minion will reset its clock to the new value and boost its figure-of-merit. If a message claims a lower figure-of-merit than the Minion's own the message will be ignored.

If a message claims a time that is out of tolerance with the Minion's internal clock, the Minion will cease originating or forwarding synchronization messages. As time passes the Minions internal figure-of-merit will degrade. Once synchronization messages from at least two sources show an acceptable correlation the Minion will accept the new time and resume participation in the network synchronization process.

7. Interrupt Service

The Minion Firmware kernel provides interrupt services for the following devices: RF Receiver, Real-Time Clock, USART transmit and receive, and the external interrupt pin. All of these are normally handled internally, with data being moved into and out of queues. The application program normally never needs access to the actual interrupt service routing.

8. Application-Specific Programming Interface

Application programs should be structured in the form of state machines which are run as a cooperative part of the MinionNet operating system. Each state should perform a specific, well-defined task and then return to the operating system. The sequence of states can be controlled by data from the network, the passage of time or information derived from application-specific sensors.

9. Application-Specific Hardware Drivers

Specific hardware Application Programming Interfaces (APIs) are provided as part of the code protection design of the Minion firmware. In general, the programmer writing code for a particular application will not be allowed to access hardware ports directly—he must use API calls provided by AFX.

10. Field Programmability

The Minion Firmware supports a mechanism that allows data to be stored anywhere in the program or data memory. This is used to load application-specific firmware during the manufacturing process. In addition, a download mode can be initiated in the field that allows an individual Minion to receive a complete firmware upgrade from another Minion. This is usually provided as a gateway service, since gateways typically have more memory and can store complete code updates for a variety of application-specific devices.

MinionNet Message Format

MinionNet messages consist of 32 data bytes followed by a 2 byte CRC-16 for error detection. The 32 byte message is divided into a 20 byte header and 12 byte payload. The header is used to provide network routing and message handling information while the payload contains any application-specific data fields.

Current MinionNet Message Type Codes

| Type | Usage |
| --- | --- |
| 00 | Application-specific data messages |
| 01–FC | |
| FD | Unsolicited Data. Network Broadcast messages. |
| FE | Response to a type FF Network Command |
| FF | Network-related Command |

Four fields (You, Me, Source and Destination) are 32-bit Minion ID fields. In general they represent the unique identifier assigned to each Minion during manufacture. Certain IDs taken from this pool of 4,294,836,225 are reserved for certain routing functions and identifying application-specific 'databases'.

Reserved Minion IDs

| Minion ID | | Application |
| --- | --- | --- |
| 0000–0000 | | 'Bit Bucket' - Null Destination. Used for informational broadcast messages. |
| 0000–0001 | 0000–0007 | Any Messenger. Used to direct a message to any store-and-forward Minion |
| 0000–0008 | 0000–000F | Any Messenger. As above, but the Messenger acknowledges receipt explicitly. |
| 0000–0010 | 0000–FFFF | Application Database IDs |
| 0001–0000 | FDFF–FFFF | Production Minion ms |
| FE00–0000 | FE00–FFFF | Reserved for Demo and Test applications |
| FE01–0000 | FFFF–FEFF | Gateway IDs |
| FFFF–FF00 | FFFF—FFFF | AFX Control Functions |

MinionNet Message Format

| 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 | 2 | 2 |
| --- | --- | --- | --- | --- | --- | --- | --- | --- | --- | --- | --- | --- | --- | --- | --- | --- | --- | --- | --- | --- | --- | --- | --- | --- | --- | --- | --- | --- | --- | --- | --- | --- | --- |
| 0 | 1 | 2 | 3 | 4 | 5 | 6 | 7 | 8 | 9 | A | B | C | D | E | F | 0 | 1 | 2 | 3 | 4 | 5 | 6 | 7 | 8 | 9 | A | B | C | D | E | F | 0 | 1 |
| T | You | | | | Me | | | | N | Source | | | | Destination | | | | H | X | | | | | | | | | | | | | | |
| Header | | | | | | | | | | | | | | | | | | | | Payload | | | | | | | | | | | | CRC | |

The header bytes are allocated as follows:

MinionNet Message Header

| 0 | 0 | 0 | 0 | 0 | 0 | 0 | 0 | 0 | 0 | 0 | 0 | 0 | 0 | 0 | 0 | 1 | 1 | 1 | 1 |
| --- | --- | --- | --- | --- | --- | --- | --- | --- | --- | --- | --- | --- | --- | --- | --- | --- | --- | --- | --- |
| 0 | 1 | 2 | 3 | 4 | 5 | 6 | 7 | 8 | 9 | A | B | C | D | E | F | 0 | 1 | 2 | 3 |
| Type | You | | | | Me | | | | N | Source | | | | Destination | | | | H | X |

Type is an 8-bit value used to identify different message formats for handling by the MinionNet network itself. Unique types are used for virtual geolocation, routing table updates, precision time synchronization, self-announcement broadcast messages and application-specific data. The coding of these types is to be determined. Selected Type codes are in developmental use as defined in the table below.

'You' is the specific Minion intended to receive this particular transmission. It may also be 0 to indicate a broadcast message intended for any recipient.

'Me' is the ID of the Minion making this specific transmission.

'Source' is the ID of the originator of the message. The message may be carried by multiple intermediaries before reaching its ultimate destination.

'Destination' is the ID of the intended ultimate recipient of the message.

'N' is the 8-bit serial number of the message as counted by the Source minion. It consecutively numbers messages from 0 to 255 then starts over.

'H' is the 8-bit Hop-Max/Hop-To-Go field.

Any Minion that participates in message forwarding implements the hop count algorithm.

Any Minion that originates messages that require forwarding establishes a valid Hop-Max value based on the expected routing of the message.

Hop-Max/Hop-To-Go

| 7 | 6 | 5 | 4 | 3 | 2 | 1 | 0 |
|---|---|---|---|---|---|---|---|
| Hop-Max | | | | Hop-To-Go | | | |

The 'Hop-Max' field is the number of hops that the message will be allowed to make before reaching its destination. It is set by the Source Minion and remains unchanged as the message proceeds from one intermediary Minion to the next. The Source Minion uses its current routing table information to determine the expected length of the path to the Destination Minion.

The 'Hop-To-Go' field is the number of hops remaining for this message. Each intermediary Minion decrements the Hop-To-Go field before forwarding the message.

The mechanism that selects the routing for the next hop will determine if the expected path to the Destination is still short enough to be reached with the remaining hops. If the path is too long the message will be discarded and a new supervisory message will be created and sent to the Source Minion. The supervisory message indicates routing failure and helps in establishing new routing for future messages.

In a static environment all Minions update their routing tables based on the header information contained in all messages that are received. Snooping on messages, especially those that are not directed toward the snooping Minion, is the primary method that Minions use to keep their routing tables updated. Information concerning the path length to each of the four Minion IDs contained in the message header can be derived. The Hop-To-Go value plus one is the number of hops that a snooper would expect to be able to use to reach the Destination Minion. The difference between Hop-Max and Hop-To-Go, plus one, is the number of hops that a snooper would expect to be able to use to reach the Source Minion. The 'Me' Minion could be reached in one hop. The 'You' Minion could be reached in two hops.

'X' is the 8-bit Expiration field. Messages may move from one Minion to another as they propagate toward their Destination. These individual 'hops' may be delayed by factors such as network traffic, broken communication links and the use of 'messengers' that physically move and establish new dynamic routes. The originator of each message ('Source' Minion) is aware of the period of time over which a particular message will me meaningful. This information is stored in the message header in the form of an expiration time for the message.

Any Minion that participates in message forwarding implements the message expiration algorithm.

Any Minion that originates messages that require forwarding establishes a valid Expiration Field value based on the longevity of the data in the message.

Expiration Field

| 7 | 6 | 5 | 4 | 3 | 2 | 1 | 0 |
|---|---|---|---|---|---|---|---|
| Exponent | | | | Mantissa | | | |

The expiration of a message occurs when the current time maintained by the Minion matches the value indicated by the Expiration Field. The use of an Exponent/Mantissa format allows the dynamic range of expiration times to range from a few seconds to several weeks.

| | Bit | Resolution | | | Range-Up To | | |
|---|---|---|---|---|---|---|---|
| Exponent | Range | Seconds | Hours | Days | Seconds | Hours | Days |
| 0 | 5  2  | 4 | 0.001 | 0.000 | 60 | 0.017 | 0.001 |
| 1 | 6  3  | 8 | 0.002 | 0.000 | 120 | 0.033 | 0.001 |
| 2 | 7  4  | 16 | 0.004 | 0.000 | 240 | 0.067 | 0.003 |
| 3 | 8  5  | 32 | 0.009 | 0.000 | 480 | 0.133 | 0.006 |
| 4 | 9  6  | 64 | 0.018 | 0.001 | 960 | 0.267 | 0.011 |
| 5 | 10  7  | 128 | 0.036 | 0.001 | 1,920 | 0.533 | 0.022 |
| 6 | 11  8  | 256 | 0.071 | 0.003 | 3,840 | 1.067 | 0.044 |
| 7 | 12  9  | 512 | 0.142 | 0.006 | 7,680 | 2.133 | 0.089 |
| 8 | 13  10 | 1,024 | 0.284 | 0.012 | 15,360 | 4.267 | 0.178 |
| 9 | 14  11 | 2,048 | 0.569 | 0.024 | 30,720 | 8.533 | 0.356 |
| 10 | 15  12 | 4,096 | 1.138 | 0.047 | 61,440 | 17.067 | 0.711 |
| 11 | 16  13 | 8,192 | 2.276 | 0.095 | 122,880 | 34.133 | 1.422 |
| 12 | 17  14 | 16,384 | 4.551 | 0.190 | 245,760 | 68.267 | 2.844 |
| 13 | 18  15 | 32,768 | 9.102 | 0.379 | 491,520 | 136.533 | 5.689 |
| 14 | 19  16 | 65,536 | 18.204 | 0.759 | 983,040 | 273.067 | 11.378 |
| 15 | 20  17 | 131,072 | 36.409 | 1.517 | 1,966,080 | 546.133 | 22.756 |

All Minions maintain a synchronized 32-bit seconds counter for network message handling functions. The bit fields described here are based on a counter where bit 0 increments every second. The message expiration algorithm assumes time synchronization among all participating Minions.

Time in Seconds-32-bit Value

| 68 | 34 | 17 | 8.5 | 4.3 | 2.1 | 1.1 | 6.4 | 3.2 | 1.6 | 3.5 | 1.7 | 6.1 | 3 | 1.5 | 18 | 9.1 | 4.6 | 2.3 | 1.1 | 34 | 17 | 8.5 | 4.3 | 2.1 | 1 | 32 | 16 | 8 | 4 | 2 | 1 |
|---|---|---|---|---|---|---|---|---|---|---|---|---|---|---|---|---|---|---|---|---|---|---|---|---|---|---|---|---|---|---|---|
| years | | | | | | | months | | | weeks | | days | | | hours | | | | | minutes | | | | | | seconds | | | | | |
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| | | | | | | | | | | | | exponent = 15 | | | | | | | | | | | | | | exponent = 0 | | | | | |
| | | | | | | | | | | | | Dynamic range of expiration times | | | | | | | | | | | | | | | | | | | |

The Source Minion begins with an expected lifetime value for the message. The exponent is chosen such that it is the smallest with a range that covers the expected lifetime. The Minion then computes an expected timeout time for a message by adding the expected lifetime to the current time value. The chosen mantissa is the four-bit field within the timeout time value selected by the exponent. Using this methodology we achieve a timeout resolution on the order of +/−3% over the range indicated by the exponent.

It is possible for a Minion to have lost time synchronization with the network. For certain applications it is possible for such a Minion to use the statistical properties of the timeout algorithm to advantage. Specifically, an AVERAGE message timeout may be chosen by simply setting the exponent value and leaving the mantissa zero. This does not require a time value at all in the Source Minion, but will result in messages timing out randomly during the range implied by the exponent All Minions capable of acting as Messengers must implement the expiration algorithm. They are expected to maintain a clock synchronized to network time. The operating system idle process periodically examines each message in the store-and-forward queue. If the bits in the current time match the bits specified in the message's expiration field the message is discarded.

Application-Specific MinionNet Message Payload Formats

Each application may have payload formats that are specific to the needs of that application. In general, the network will neither know nor care about the contents of the message payload. In particular, the message payload may be encrypted with an end-to-end encryption algorithm that makes it impossible for any intermediary or outside observer to determine the message contents. The recipient of a MinionNet message is able to use the information in the Type, Source and Destination fields to uniquely identify the message format and can then decode the meanings of the individual bits in the Payload area. In addition, the Source Sequence Number (N) can be used to reassemble a lengthy data block from multiple MinionNet messages.

The wide variety of messages are too complex to be described here in detail, but the general flavor of coding can be demonstrated with a few examples.

MinionNet Message Format-Farmers Branch Fixed Beacon

| 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | A | B | C | D | E | F | 0 | 1 | 2 | 3 | 4 | 5 | 6 | 7 | 8 | 9 | A | B | C | D | E | F |
| T | You | | | | Me | | | | N | Source | | | | Destination | | H | X | S | qMsgClock | | | | Batt | | | | R | L | M | | |
| Header | | | | | | | | | | | | | | | | Payload | | | | | | | | | | | | | | | |
| 00 | FE00-0xxx | | | | FE00-0xxx | | | | N | FE00-0xxx | | | | 0000-0000 | | 11 | 00 | 00 | qMsgClock | | | | Batt | | | | R | L | M | 00 | 00 |

This beacon announcement message is sent at a fixed rate for system evaluation purposes. A typical rate is once per second, but other rates may be used to cover different circumstances. The transmission uses ProtocolDelay to prevent normal transmission collisions.

For the current diagnostic purposes the 'You', 'Me', and 'Source' fields are the ID of the particular Minion. This prevents any message routing and allows handling and performance evaluation using Minions explicitly programmed for this application. This eliminates the possibility of interference with other applications being developed at the same time in the lab.

Payload Field 'S' is a message subtype code for this particular application.

Payload Field 'qMsgClock' is the number of seconds since the Minion was reset.

Payload Field 'Batt' is the result of the power supply A/D converter measurement.

Payload Field 'R' is the count of resets since power on. These can be caused by the Watchdog Timer.

Payload Field 'L' is the diagnostic location prior to the last reset.

Payload Field 'M' is the value of iReceiveMode (the message reception mode value) prior to the last reset.

MinionNet Message Format-uDataNet Electric Meter (Announcement)

| 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | A | B | C | D | E | F | 0 | 1 | 2 | 3 | 4 | 5 | 6 | 7 | 8 | 9 | A | B | C | D | E | F |
| T | You ||||| Me |||| N | Source |||| Destination |||| H | X | S | qMsgClock |||| qMeter ||||
| Header ||||||||||||||||| Payload |||||||||||||||
| FD | 0000-0000 ||||| FE00-0xxx |||| N | 0000-0000 |||| 0000-0000 |||| 11 | 00 | AA | qMsgClock |||| 00 | 00 | 00 | qMeter |

This message is sent periodically to act as a self-announcement message as well as to convey data to diagnostic gateways.

For the current diagnostic purposes the 'You', 'Source', and 'Destination' fields are null. This prevents any message routing and allows handling and performance evaluation using Minions explicitly programmed for this application. This eliminates the possibility of interference with other applications being developed at the same time in the lab.

The interval of this message is 30 seconds with a +/−7 second intentional random variation.

Payload Field 'qMsgClock' is the number of seconds since the Minion was reset.

Payload Field 'qMeter' is the raw count value for the meter reading.

This message is sent as a command message from a reading device to a specific Minion given by TargetID. It is used to command disconnect and reclosure Minions.

Payload Field 'S' is the desired state: 00 for off, 01 for on.

The target Minion will send a response (not documented here) upon receipt of the Poll Command message. The command response includes the current status of the switch.

MinionNet Message Format-uDataNet Electric Meter (Poll Enquiry)

| 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | A | B | C | D | E | F | 0 | 1 | 2 | 3 | 4 | 5 | 6 | 7 | 8 | 9 | A | B | C | D | E | F |
| T | You ||||| Me |||| N | Source |||| Destination |||| H | X |||||||||||
| Header ||||||||||||||||| Payload |||||||||||||||
| FF | TargetID ||||| 1111-1111 |||| 22 | 3333-3333 |||| 4444-4444 |||| 55 | 66 | 00 | 00 | 00 | 00 | 00 | 00 | 00 | 00 | 00 | 00 | 00 | 00 |

This message is sent as an interrogation message from a reading device to a specific Minion given by TargetID.
The target Minion will send a Poll Response (below) upon receipt of the Poll Enquiry message.

MinionNet Message Format-uDataNet Electric Meter (Poll Command)

| 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | A | B | C | D | E | F | 0 | 1 | 2 | 3 | 4 | 5 | 6 | 7 | 8 | 9 | A | B | C | D | E | F |
| T | You ||||| Me |||| N | Source |||| Destination |||| H | X |||||||||||
| Header ||||||||||||||||| Payload |||||||||||||||
| FC | TargetID ||||| 1111-1111 |||| 22 | 3333-3333 |||| 4444-4444 |||| 55 | 66 | S | 00 | 00 | 00 | 00 | 00 | 00 | 00 | 00 | 00 | 00 | 00 |

MinionNet Message Format-uDataNet Electric Meter (Poll Response)

| 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | A | B | C | D | E | F | 0 | 1 | 2 | 3 | 4 | 5 | 6 | 7 | 8 | 9 | A | B | C | D | E | F |
| T | You ||| Me ||| N | Source |||| Destination ||| H | X | S | qMsgClock ||||| | | | qMeter ||||
| Header |||||||||||||||| Payload ||||||||||||||||
| FD | Interrogator ||| FE00-0xxx ||| N | 0000-0000 |||| Interrogator ||| 11 | 00 | AB | qMsgClock ||||| 00 | 00 | 00 | qMeter ||||

This message is sent in response to an interrogation message from a reading device.

The 'You' and 'Destination' fields are filled in with the MinionID of the Minion that interrogated the unit. Thus, the response is sent back directly to the interrogating Minion.

Payload Field 'qMsgClock' is the number of seconds since the Minion was reset.

Payload Field 'qMeter' is the raw count value for the meter reading.

Payload Field 'S' is a message subtype code for this particular application.

Programming Conventions

Programming of the μMinion is done exclusively in an enhanced, high-level version of Microchip Assembler. The enhancements provide a carefully controlled, structured environment for developing an very large project in an otherwise intractable language. The Enhanced assembler provides the following high-level features:

1. GoTo-less structured code without labels, using IF THEN ELSE, CASE and REPEAT WHILE UNTIL loops.
2. Named BIT, BYTE, WORD and QUAD size variables
3. Limited compile-time expression evaluation
4. Automatic optimized Page and Bank selection for calls and memory references.
5. Multiple listing and program display options.
6. Conditional assembly for multiple program options.
7. Historical logging of program version changes.
8. Direct output of .hex files for device programming without linking.
9. Program and memory usage maps.
10. Automatic protection of port bits in read-modify-write instructions.
11. Instruction usage statistics.
12. Static Call maps for stack usage verification.

The software is expected to be implemented as a state machine which cooperates with the operating system to allow handling of MinionNet network traffic in parallel with the application-specific activities of the μMinion. The state machine implementation has the added advantage of minimizing the stack requirements for hardware that is severely limited in that respect.

Driver APIs

When creating an application-specific MinionNet program it is necessary to provide two assembly language components. These are an Initialize routine and a Loop routine. The Initialize routine sets up memory and hardware as required by the application. It is called any time the Minion is reset. The Loop routine is called repeatedly during normal Minion operation. It is expected that the application will be implemented as a state machine with each entry to the Loop processing a single state or transition. It is not necessary or allowed for the user application to retain control for long periods of time as network message processing is interspersed with calls to Loop. Due to interrupts and network-related processing there are no guarantees concerning the timing of Application-Specific operations.

The application-specific routines are written using the AFX Enhanced Assembler and have approximately one page of program memory available for application code. Most functions are expected to be implemented by a series of calls to AFX-supplied functions. In particular, access to I/O ports must be done through approved interfaces to avoid interference with the Minion functions.

For power starved applications the operating system can be configured to enter sleep mode at periodic intervals and to re-awaken on a timer or external interrupt basis. To implement the lowest possible sleep mode power consumption the application-specific peripherals must be able to be shut down and restarted. If sleep mode is to be used by a particular μMinion, the application must provide two additional procedures (Nap and Wake) which will be called before and after the operating system invokes sleep mode.

What is claimed is:

1. A system comprising a plurality of at least three nodes wherein each node hands off a message received from another node to a subsequent node, including an intermediate node for handing off the message from one node of the system to another node of the system, an originating node for providing data to one of the intermediate nodes, and a destination node for receiving the message from one of the intermediate nodes; each of the nodes comprising:

a transceiver employing on/off keying of a reference frequency continuous waveform, said transceiver receiving a keyed message on the reference frequency from another node and transmitting the received message on the reference frequency to a subsequent node; and a controller controlling operation of the transceiver to receive the message transmitted by another node and to transmit the received message to a subsequent node.

2. The system of claim 1 wherein each of the transceivers receiving the message transmits on the reference frequency an acknowledgment that the message has been received and wherein the transceiver transmitting the message receives on the reference frequency the acknowledgment.

3. The system of claim 2 wherein the acknowledgment is an explicit acknowledgment such that each of the transceivers receiving the message transmits on the reference frequency an explicit acknowledgment signal to the transmitter transmitting the message.

4. The system of claim 3 wherein the transceiver receiving the message transmits the explicit acknowledgment signal after receiving the message at least twice.

5. The system of claim 2 wherein the acknowledgment is an implicit acknowledgment such that each of the transceivers receiving the message retransmits on the reference frequency the message to another transceiver which re-transmitted message is received by the transceiver originally transmitting the message.

6. The system of claim 2 wherein each node comprises one or more of the following:
an originating node for originating the message,
an intermediate node for handing off the message from a another node from which the message is received to a subsequent node other than the node from which the message was received, or
a destination node for receiving the message.

7. The system of claim 1 wherein the message comprises:
data bits corresponding to data;
originating bits identifying the first node from which the message originates;
destination bits identifying the last node to which the message is destined;
transmitting bits identifying the current node transmitting the message; and
receiving bits identifying the next node intended to receive the message currently being transmitted.

8. The system of claim 1 wherein at least one of the nodes further comprises a GPS receiver interfacing with the controller to provide position and/or time information corresponding to the global position of the GPS receiver.

9. The system of claim 1 wherein the system is for use in combination with a wide area network (WAN) and wherein at least one of the nodes further comprises a WAN interface connected to the controller to provide messages from the controller to the WAN and for providing messages from the WAN to the controller.

10. The system of claim 1 wherein each controller includes a memory storing control software for controlling the controller and wherein the control software is modified via a signal provided to the transceiver.

11. The system of claim 1 wherein the transceiver has an adjustable power output which varies as a function of the number of nodes responding thereto thereby reducing interference between adjacent transceivers and thereby increasing the effective bandwidth of the system.

12. A system comprising a plurality of nodes, each node comprising a transceiver and a corresponding controller for controlling the operation of the transceiver, wherein each controller operates its corresponding transceiver as one or more of the following types of nodes:
an originating type of node for providing a message in which the transceiver employs on/off keying of a reference frequency continuous waveform to transmit a keyed message to another node of the system;
an intermediate type of node for handing off a message in which the transceiver employs on/off keying of a reference frequency continuous waveform to receive the message transmitted by another node and to transmit the received message to a subsequent node other than the node from which the message was received; and
a destination type of node for receiving the message in which the transceiver employs on/off keying of a reference frequency continuous waveform to receive the message transmitted by another node.

13. The system of claim 12 wherein in the originating type of node the controller controls the transceiver to receive on the reference frequency an implicit and/or explicit acknowledgment that the message has been received by another node, wherein in the intermediate type of node the controller controls the transceiver to transmit on the reference frequency an implicit and/or explicit acknowledgment that the message has been received from another node, wherein in the intermediate type of node the controller controls the transceiver to receive on the reference frequency an implicit and/or explicit acknowledgment that the message has been received by another node, wherein in the destination type of node the controller controls the transceiver to transmit on the reference frequency an implicit and/or explicit acknowledgment that the message has been received from another node.

14. The system of claim 12 wherein at least one of the nodes is connected to a network server, wherein data transmitted by the nodes is stored by a database server in a database and wherein an application server permits one or more user systems to access the information stored in the database.

15. The system of claim 12 wherein at least a particular one of the nodes is programmed to expect a message from another of the nodes within a set period of time and wherein the particular node sends an exception message if the expected message is not received within the set period of time.

16. The system of claim 12 wherein there are a plurality of intermediate nodes, each programmed to store messages received from other nodes so that if a certain node of the plurality of intermediate nodes is disabled and unable to provide messages, others of the plurality can provide the last received messages from the certain node that is disabled.

17. The system of claim 12 wherein the message comprises data bits corresponding to data and wherein the trailing edge of each data bit provides a reference for detection of the data bits.

18. The system of claim 17 wherein the message comprises bits having a Manchester coding scheme and wherein the trailing edges provide time synchronization with sub-bit time resolution.

19. The system of claim 17 wherein the trailing edge provides a reference for transmitting and/or timing of incoming or outgoing messages.

20. The system of claim 17 wherein each node records an interval of time between each trailing edge as a time reference, wherein each node has a clock providing a clock signal which is compared to the time reference and wherein each node resets the clock when the compared clock signal does not correspond to the time reference.

21. The system of claim 12 wherein at least one of the nodes stores an audible announcement and wherein the node activates the announcement in response to receiving a particular predefined message.

22. The system of claim 12 wherein multiple packets of messages are transferred, each packet having a unique identification and wherein only unreceived packets are re-transmitted.

23. The system of claim 12 wherein nodes transmit messages after a time delay when other nodes are transmitting.

24. The system of claim 12 wherein each originating node originates a message pertaining to a particular application and stores and forwards messages pertaining to the particular application and other applications.

25. The system of claim 12 wherein each intermediate node stores and forwards messages pertaining to a plurality of applications.

26. A system operating on a reference frequency comprising a plurality of nodes, each node comprising a transceiver and a corresponding controller for controlling the operation of the transceiver, wherein each controller operates its corresponding transceiver as one or more of the following types of nodes:

an originating type of node for providing a message in which the transceiver transmits on the reference frequency a message to another node of the system;

an intermediate type of node for handing off a message in which the transceiver receives on the reference frequency the message transmitted by another node and transmits on the reference frequency the received message to a subsequent node other than the node from which the message was received; and a destination type of node for receiving the message in which the transceiver receives on the reference frequency the message transmitted by another node; and wherein each transceiver has an adjustable power output which varies as a function of the number of nodes responding thereto thereby reducing interference between adjacent transceivers and thereby increasing the effective bandwidth of the system.

27. A message having a protocol which permits the message to be successively transmitted by a wireless network of transceiver nodes employing node-to-node messaging using on/off keying of a reference frequency continuous waveform wherein a keyed message including data is sent from a first node originating via one or more intermediate nodes to a last node designated by the first node as the destination of the message, the keyed message comprising:

data bits corresponding to the data;

originating bits identifying the first node from which the message originates;

destination bit identifying the last node to which the message is destined;

transmitting bits identifying the current node transmitting the message; and receiving bits identifying the next node intended to receive the message currently being transmitted.

28. The message of claim 27 wherein each of the nodes transmits the message to another node which acknowledges receipt of the message and which retransmits the message to a subsequent node until the message reaches its destination.

29. The message of claim 28 wherein each node comprises one or more of the following:

an originating node for originating the message, an intermediate node for handing off the message from a another node from which the message is received to a subsequent node other than the node from which the message was received, or a destination node for receiving the message.

30. A system operating on a reference frequency comprising an originating node, a plurality of intermediate nodes and a destination node, wherein the originating node provides data to the intermediate node, the originating node comprising:
a first transceiver transmitting on the reference frequency a message including the data and receiving on the reference frequency an implicit and/or explicit acknowledgment that the message has been received by one of the intermediate nodes; and
a first controller controlling operation of the first transceiver to transmit the message to the intermediate node and to receive the implicit and/or explicit acknowledgment that the message has been received by one of the intermediate nodes;

wherein each of the intermediate nodes hands off the message from one node of the system to another node of the system, each of the intermediate nodes comprising:
a second transceiver receiving the message transmitted on the reference frequency by the one node and transmitting on the reference frequency an implicit and/or explicit acknowledgment to the one node that the message has been received by the intermediate node, the second transceiver also transmitting on the reference frequency the received message and receiving on the reference frequency an implicit and/or explicit acknowledgment that the message has been received by the another node; and
a second controller controlling operation of the second transceiver to receive the message transmitted by the one node and to transmit an implicit and/or explicit acknowledgment that the message has been received by the intermediate node and to thereafter transmit the received message and receive the implicit and/or explicit acknowledgment that the message has been received by the another node; and a destination node receiving the message from one of the intermediate nodes, the destination node comprising:
a third transceiver receiving on the reference frequency the message transmitted by the one intermediate node and transmitting on the reference frequency an implicit and/or explicit acknowledgment to the one intermediate node that the message has been received by the destination node; and
a third controller controlling the operation of the third transceiver to receive the message transmitted by the one intermediate node and to transmit an implicit and/or explicit acknowledgment that the message has been received by the destination node.

31. The system of claim 30 wherein the second transceiver employs on/off keying of the reference frequency in a continuous waveform for transmitting and receiving the messages.

32. The system of claim 30 wherein the second transceiver has an adjustable power output which varies as a function of the number of nodes responding thereto thereby reducing interference between adjacent transceivers and thereby increasing the effective bandwidth of the system.

33. The system of claim 30 wherein the message comprises:

data bits corresponding to the data;

originating bits identifying the first node from which the message originates;

destination bit identifying the last node to which the message is destined;

transmitting bits identifying the current node transmitting the message; and receiving bits identifying the next node intended to receive the message currently being transmitted.

* * * * *